US010876645B2

(12) United States Patent
Garvey et al.

(10) Patent No.: US 10,876,645 B2
(45) Date of Patent: Dec. 29, 2020

(54) GAS LINE CONTROL SYSTEM AND MODULAR VARIABLE PRESSURE CONTROLLER

(71) Applicant: VRG CONTROLS, LLC, Highland Park, IL (US)

(72) Inventors: James Michael Garvey, Wheaton, IL (US); Vladimir Rimboym, Highland Park, IL (US)

(73) Assignee: VRG CONTROLS, LLC, Highland Park, IL (US)

(*) Notice: Subject to any disclaimer, the term of this patent is extended or adjusted under 35 U.S.C. 154(b) by 0 days.

(21) Appl. No.: 16/354,802

(22) Filed: Mar. 15, 2019

(65) Prior Publication Data

US 2019/0211940 A1  Jul. 11, 2019

Related U.S. Application Data

(62) Division of application No. 15/218,186, filed on Jul. 25, 2016, now Pat. No. 10,234,047, which is a division of application No. 13/899,013, filed on May 21, 2013, now Pat. No. 9,400,060.

(60) Provisional application No. 61/649,460, filed on May 21, 2012, provisional application No. 61/825,408, filed on May 20, 2013.

(51) Int. Cl.
*F16K 31/12* (2006.01)
*F16K 17/10* (2006.01)
*G05D 16/16* (2006.01)

(52) U.S. Cl.
CPC ........ *F16K 17/105* (2013.01); *G05D 16/166* (2013.01); *Y10T 137/0318* (2015.04); *Y10T 137/777* (2015.04); *Y10T 137/86919* (2015.04)

(58) Field of Classification Search
CPC ............................................... Y10T 137/7762
See application file for complete search history.

(56) References Cited

U.S. PATENT DOCUMENTS

| | | | |
|---|---|---|---|
| 1,021,762 A | 4/1912 | Cross | |
| 1,410,098 A * | 3/1922 | Hamilton | F02D 9/02 123/198 F |
| 2,020,847 A | 11/1935 | Mitereff | |
| 2,106,036 A * | 1/1938 | O'Connor | G05B 5/04 137/488 |
| 2,125,949 A * | 8/1938 | O'Connor | G05D 16/163 137/487.5 |
| 2,309,848 A | 2/1943 | King | |
| 2,527,331 A * | 10/1950 | Puerner | G05D 11/035 60/463 |
| 3,788,341 A * | 1/1974 | Athy, Jr. | F16K 31/124 137/209 |
| 4,000,754 A | 1/1977 | Risk | |
| 5,226,444 A | 7/1993 | Nagpal | |
| 5,511,580 A | 4/1996 | Resseguier | |
| 5,735,308 A | 4/1998 | Yokota | |

(Continued)

*Primary Examiner* — Robert K Arundale
(74) *Attorney, Agent, or Firm* — Bishop, Diehl & Lee. Ltd.

(57) ABSTRACT

A pneumatically controlled assembly, system, method and device for the regulation of pressure of a gas as it flows in a pressurized line and including at least one loading valve which is set to respond to variations in pressure in conjunction with a pneumatically actuated process control valve so as to effectively regulate and maintain pressure of the gas in the pressurized line.

6 Claims, 45 Drawing Sheets

(56) References Cited

U.S. PATENT DOCUMENTS 6,371,156 B1 4/2002 Walton
2010/0301238 A1 12/2010 Krake

* cited by examiner

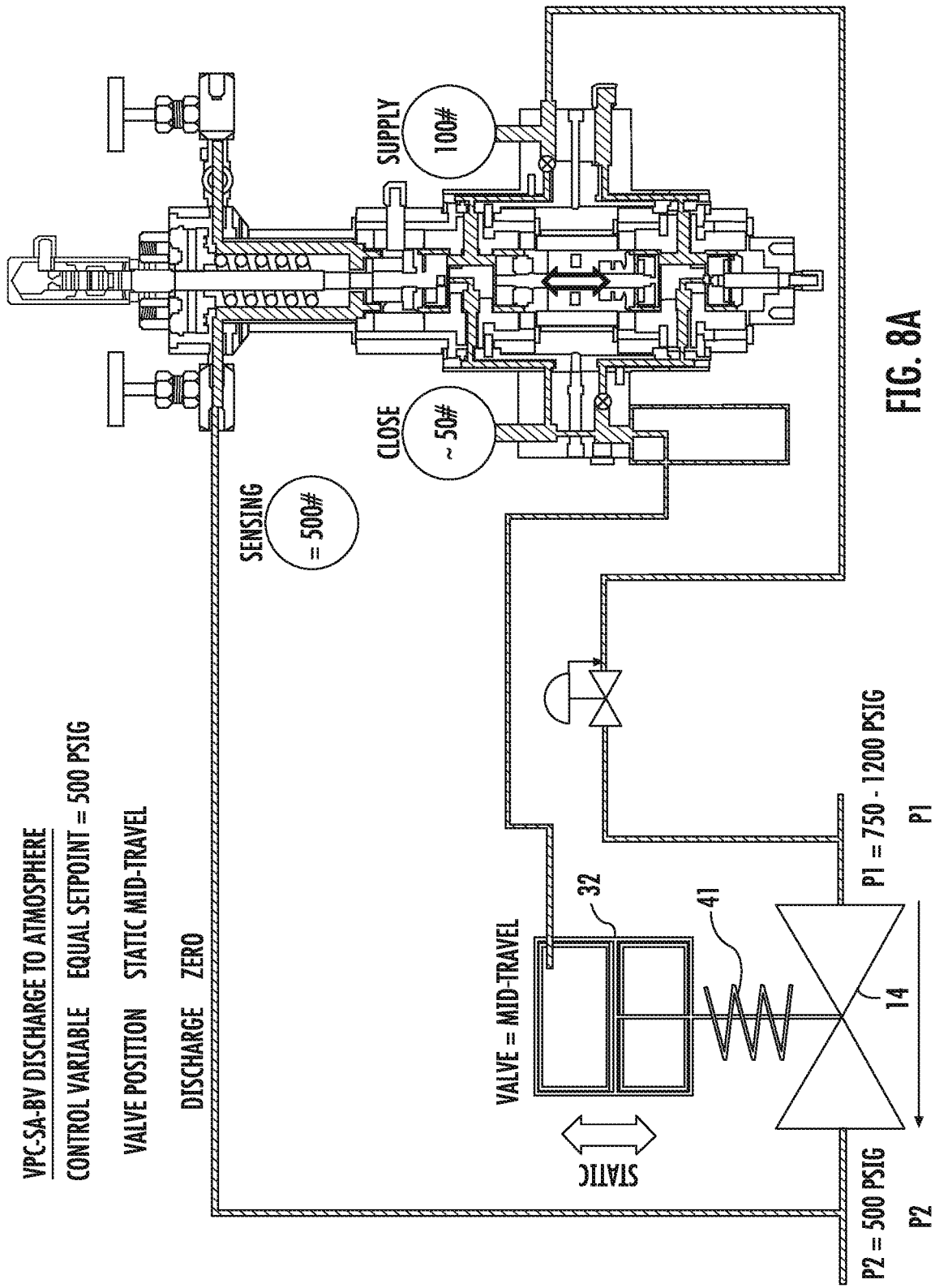

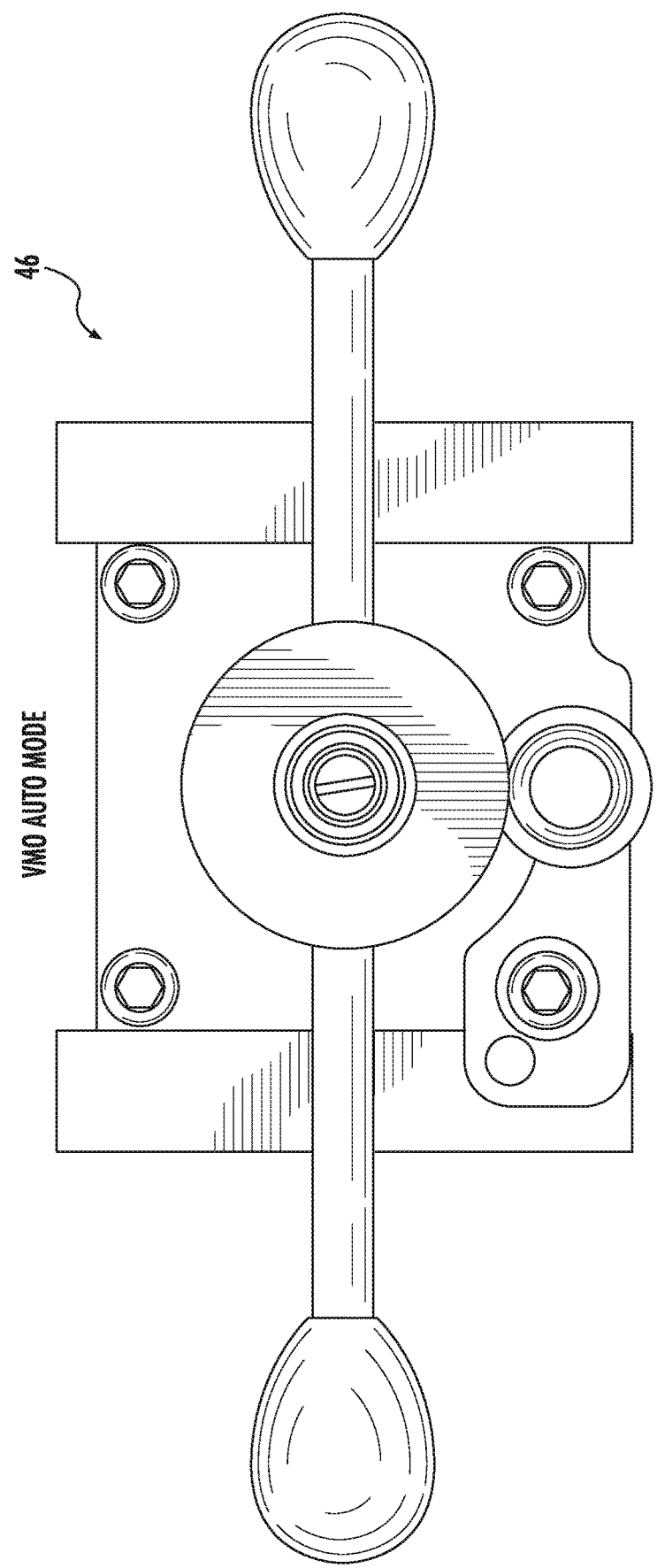

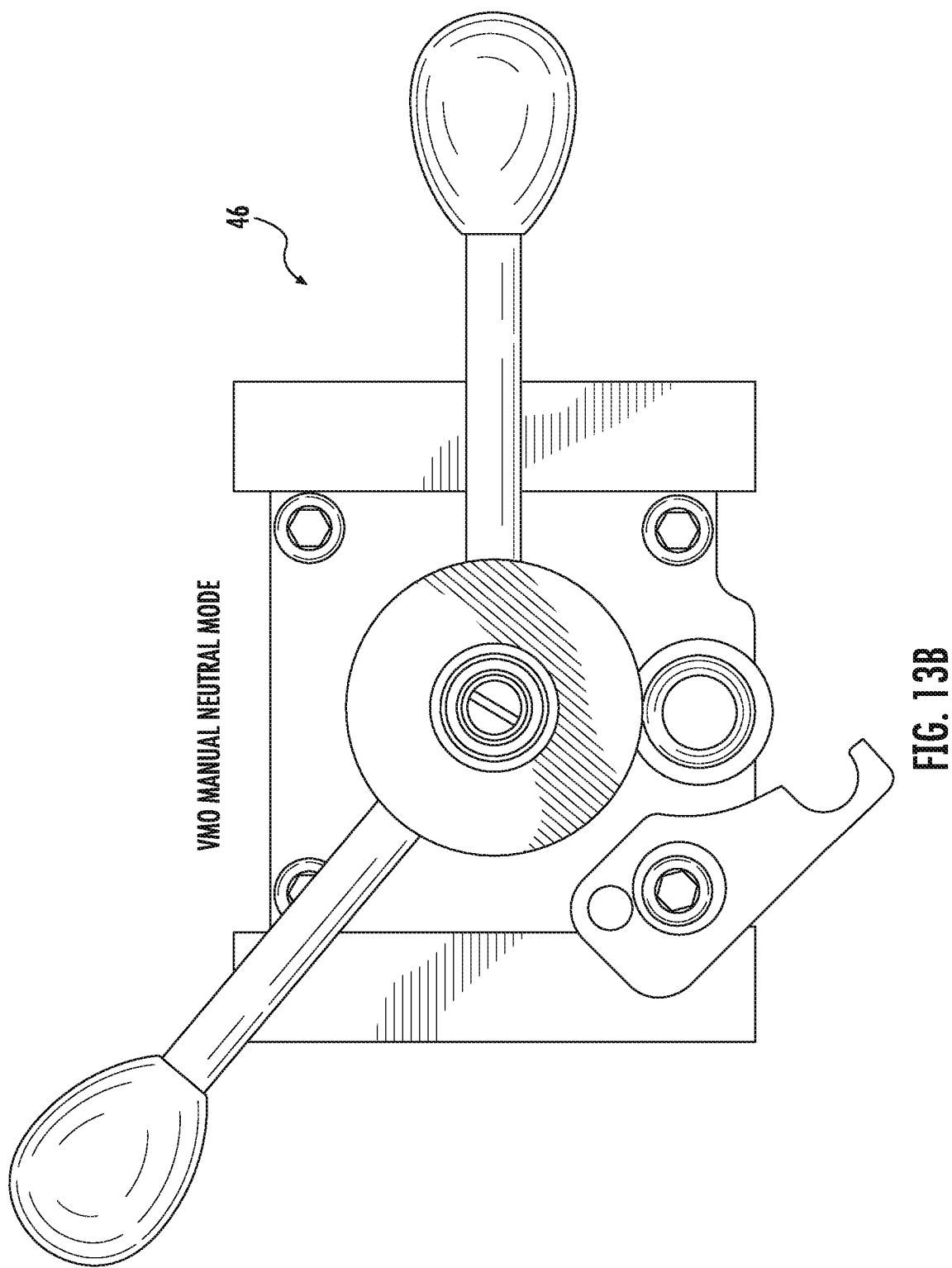

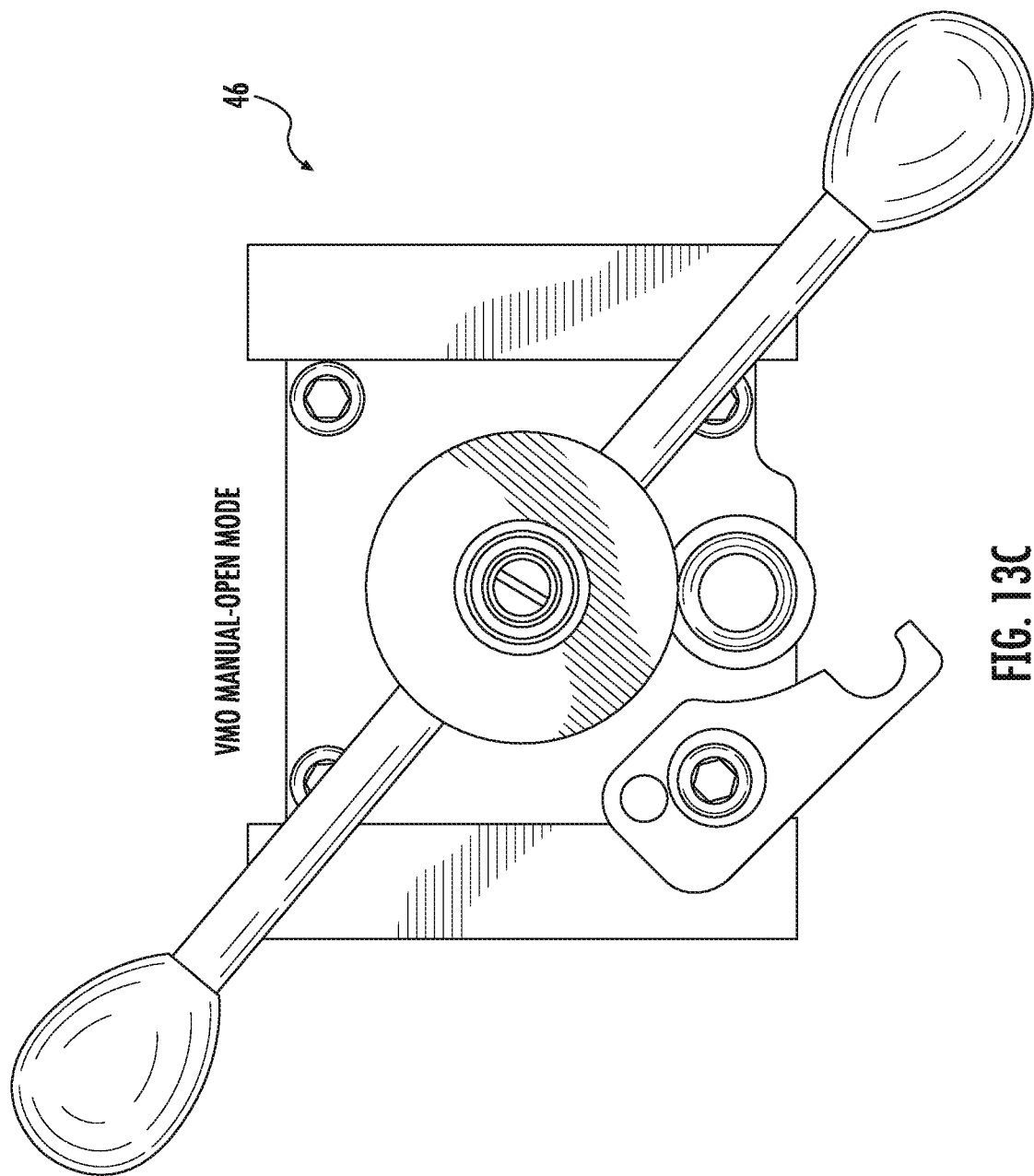

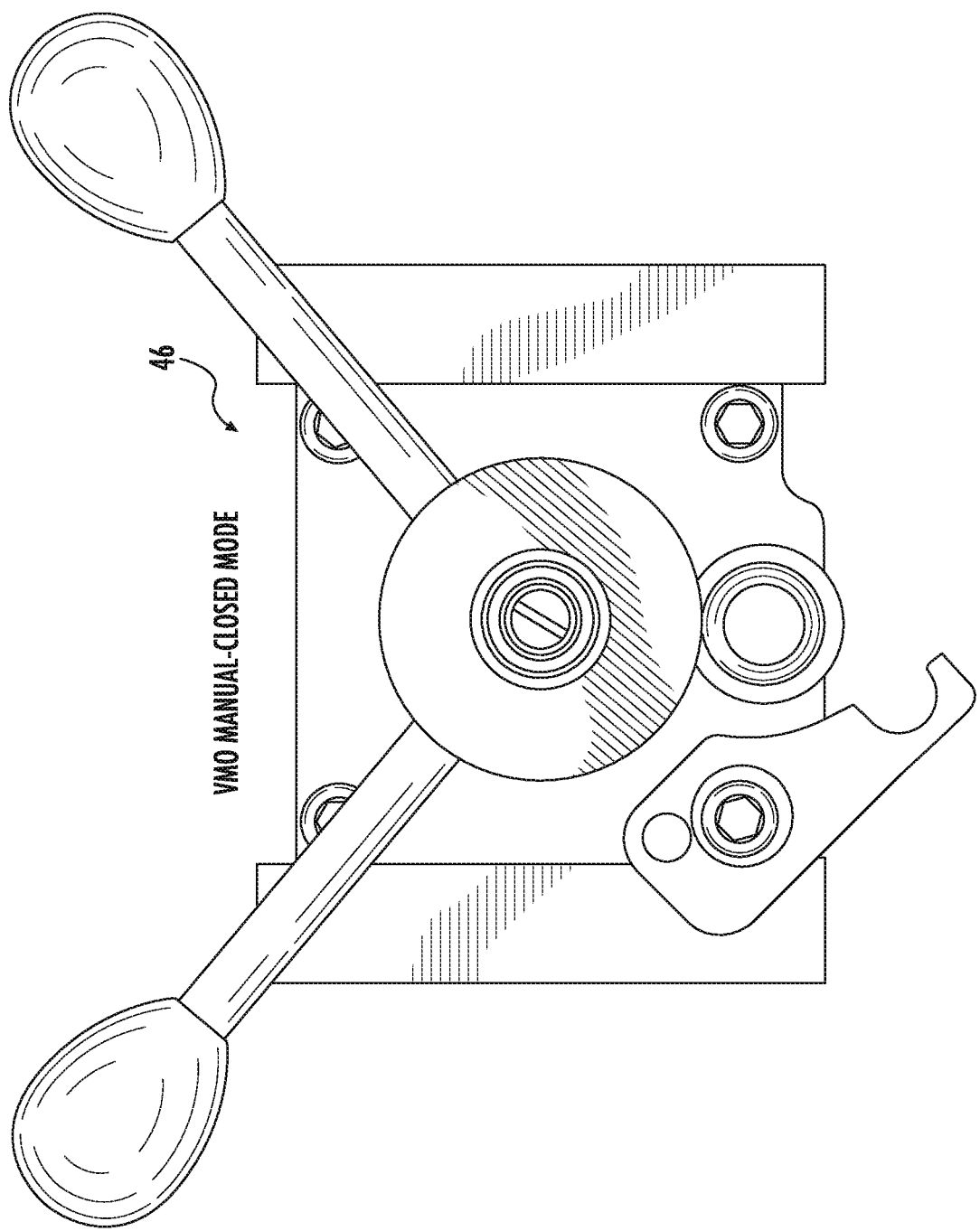

GAS LINE CONTROL SYSTEM AND MODULAR VARIABLE PRESSURE CONTROLLER

RELATED APPLICATIONS

This application is a divisional of U.S. application Ser. No. 15/218,186 filed Jul. 25, 2016, titled "GAS LINE CONTROL SYSTEM AND MODULAR VARIABLE PRESSURE CONTROLLER" now U.S. Pat. No. 10,234,047, which is a divisional of U.S. application Ser. No. 13/899,013, filed May 21, 2013, titled "GAS LINE CONTROL SYSTEM AND MODULAR VARIABLE PRESSURE CONTROLLER" now U.S. Pat. No. 9,400,060, which claims priority to U.S. Provisional Application No. 61/649,460 titled "Gas Line Control System" and filed on May 21, 2012 as well as U.S. Provisional Application No. 61/825,408 titled "Gas Line Control System," filed on May 20, 2013. The '047 and '060 patents, as well as the '460 and '408 provisional applications are all incorporated herein by reference.

Further, U.S. Pat. No. 5,762,102 to Rimboym, titled "Pneumatically Controlled No-Bleed Valve And Variable Pressure Regulator" issued to Becker Precision Equipment, Inc. on Jun. 9, 1998, is also incorporated herein by reference.

TECHNICAL FIELD OF THE INVENTION

The present device relates to devices and systems for regulation and control of pressure in pressurized gas delivery lines. Particularly, the present device and system relate to a variable pressure controller (VPC) for regulation and control of fluid flow in a delivery line.

BACKGROUND OF THE INVENTION

Pressure regulators equipped with variable pressure regulator pilot valves are used as operating regulators, monitors, stand-by regulators and relief valves. Prior to the invention of U.S. Pat. No. 5,762,102, such valves were designed to maintain the desired pressure of fluid in a delivery line by operating with a constant "bleed" from the valve. This was not only wasteful but, in the case of some fluids, was environmentally undesirable. Environmental costs and problems are caused by discharge of pollutants to the air. Bleed gas from natural gas pipelines to the atmosphere year after year only adds to the growing environmental problem. Overall, industry estimates place the discharge of natural gas to the atmosphere from a single controller operating with constant bleed to the atmosphere, in excess of 300,000 standard cubic feet (SCF) per year.

In the present invention, while the no-bleed controller is of import, embodiments of the present invention address problems with the following key features:
- VPC with one common block and external manifolds;
- VPC with two different internal loading valves;
- VPC with Manual Operation Valve (Rotary Type)—attached via manifold configuration;
- VPC with external insertion of Nozzle Assembly;
- VPC-PID with variable gain;
- System configurations above adaptable to diaphragm style rotary pneumatic positioner via addition of proportional feedback mechanism;
- Double-acting, single-acting (reverse) and single-acting (direct) in one common VPC configuration;
- VPC with conditioning of output and exhaust flow paths via manifolds;
- Interchangeability of "normally open" and "normally closed" internal loading valves in same body; and
- Coupling of the "derivative" adjustable orifice on output of "ID" models—derivative adjustment is configured in manifold system and also incorporates "flow conditioning."

These and other problems are solved by the present VPC device and system.

SUMMARY OF THE INVENTION

The following presents a simplified summary of embodiments of the system and method of the disclosed invention. The summary is intended to introduce particular useful elements, which may be critical to a particular embodiment and optional for other embodiments. Though not specifically summarized here, other critical and optional elements, including combinations of such elements, may also be possible.

Generally speaking, a pneumatic valve pressure controller system having a fluid supply line and a variable pressure controller coupled to a process control valve within the supply line, is described.

In a particular embodiment, a supply regulator is fluidly coupled to the fluid supply line upstream of the process control valve and an actuator is operably connected to the process control valve, the actuator having a first pressure chamber and a second pressure chamber. A sensing diaphragm connected to the fluid supply line determines a relative pressure in the fluid supply line on the outlet end side of the process control valve, while a first loading valve is fluidly coupled to the first pressure chamber and responsive to the sensing diaphragm and a second loading valve is fluidly coupled to the second pressure chamber and responsive to the sensing diaphragm. In such an embodiment, the first loading valve and the second loading valve open and close in response to the sensing diaphragm to change a position of the actuator and thereby operate the process control valve.

In an embodiment of the method for controlling a fluid supply through a delivery line having a process control valve therein to maintain a supply side pressure and a delivery side pressure, and a pneumatic actuator having a first pressure chamber and a second pressure chamber and used to operate the process control valve, the steps include setting a delivery side target pressure range for the fluid supply, sensing the delivery side pressure, and operating the pneumatic actuator to either maintain the actuator in a static state when the delivery side pressure is within the target range or move the actuator to adjust the process control valve position when the delivery side pressure is outside the target range.

In a specific embodiment of the method, the first and second pressure chambers of the actuator are responsive to a first loading valve fluidly coupled to the first pressure chamber and a second loading valve fluidly coupled to the second pressure chamber, and the first loading valve and the second loading valve open and close in response to the delivery side pressure to change a position of the actuator and thereby modulate the position of the process control valve.

Further, a variable pressure controller is also described and claimed. Generally speaking, the controller is comprised of a first fluid interface for coupling to a fluid line upstream of a process control valve, a sensing mechanism positioned at the first fluid interface and responsive to a pressure in the fluid line upstream of a process control valve, a first loading valve responsive to the sensing mechanism, a second loading valve responsive to the sensing mechanism, a first manifold comprised of two outlet ports, wherein one outlet port is coupled to a first channel fluidly coupled to the first loading valve and one outlet port is coupled to a second channel fluidly coupled to the second loading valve, and a second manifold comprised of two outlet ports, wherein one outlet port is coupled to a first channel fluidly coupled to the first loading valve and one outlet port coupled to a second channel fluidly coupled to the second loading valve.

In a specific embodiment of the VPC, at least one module capable of interfacing with at least one of the first manifold and the second manifold. Additionally, the first loading valve and the second loading valve may be one of either a "normally closed" or "normally open" valve configuration. The pair of loading valves may be similar or dissimilar to one another.

The described features may be combined as appropriate, as would be apparent to one of skill in the art reading this disclosure. Many of these features and combinations will be more readily apparent with reference to the following detailed description and the appended drawing figures.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIGS. 8A-E are a sequence of schematics, similar to FIGS. 2-6, of an embodiment of a single-acting system with two normally-closed loading valves illustrating steady state and upset conditions of the system;

FIGS. 13-13*d* are various views of an optional valve manual override (VMO), including illustrating the VMO in automatic mode, neutral mode, open mode, and closed mode, and demonstrating manifold configuration between VMO body and pneumatic connection ports;

DETAILED DESCRIPTION OF PREFERRED EMBODIMENTS

Figure 1:
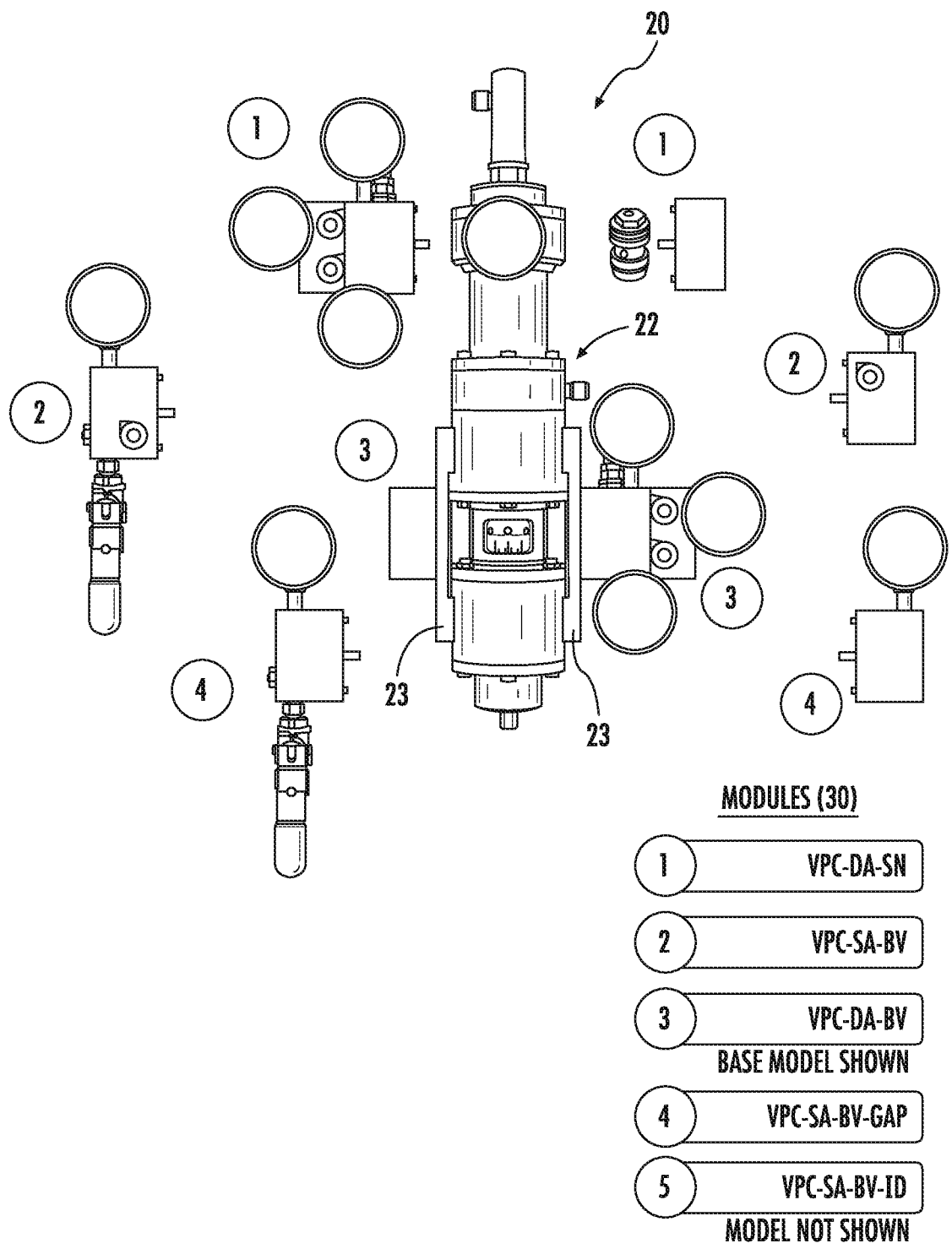
FIG. 1 is a schematic of an embodiment of the VPC power module and manifolds illustrating the plug-and-play versatility of the system.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Referring to FIGS. 1-29, there are illustrated embodiments of a fluid line control system, the system being generally referenced in the drawing figures by the numeral 10. The control system 10 is comprised of a fluid line 12 having a process control valve 14 coupled therein and a variable pressure controller (VPC) 20 indirectly coupled to the process control valve 14. The process control valve 14 has a supply side pressure (P1) and a delivery side pressure (P2), the latter of which is controlled through operation of the process control valve 14. The VPC 20 is comprised of a power module 22 and interchangeable manifolds 30 to achieve different configurations/models, as further explained below.

Process Control Valve

In the embodiment of FIGS. 2-6, the process control valve 14 is directly operated by a pneumatic actuator 32 having a first (or upper) pressure chamber 34 and a second (or lower) pressure chamber 36. The pressure chambers, 34 and 36, are fluidly coupled to first and second loading valves, 40 and 42, respectively, through adjustable orifices, 44A and 44B. In the double-acting models of the system 10, the process control valve is operated pneumatically, requiring the fluid pressures in the first and second chambers, 34 and 36, to move the actuator in either direction. Comparatively, in the single-acting embodiments, the process control valve 14 includes a spring-piston actuator 32 (e.g., FIG. 18A), where the fluid pressure of the system 10 is used to drive the actuator in a single direction against the force of the spring 41. Alternatively, the actuator of the process control valve 14 may be operated by a spring/diaphragm 50 (e.g., FIG. 21A). Either of the embodiments described for actuator 32 of the process control valve 14 for the single-acting models may be reversed for particular applications (e.g., FIGS. 19 and 26).

Loading Valves

Figure 10:
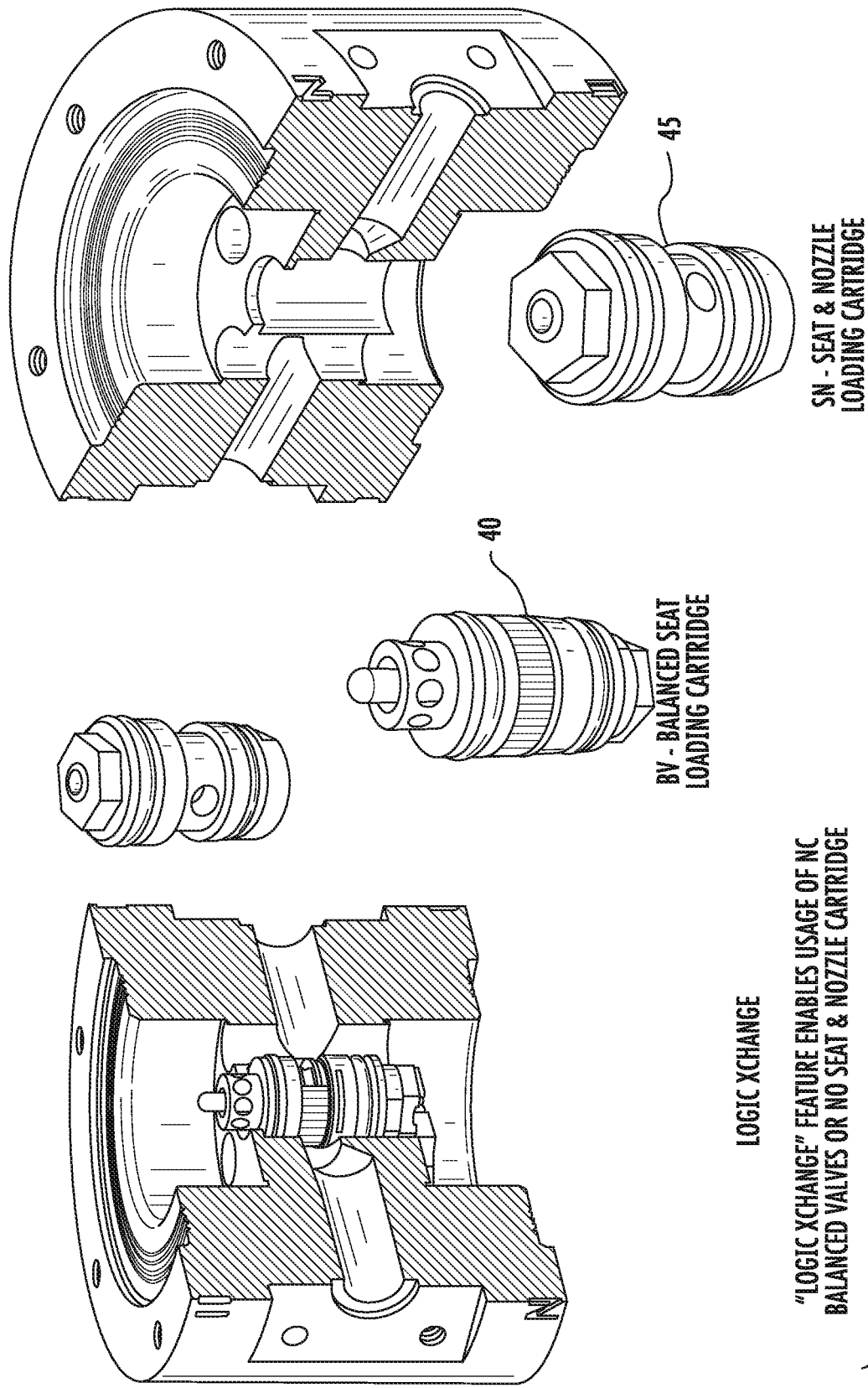
FIG. 10 is a cross-sectional view of one valve section of an embodiment of the VPC power module showing the interchangeability of a normally-closed loading valve and a normally-open loading valve.

The loading valves of the VPC power module 22 are preferably loading valves, 40, 42, which are preferably normally closed valves. These valves operate in response to movement of an internal mechanism 16, which is in turn responsive to a control spring 24 and sensing diaphragm 26 coupled to a sensing pressure at the delivery side of the process control valve 14. A set-point of the delivery side pressure (P2) is set via set-point adjustment screw 28. Alternatively, as shown in FIG. 10, the valves may utilize loading valves 45 (FIG. 10), which are of a normally-open configuration. As two loading valves are used, the pair of loading valves may be similar (i.e., both normally closed loading valves or both normally open loading valves) or the valves may be dissimilar (i.e., one normally closed loading valve and one normally open loading valve).

Operation of Double-Acting VPC System

Generally speaking, operations of the system 10 using different models of the VPC 20 are similar. In a double-acting model, when the sensing pressure is equal to the VPC set-point, the net force on the VPC power module 22 is zero. This is the equilibrium or "balanced" condition where the sensing pressure that pushes down on a sensing diaphragm 26 and the force of the control spring 24 that pulls up on the sensing diaphragm 26 are equal. When the VPC 20 achieves equilibrium (e.g., FIG. 2), the top loading valve 40 and bottom loading valve 42 will remain closed maintaining a constant output pressure to the top and bottom chambers, 34 and 36, respectively, of the process control valve actuator 32. The VPC will exhibit zero emissions at this state.

From the balanced position two possible scenarios can occur: the sensing pressure can rise above the set point, or the sensing pressure can fall below the set-point. If the sensing pressure rises above the VPC set-point (e.g., FIG. 3), the net force on the VPC power module 22 is downward. The top loading valve 40 will open and divert pressure from the top chamber 34 of the double acting actuator 32 to exhaust. The bottom loading valve 42 will remain closed and full supply pressure shall continue to be applied to the bottom chamber 36 of the double acting actuator 32. The combination of these actions creates a differential pressure to be applied to the double acting actuator 32 that will move the process control valve 14 toward the closed position.

Figure 4:
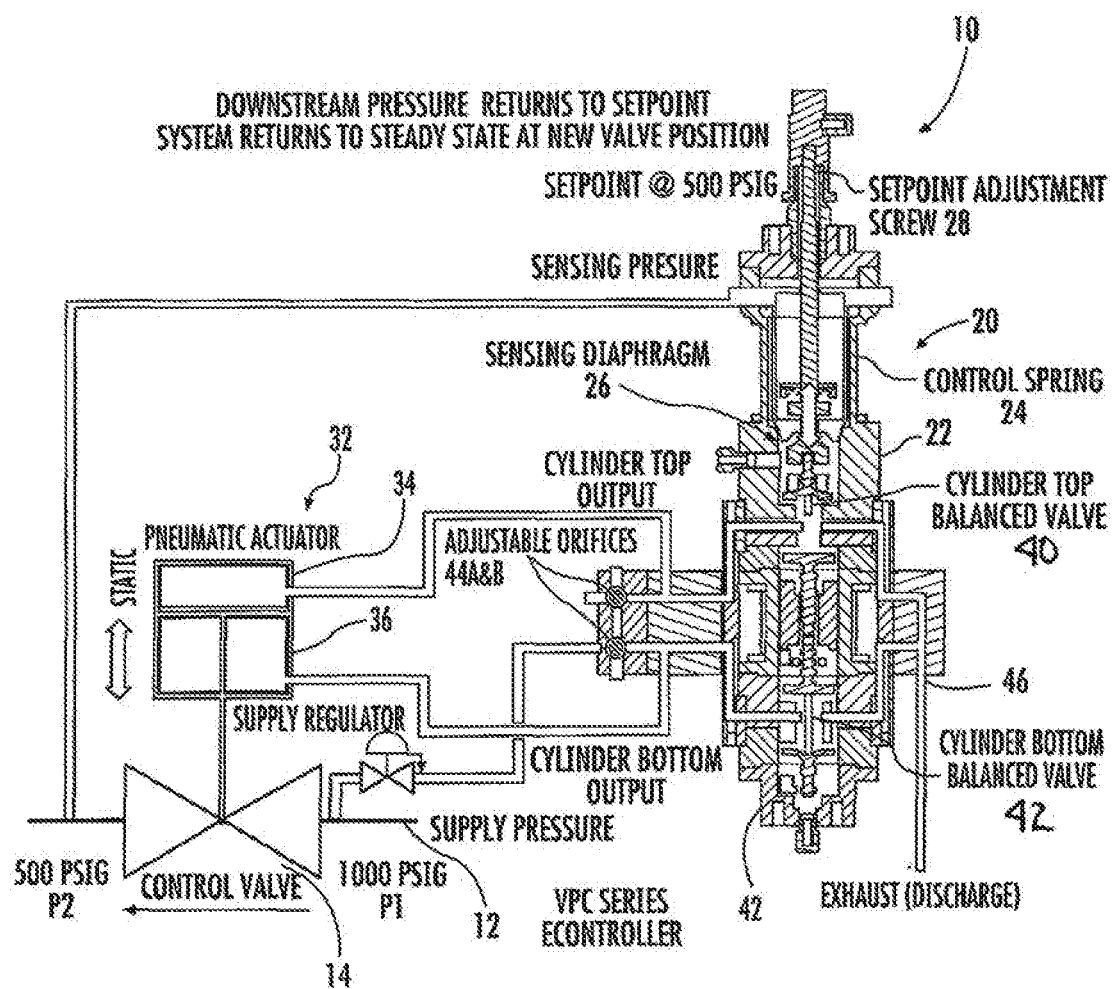
FIG. 4 is a schematic of the embodiment of FIG. 2 illustrating a condition where the downstream pressure returns to a set-point and the system is again in a steady state with the process control valve at a second position.

FIG. 4 illustrates the resulting corrective action of the closed process control valve.

Conversely, if the sensing pressure falls below the VPC set-point (e.g., FIG. 5), the net force on the VPC power module 22 is upward. The bottom loading valve 42 will open and divert pressure from the bottom chamber 36 of the double acting actuator 32 to exhaust. The top loading valve 40 will remain closed and full supply pressure shall continue to be applied to the top chamber 34 of the double acting actuator 32. The combination of these actions creates a differential pressure to be applied to the double acting actuator 32 that will move the process control valve toward the open position.

Figure 6:
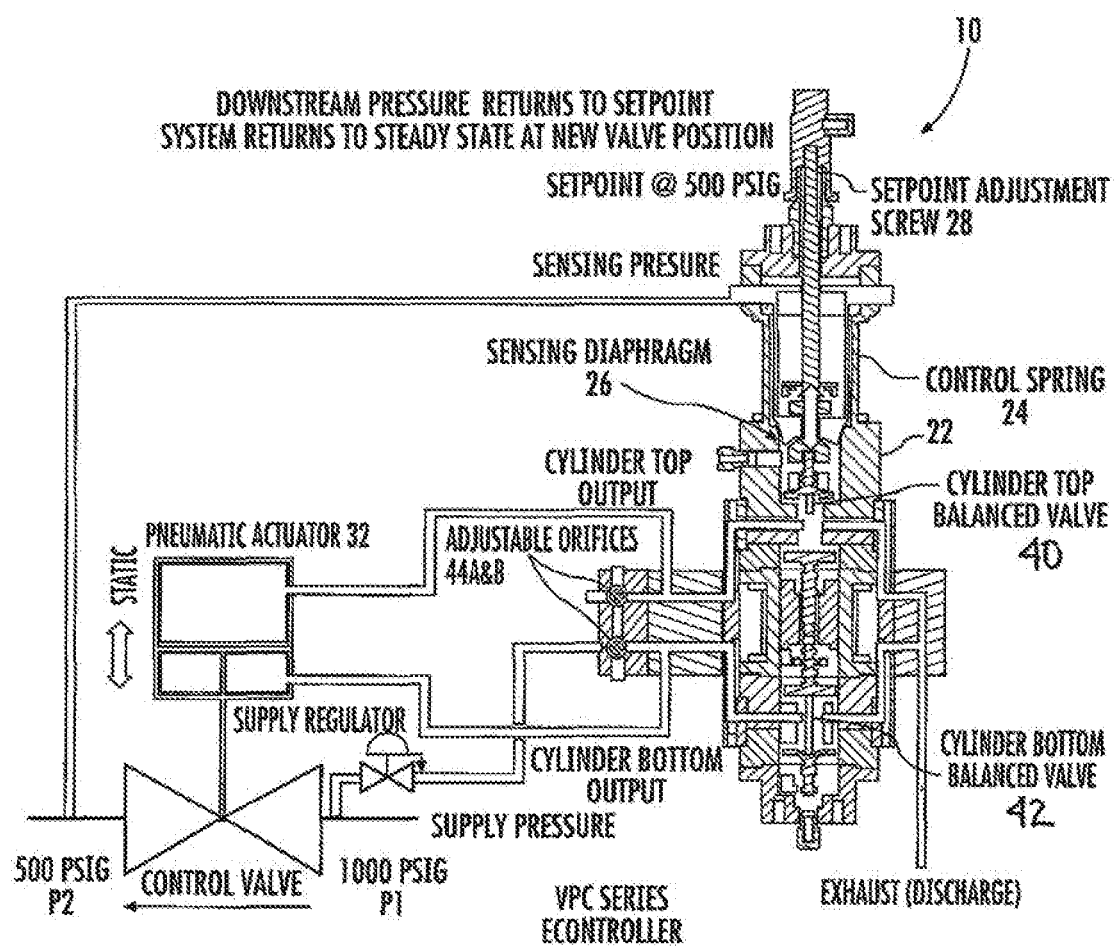
FIG. 6 is a schematic of the embodiment of FIG. 2 illustrating a condition where the downstream pressure returns to a target pressure (i.e., set-point) and the system is once again in a steady state with the process control valve at a third position.
Figure 7A:
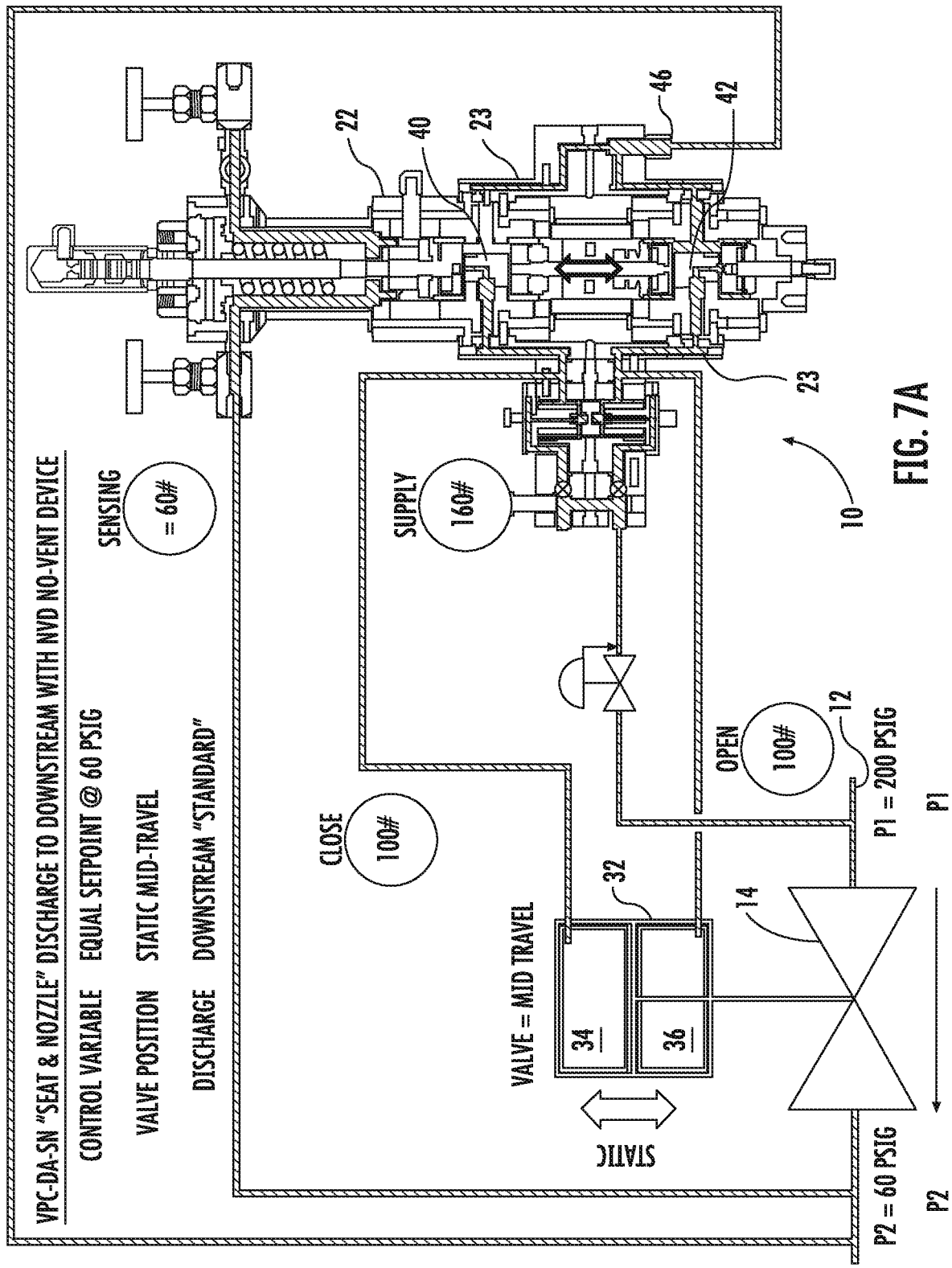
FIGS. 7A-E are a sequence of schematics, similar to FIGS. 2-6, of an embodiment of a double-acting system with two normally open loading valves illustrating steady state and upset conditions of the system.
Figure 7B:
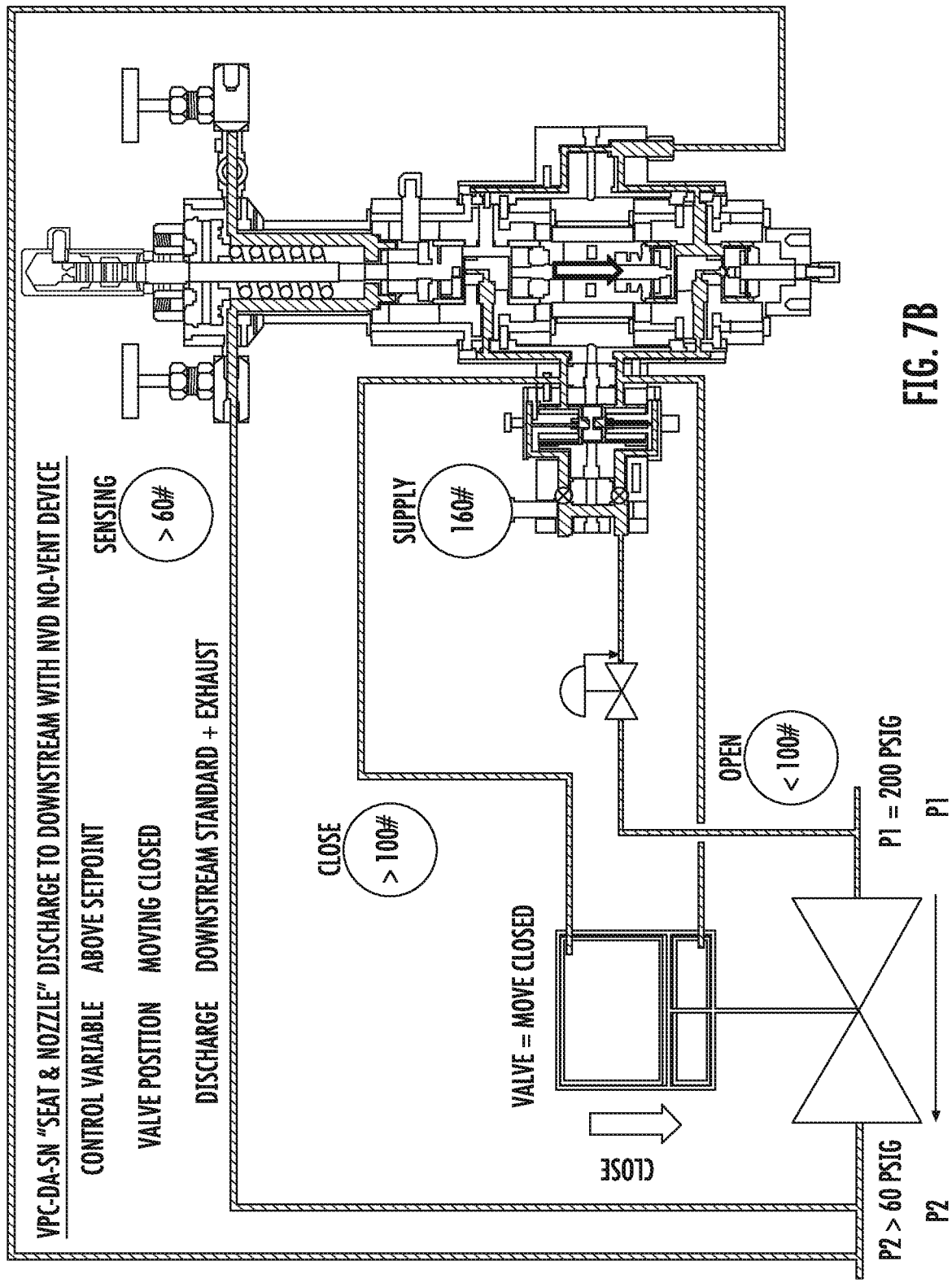
Figure 7C:
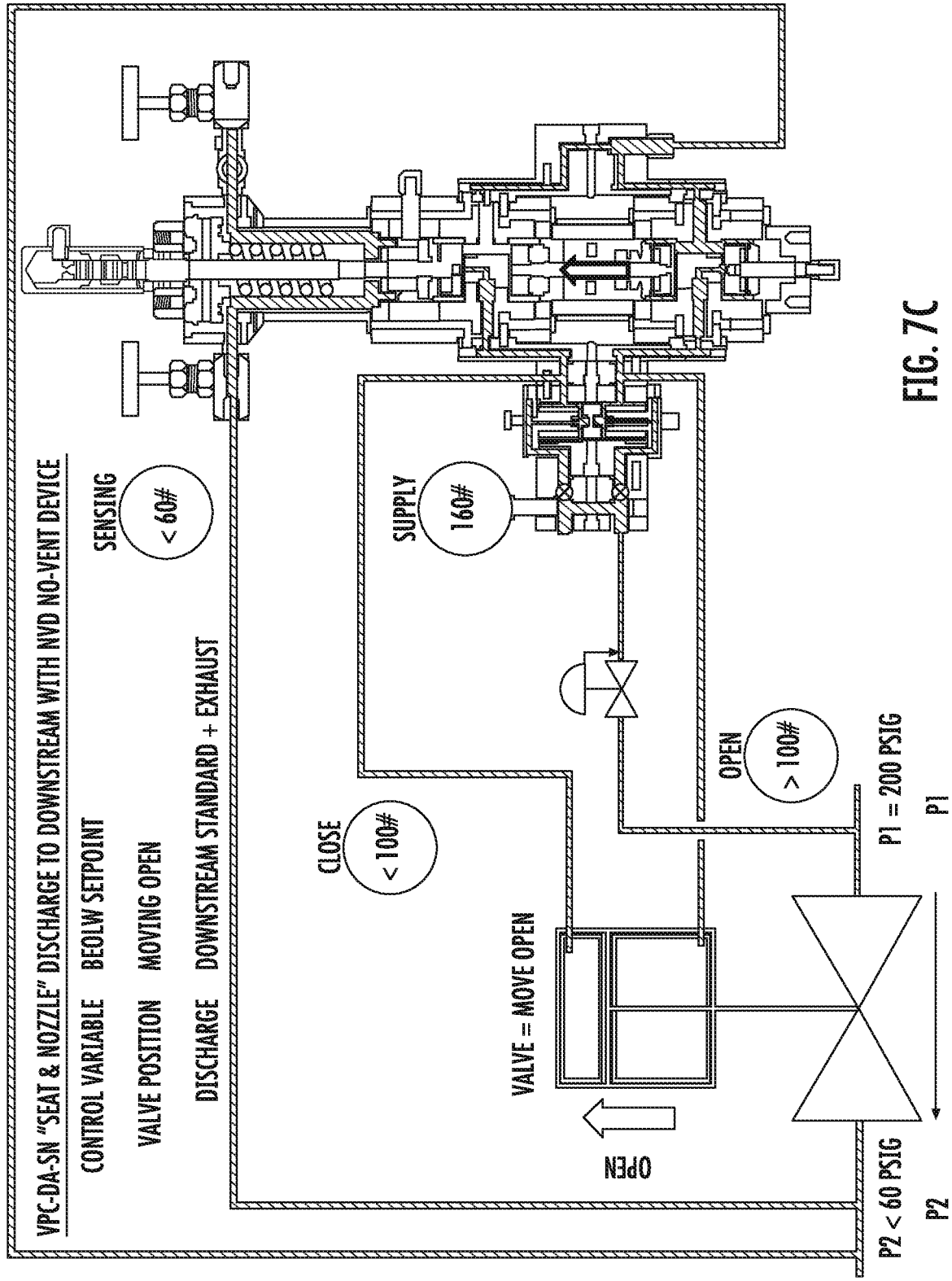
Figure 7D:
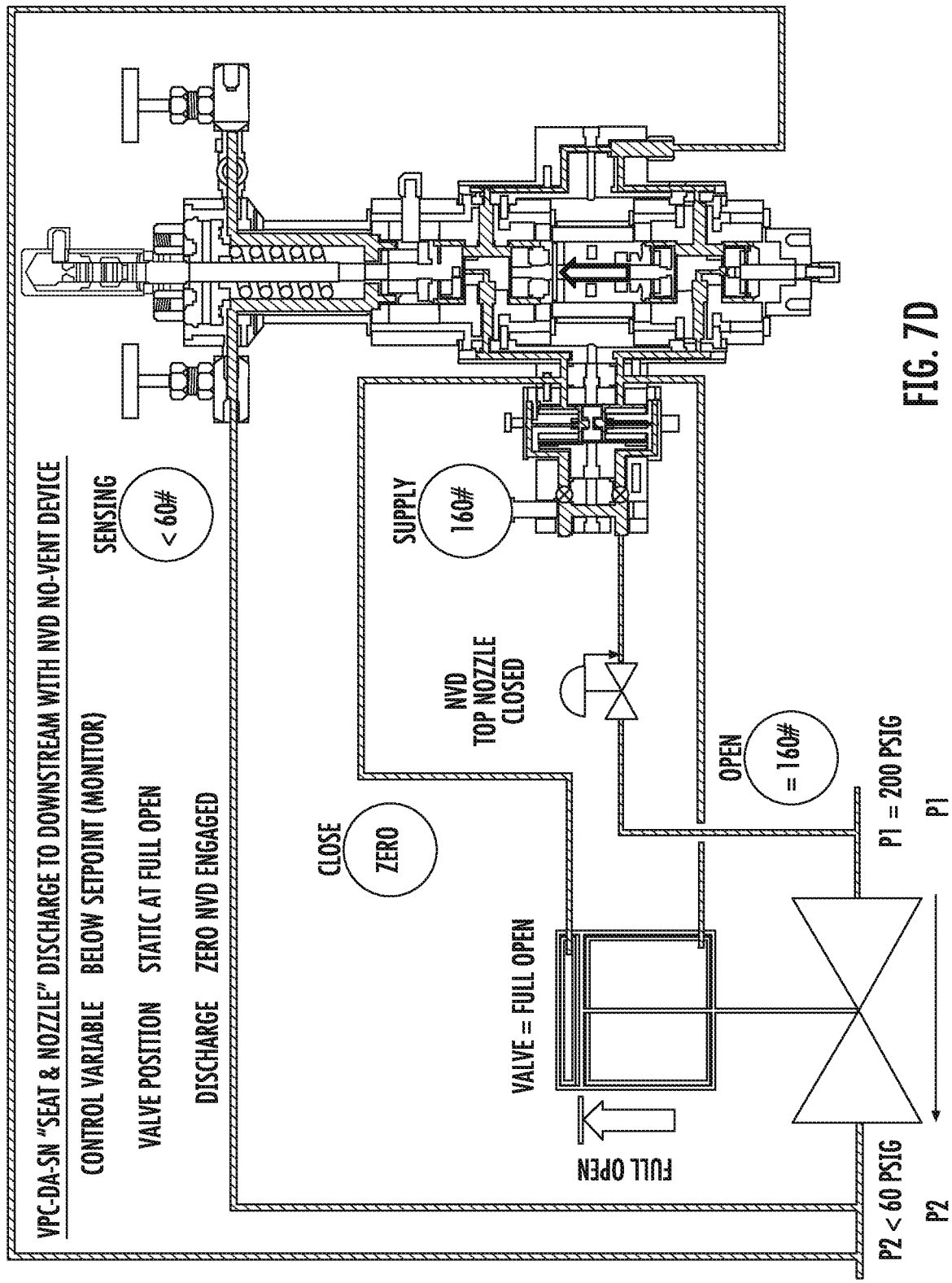
Figure 7E:
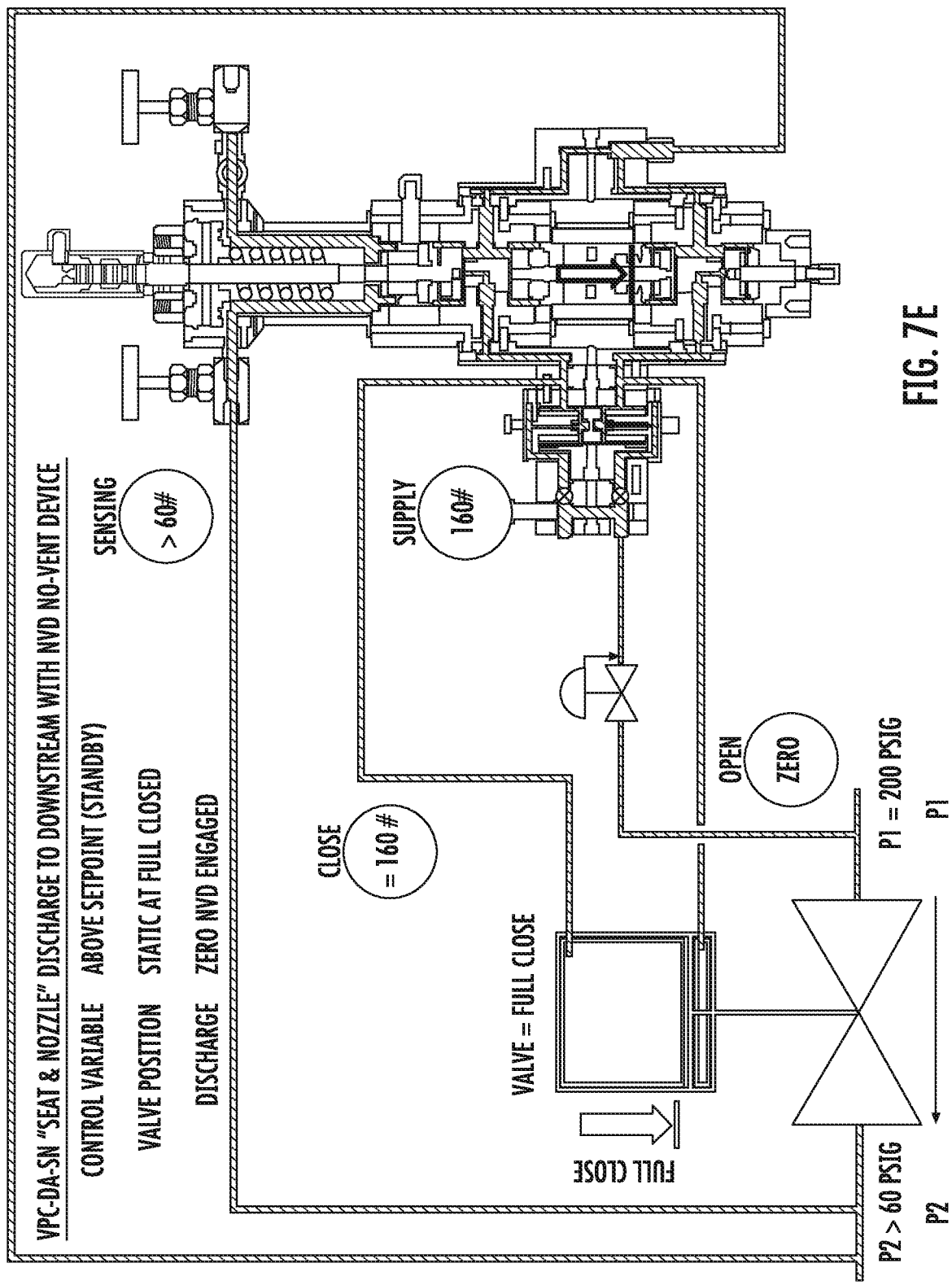
Figure 8B:
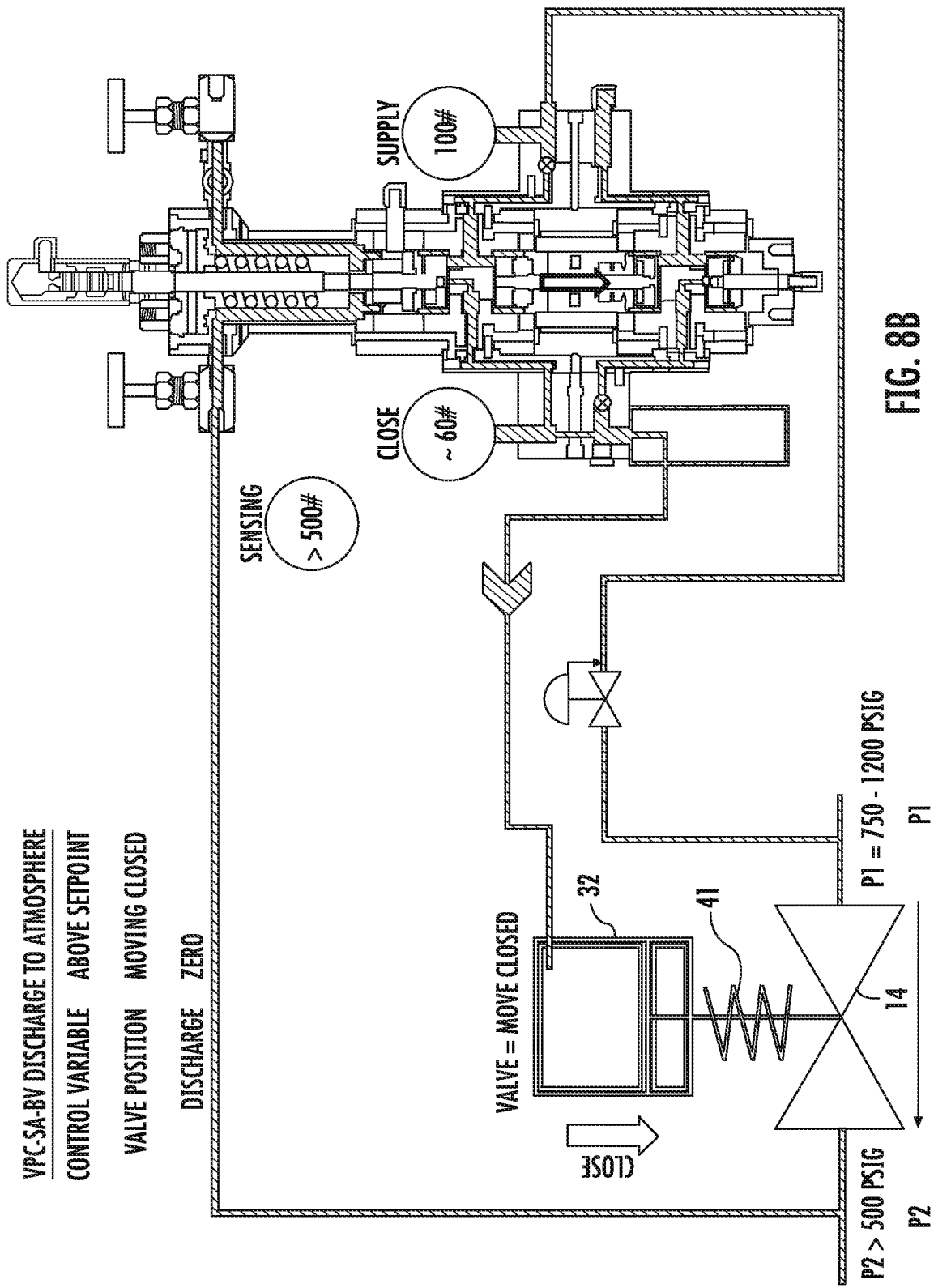
Figure 8C:
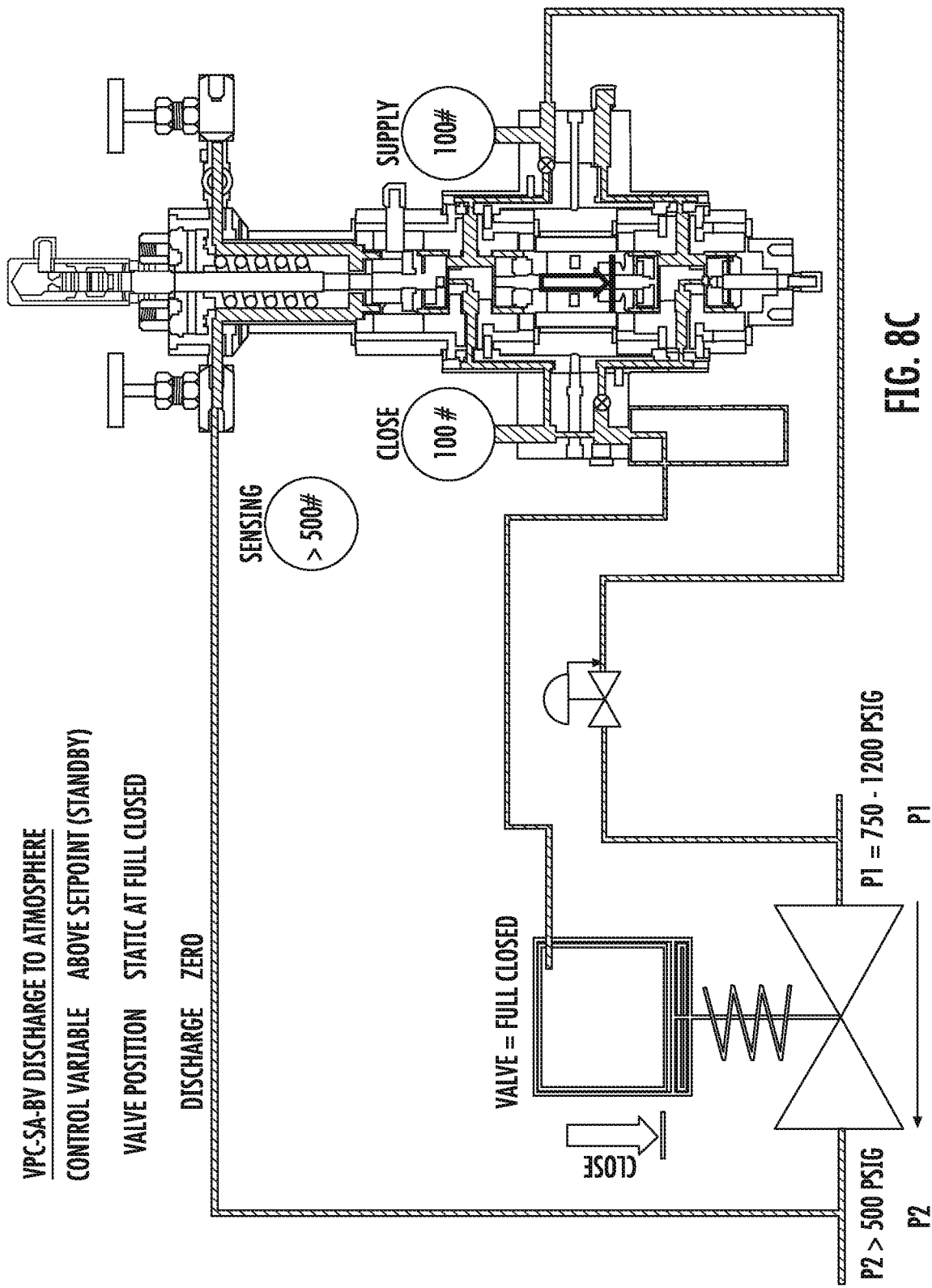
Figure 8D:
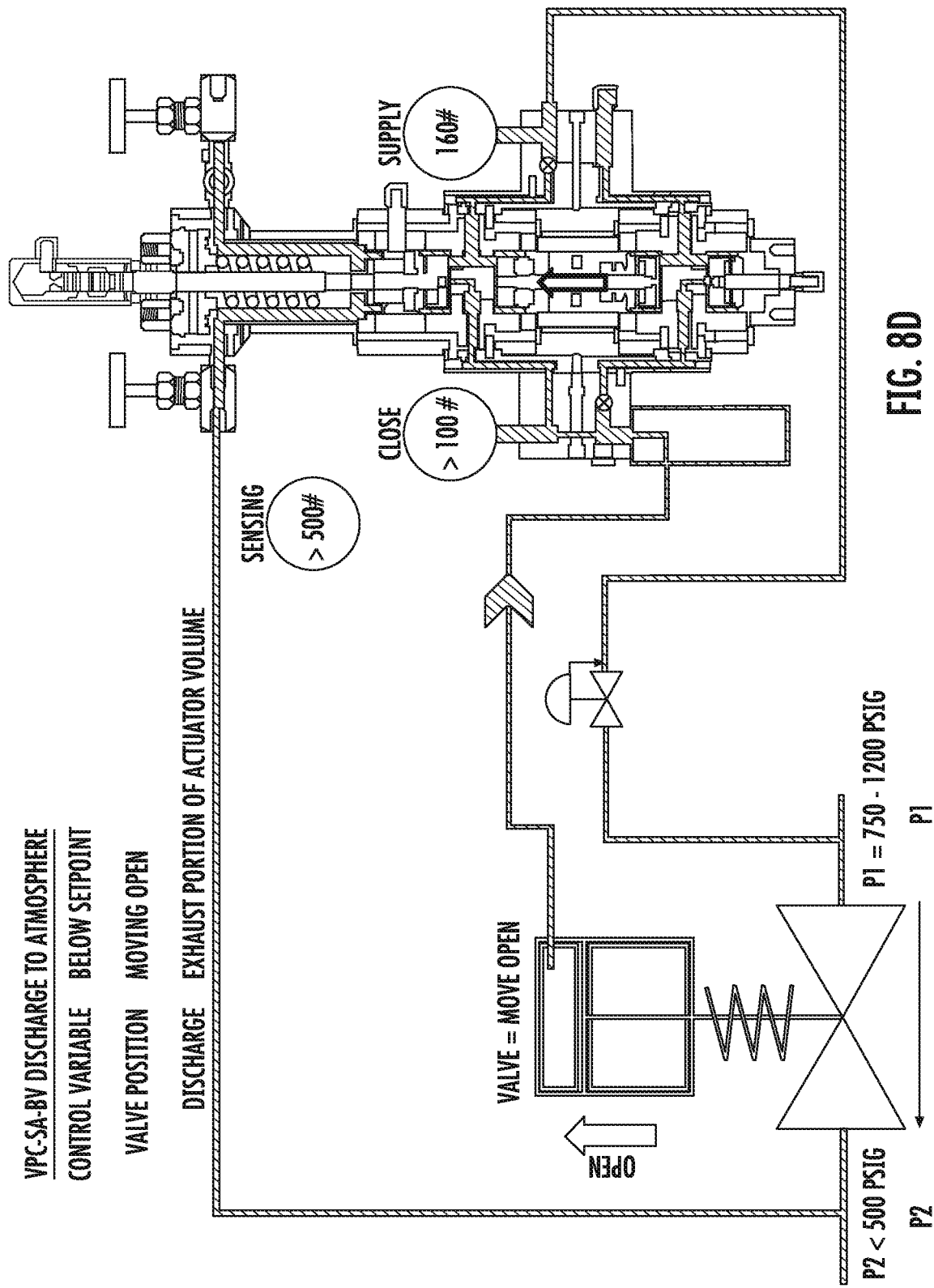
Figure 8E:
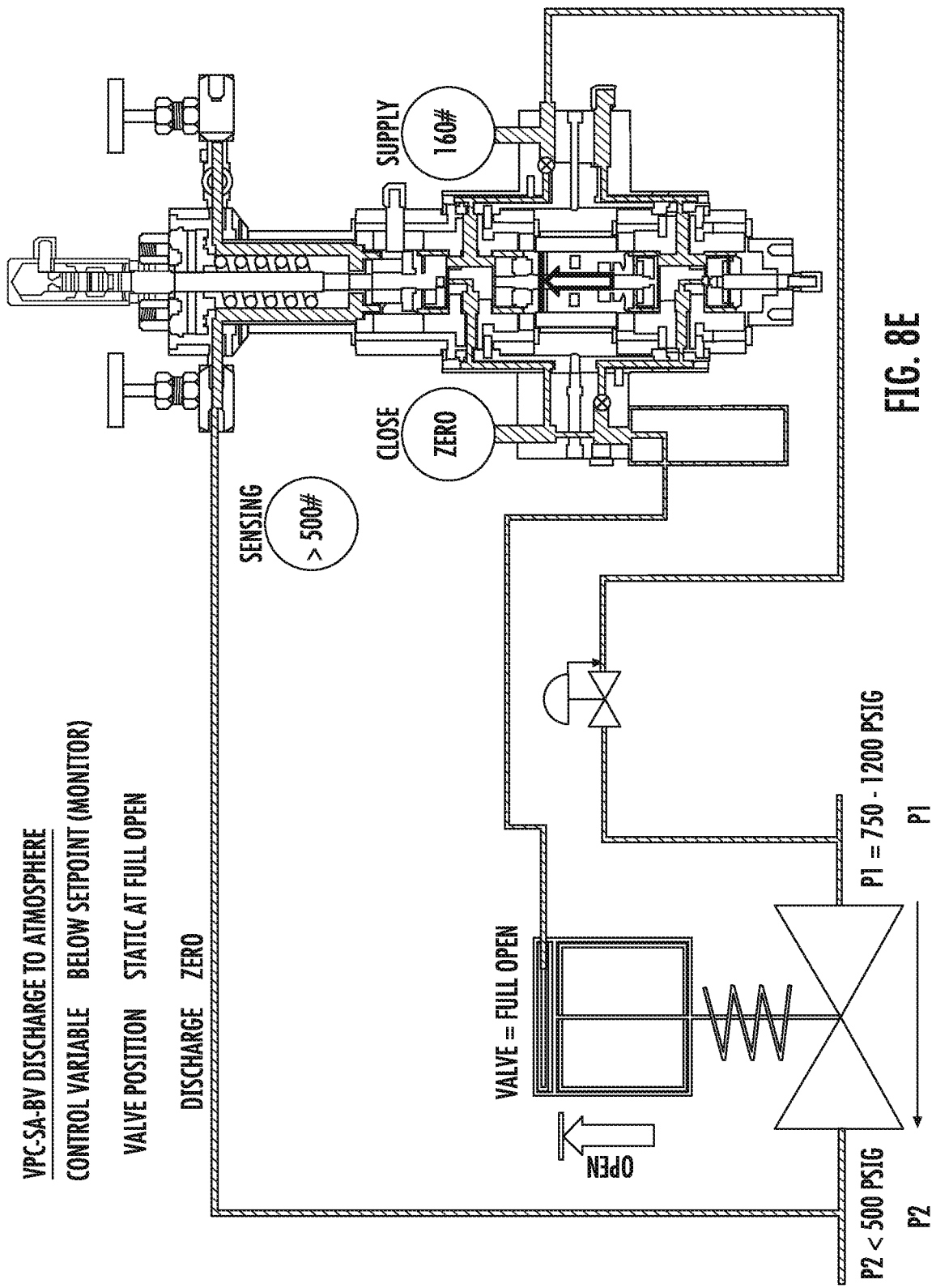
Figure 9A:
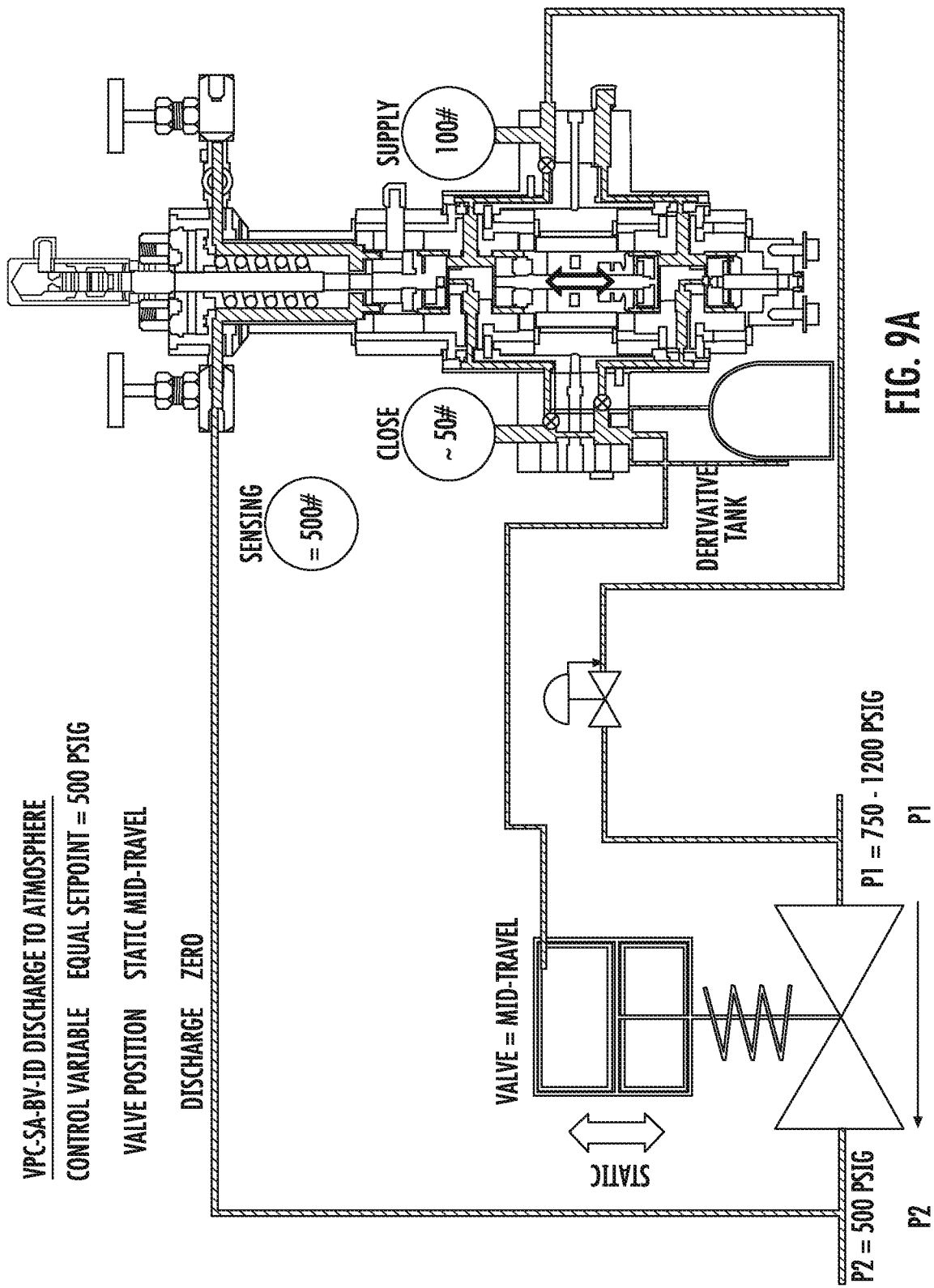
FIGS. 9A-E are a sequence of schematics, similar to FIGS. 2-6, of another embodiment of a single-acting system with the addition of a "derivative" function adjustment and with two normally-closed loading valves illustrating steady state and upset conditions of the system.
Figure 9B:
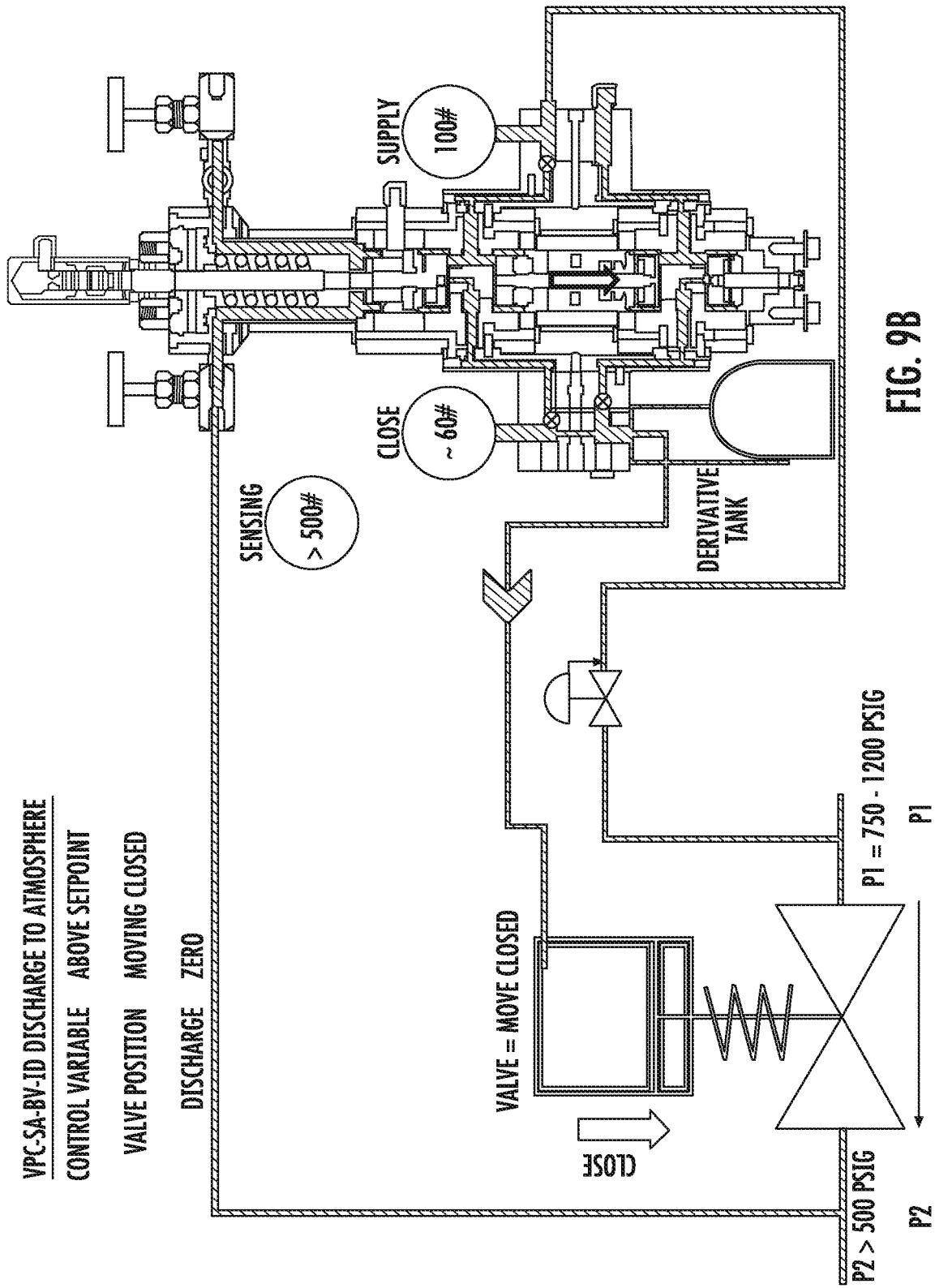
Figure 9C:
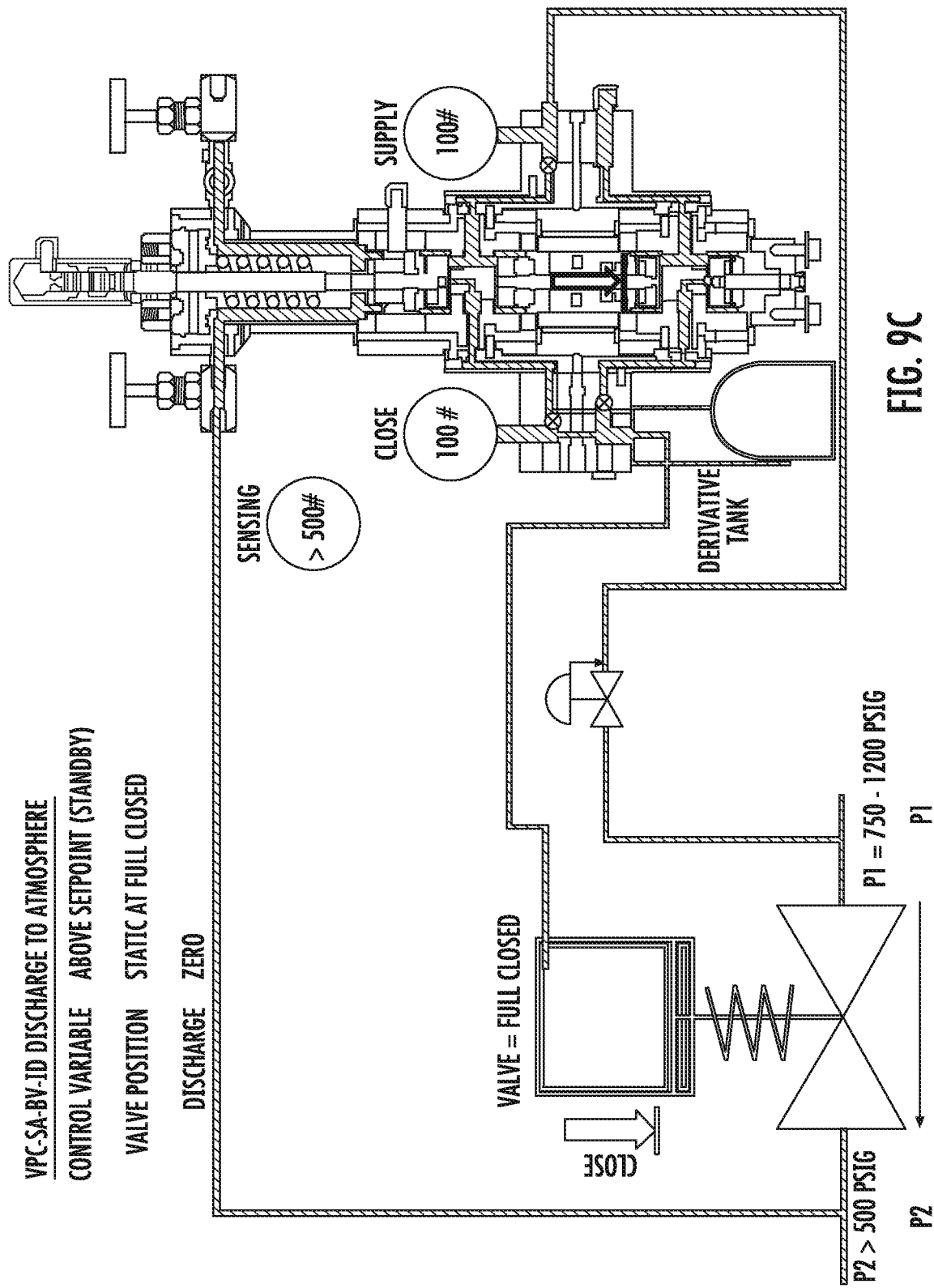
Figure 9D:
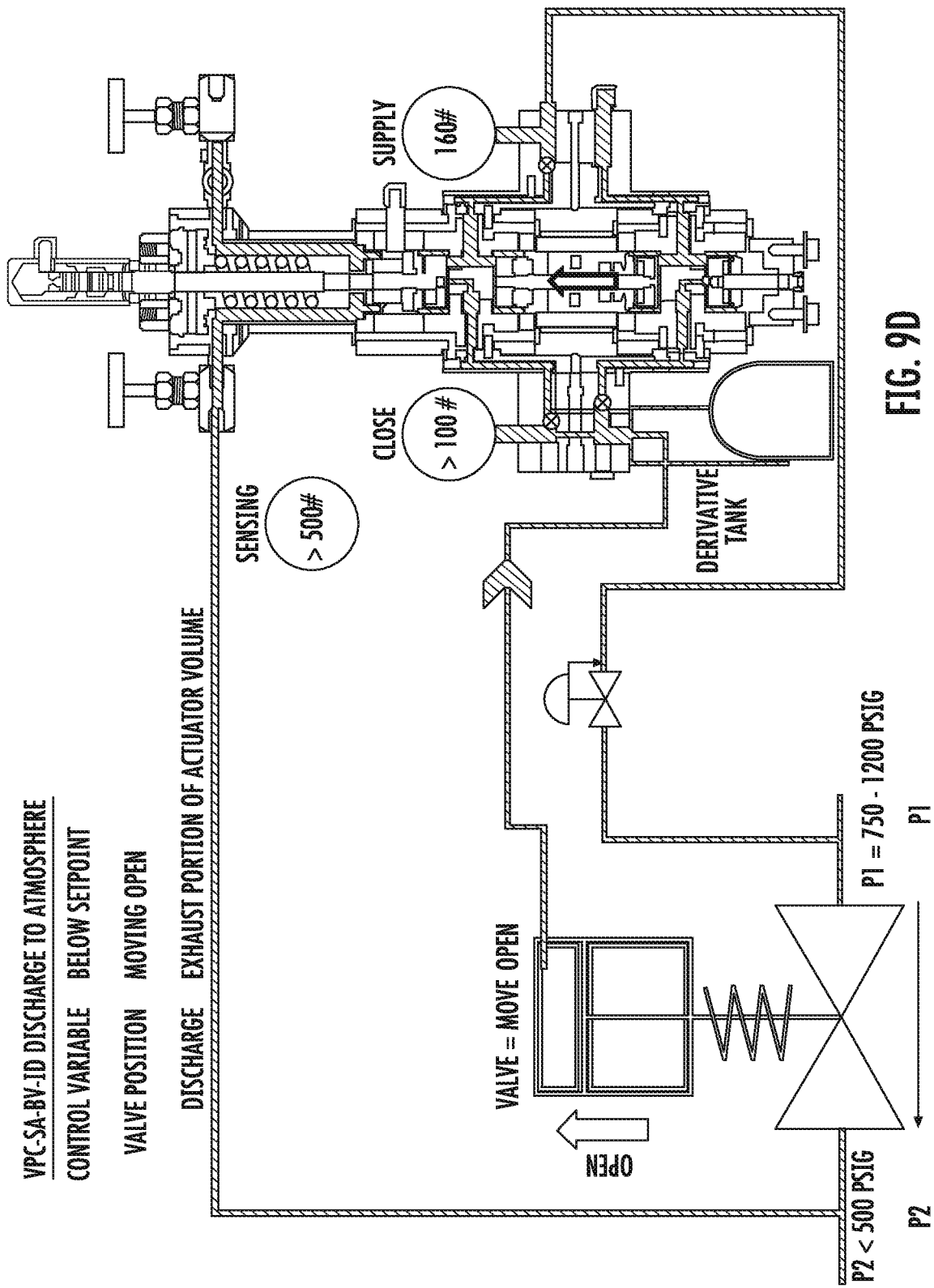
Figure 9E:
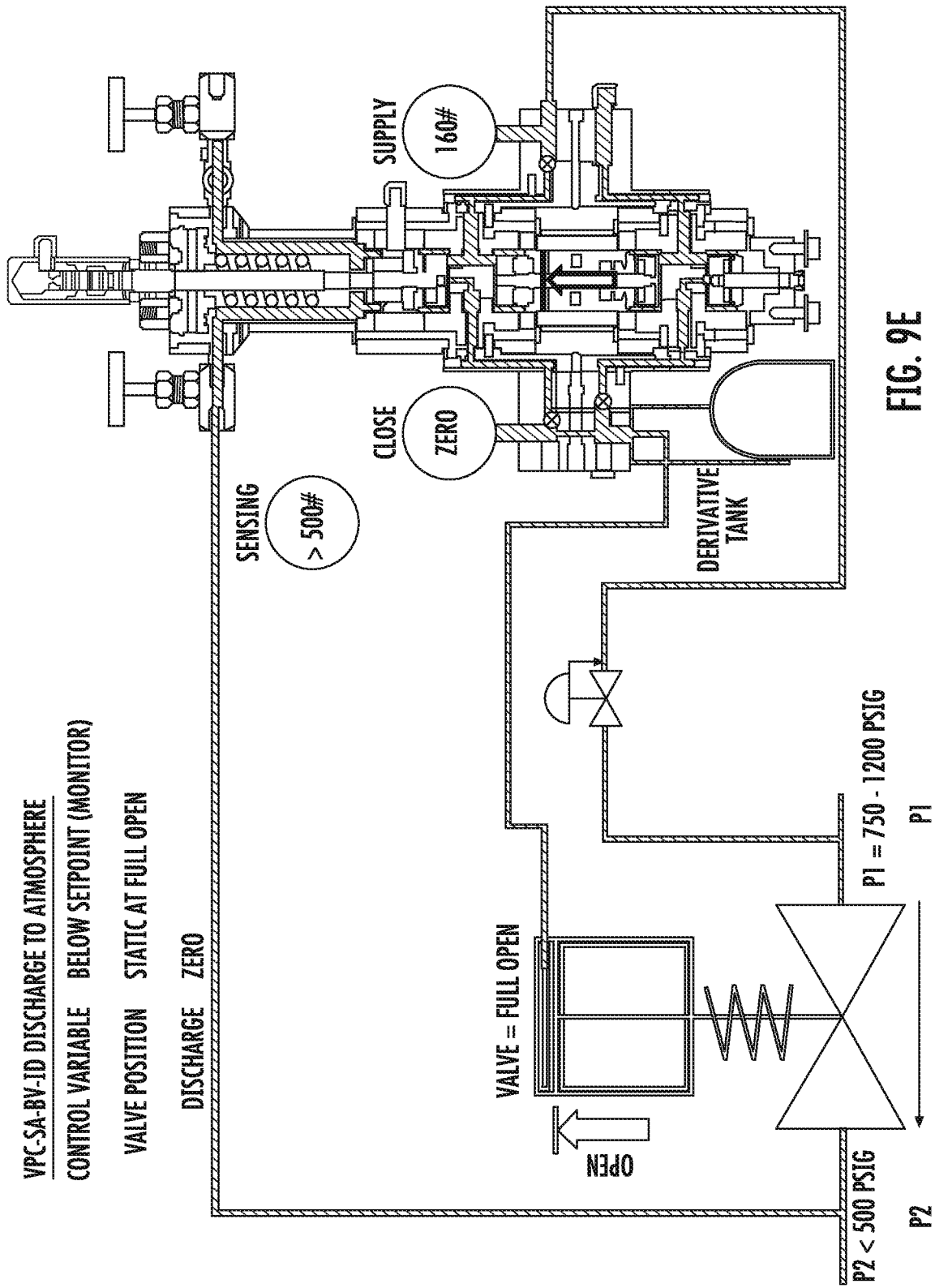

FIG. 6 illustrates the resulting corrective action of the open process control valve.

Remaining with double-acting VPC model of FIGS. 2-6, a step-wise operation of an embodiment of the system 10 is provided below.

Figure 2:
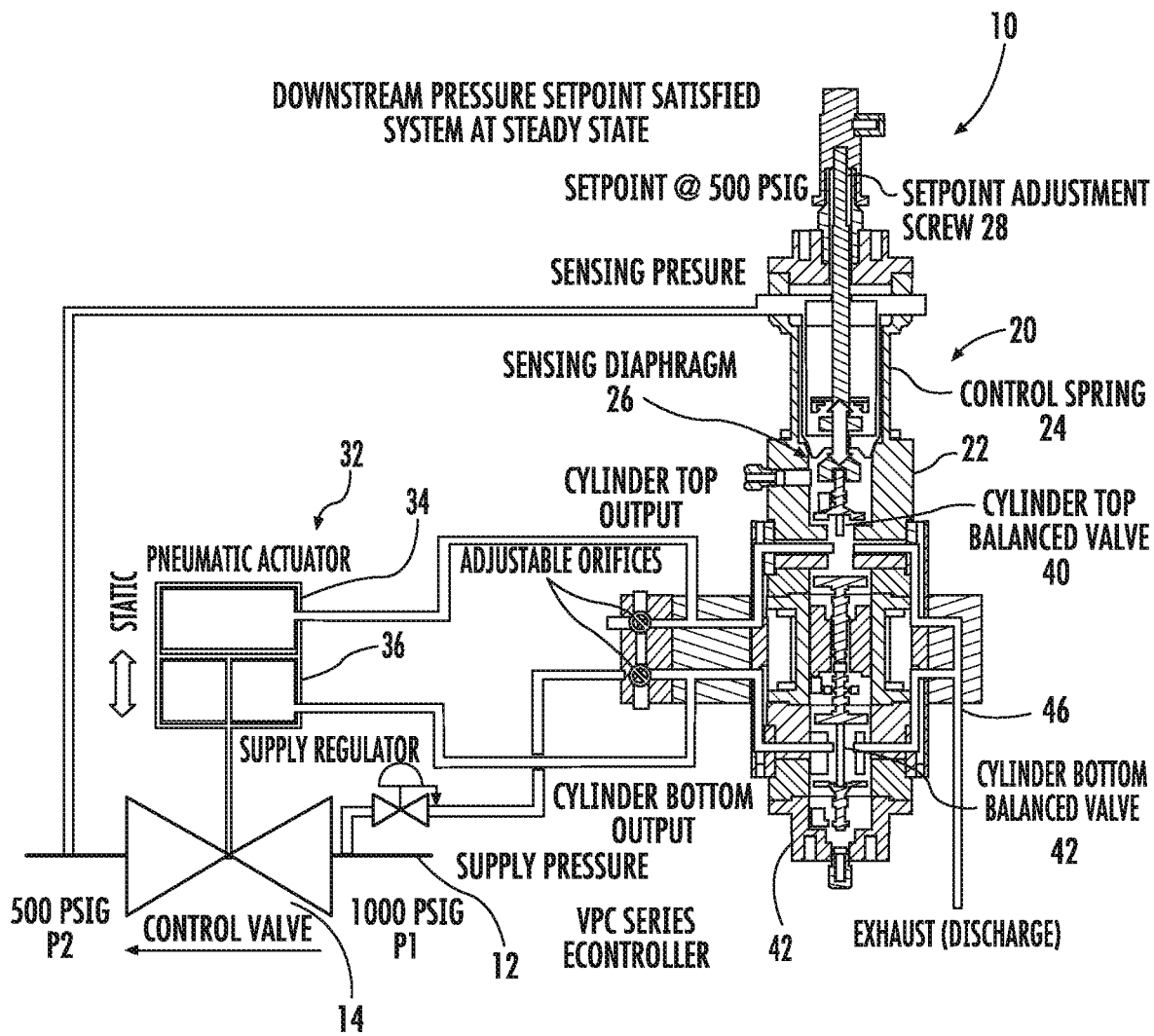
FIG. 2 is a schematic of an embodiment of a double-acting system with two normally-closed loading valves illustrating a condition where the downstream pressure set-point is satisfied and the system is in a steady state with the process control valve at a first position.

With reference to FIG. 2, the following is illustrated:
a. The energy to operate the actuated process control valve 14 is obtained from the differential between supply gas pressure and exhaust pressure.
b. When the downstream pressure (P2) is equal to a set-point a force equilibrium will exist between the VPC sensing diaphragm 26 and the control spring 24.
c. The force equilibrium results in the VPC internal mechanism 16 being centered.
d. With the VPC mechanism 16 centered, the first loading valve 40 and the second loading valve 42 remain closed and full supply pressure passes through the adjustable orifices, 44A and 44B, and load both pressure chambers 34 and 36 of the pneumatic actuator 32 equally.
e. At the steady state centered position, the VPC 20 achieves ZERO steady exhaust.

Figure 3:
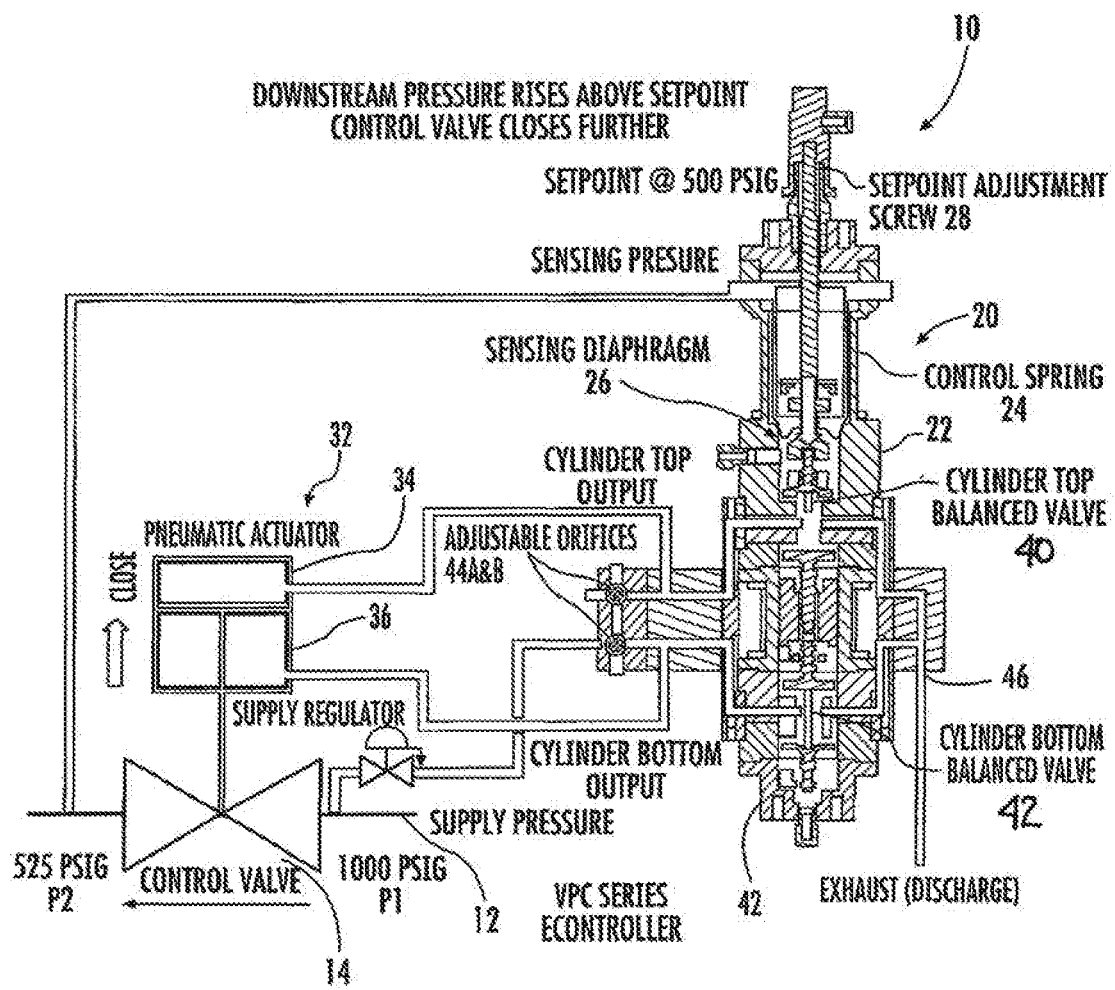
FIG. 3 is a schematic of the embodiment of FIG. 2 illustrating a condition where the downstream pressure rises above a set-point and the process control valve reacts to close further.

With reference to FIG. 3, the following is illustrated:
a. When the downstream pressure (P2) is rises above set-point the VPC sensing diaphragm 26 force will exceed the control spring 24 force.
b. The downward force imbalance results in the VPC internal mechanism 16 shifting downward.
c. With the VPC internal mechanism 16 shifting downward, the first loading valve 40 will open slightly and second loading valve 42 will remain closed.
d. When the first loading valve 40 opens it causes the pressure loading the first pressure chamber 34 of the pneumatic actuator 32 to be directed to the exhaust 46.
e. The second loading valve 42 remains closed causing full supply gas pressure to pass through the adjustable orifice 44 loading the second pressure chamber 36 of the valve actuator 32.
f. With the pressure differential across the valve actuator 32, the process control valve 14 moves toward the CLOSED position.

With reference to FIG. 4, the following is illustrated:
a. When the process control valve 14 moves toward the CLOSED position, the downstream pressure will drop and return to a value equal to the set-point.
b. When the downstream pressure (P2) is equal to set-point, a force equilibrium will exist between the VPC sensing diaphragm 26 and the control spring 24.
c. The force equilibrium results in the VPC internal mechanism 16 being centered.
d. With the VPC internal mechanism 16 centered, the first loading valve 40 and the second loading valve 42 remain closed and full supply pressure passes through the adjustable orifices 44A and 44B and loads both pressure chambers, 34 and 36, of the pneumatic actuator 32 equally.
e. At the steady state centered position, the VPC 20 achieves ZERO steady exhaust.

Figure 5:
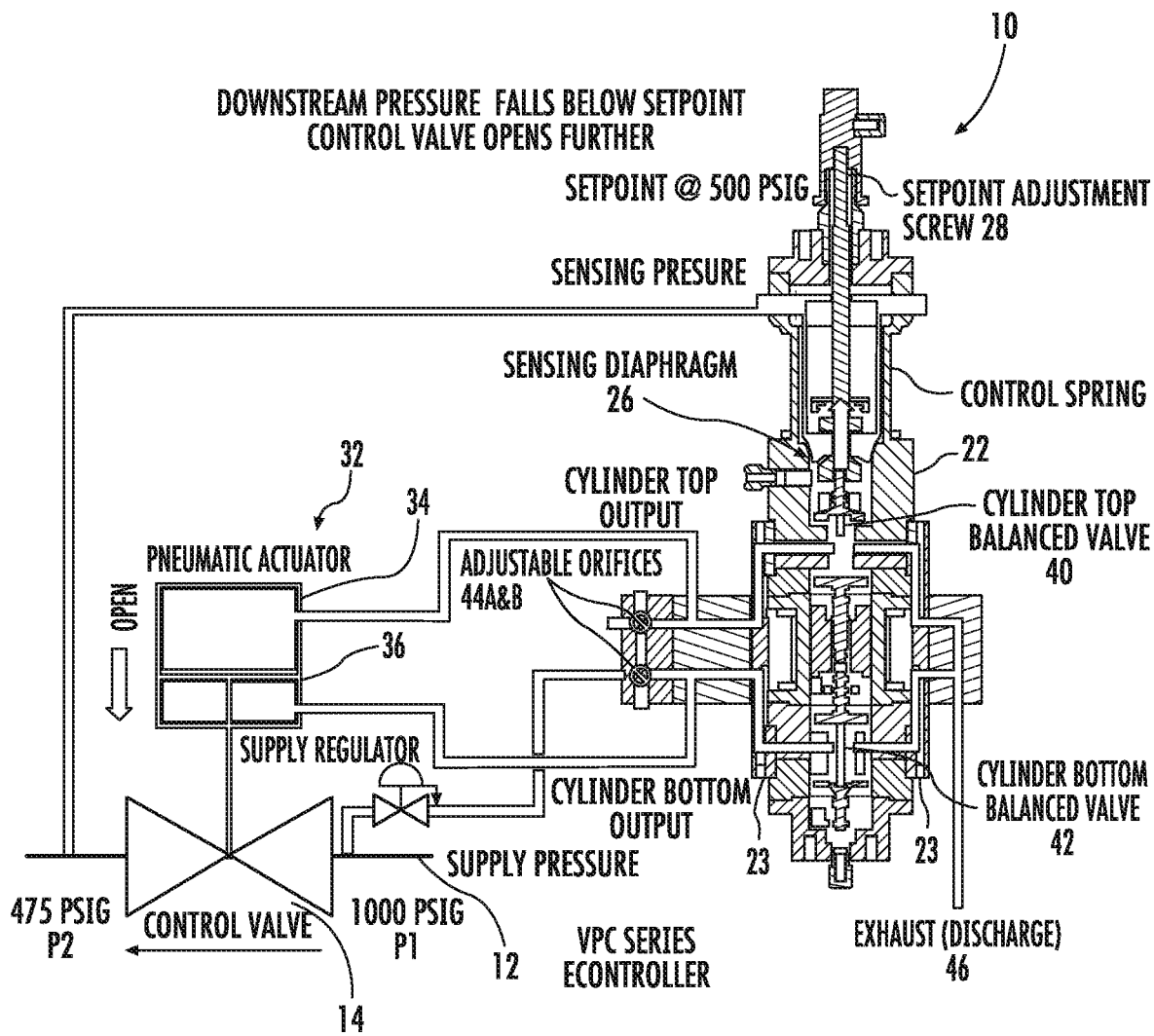
FIG. 5 is a schematic of the embodiment of FIG. 2 illustrating a condition where the downstream pressure falls below a set-point and the process control valve reacts to open further.

With reference to FIG. 5, the following is illustrated:
a. When the downstream pressure (P2) is falls below the set-point the VPC control spring 24 force will exceed the sensing diaphragm 26 force.
b. The upward force imbalance results in the VPC internal mechanism 16 shifting upward (as indicated by the arrow).
c. With the VPC internal mechanism 16 shifting upward, the second loading valve 42 will open slightly and first loading valve 40 will remain closed.
d. When the second loading valve 42 opens, it causes the pressure loading the second pressure chamber 36 of the pneumatic actuator 32 to be directed to the exhaust 46.
e. The first loading valve 40 remains closed, causing full supply gas pressure to pass through the adjustable orifice 44 loading the first pressure chamber 34 of the valve actuator 32.

f. With the pressure differential across the valve actuator 32, the process control valve 14 moves toward the OPEN position.
g. When the process control valve 14 moves toward OPEN position, the downstream pressure will rise and return to a value equal to the set-point.

With reference to FIG. 6, the following is illustrated:
a. When the downstream pressure (P2) is equal to a set-point, a force equilibrium will exist between the VPC sensing diaphragm 26 and the control spring 24.
b. The force equilibrium results in the VPC internal mechanism 16 being centered.
c. With the VPC internal mechanism 16 centered, the first and second loading valves, 40 and 42, remain closed and full supply pressure passes through the adjustable orifices, 44A and 44B, and loads both pressure chambers, 34 and 36, of the pneumatic actuator 32 equally.
d. At the steady state centered position, the VPC 20 achieves ZERO steady exhaust.

While FIGS. 2-6 illustrate and the above describes a double-acting actuator operated process control valve using normally-closed loading valves, it should be understood that systems using the normally-open loading valves operate similarly. For example, the steady state and upset state conditions are illustrated in FIGS. 7A-E featuring a VPC with normally-open valves.

Operation of Single-Acting VPC System

Similarly, referring to FIGS. 8A-E and 9A-E, a single-acting version can be used and works similarly. A notable difference is that the first loading valve 40 and the second loading valve 42 would be connected in common and would work synchronously. These valves, 40 and 42, would still be normally closed and would translate to "cylinder load" and "cylinder unload."

That is, for single-acting systems where a single pressure output is involved, there shall be one valve designated as the "load" valve and one valve designated as the "unload" valve. Each valve shall be normally closed for this type of system. The "load" and "unload" valves are connected to a common pressurized system. In this configuration, the VPC 20 has three different states: (1) steady state; (2) unloading state; and (3) loading state.

In the steady state, both the "load" and "unload" valves are closed, resulting in no pressurizing or depressurizing of the pneumatic actuator system. The process control valve 14 is said to be in a steady state or static.

When an upset in the process variable occurs, the VPC 20 may enter the unload state or loading state. In the unload state, the force unbalance between the VPC sensing diaphragm 26 and the control spring 24 causes a shift of the VPC 20 to open the "unload" valve and maintain the "load" valve in a closed position. This causes the system 10 to vent or exhaust pressure from the pneumatic actuator 32 resulting in a new position of the process control valve 14. Conversely, when an upset occurs to place the VPC 20 in the "loading" state, the unbalance between the sensing diaphragm 26 and the control spring 24 causes a shift of the VPC 20 to open the "load" valve and keep the "unload" valve closed. This causes the system 10 to increase pressure to the pneumatic actuator 32 resulting in a new position of the process control valve. Ultimately, in both cases, the new position of the process control valve 14 will result in attainment of equilibrium and return to the steady state, as described above.

Additionally, in the single-acting (SA) model of the VPC, when the sensing pressure is equal to the VPC set-point, the net force on the VPC power module 22 is zero. As noted, this is an equilibrium condition where the sensing pressure that pushes down on the sensing diaphragm 26 and the force of the control spring 24 that pulls up on the sensing diaphragm 26 are equal. When the VPC 20 achieves this equilibrium, the supply loading valve 40 and exhaust loading valve 42 will remain closed maintaining a constant output pressure to the process control valve 14. The VPC 20 will exhibit zero emissions at this state.

During operation, the equilibrium or steady state (static) is preferred, so the system operates to return to this state whenever an upset occurs. As noted, two possible scenarios can occur from the balance state: the sensing pressure can rise above the set point or fall below the set point. If the sensing pressure rises above the VPC set-point, the net force on the VPC power module is downward. The exhaust loading valve will close or stay closed. The supply loading valve opens, increasing the flow of supply gas to the output port. The combination of these actions creates a rise in output pressure. If the sensing pressure falls below the VPC set-point the net force on the VPC power module is upward. Now the supply loading valve will close or stay closed and the exhaust loading valve opens, increasing the flow of gas to the exhaust port. The combination of these actions decreases the output pressure. In order to control how much gas passes through the loading valve, adjustable orifices are installed to restrict the flow via the supply and the exhaust.

Modularity of VPC

A key aspect of the system 10 is the modularity of the VPC 20. A modular format of the VPC 20 is illustrated in FIG. 1. The modular format of power modules 30 and the internal loading valve logic (FIG. 10) provide the ability to configure the device for double-acting (DA) output or single-acting (SA) output within the same system. Existing technology does not offer a modular format that allows reconfiguration between the double-acting output and single-acting output configurations.

Accordingly, the VPC 20 is capable of being configured in a number of different models as a result of the adaptability of the single platform power module 22 and the various "plug-and-play" modules. Exemplary embodiments of these "plug-and-play" modules (labeled 1-4) to form discrete VPC models (labeled 1-5, with corresponding labeled modules forming the particular VPC model) are set forth in FIG. 1. Each model 1-5 corresponds to a set of operating parameters referenced in TABLE 1 below. More detailed illustrations and descriptions of such modules and VPC models, as well as possible alternatives and accessory devices, follow.

TABLE 1

| | Controller Model | | | | |
|---|---|---|---|---|---|
| | VPC-SA-BV | VPC-SA-BV-ID | VPC-SA-BV-GAP | VPC-DA-BV | VPC-DA-SN |
| Type | Variable | Variable | Discrete (On-Off) | Variable | Variable |
| Outputs | Single Acting (1) | | | Double Acting (2) | |
| Internal Valve Logic | Normally-Closed Loading Valve | | | | Normally Open Loading Valve |
| Setpoint Range | 1.25-1500 psig (9.0-10,342 kPa) | | | | |
| Temperature Range | −20° F. to +160° F. (−29° C. to +71° C.) | | | | |

The various VPC models are so configured to be applicable to different fluid systems. In operation, the embodiments operate in a similar manner, with variations such as flow direction, valving, etc., dictated by the accompanying modules and accessory devices. And the simple modularity allows conversion between models. For example, the VPC has the ability to convert between a normally open loading valve style (SN) to normally closed loading valves (BV). Further, the manifolding provided by the power module 22 provides the ability to convert to and from single acting to double acting models. Additionally, when configured as a single acting model, the VPC can convert between "direct acting" and "reverse acting" control logic.

Referring to FIGS. 16-29 (A and B), the modularity of the VPC 20 can be most readily appreciated. In these figures the numerous VPC models are shown schematically placed within a fluid control system 10 (i.e., FIGS. 16A-29A) and labeled for adjusting the set-point screw 28 and sensitivity (i.e., FIGS. 16B-29B).

VPC Modules

Figure 14:
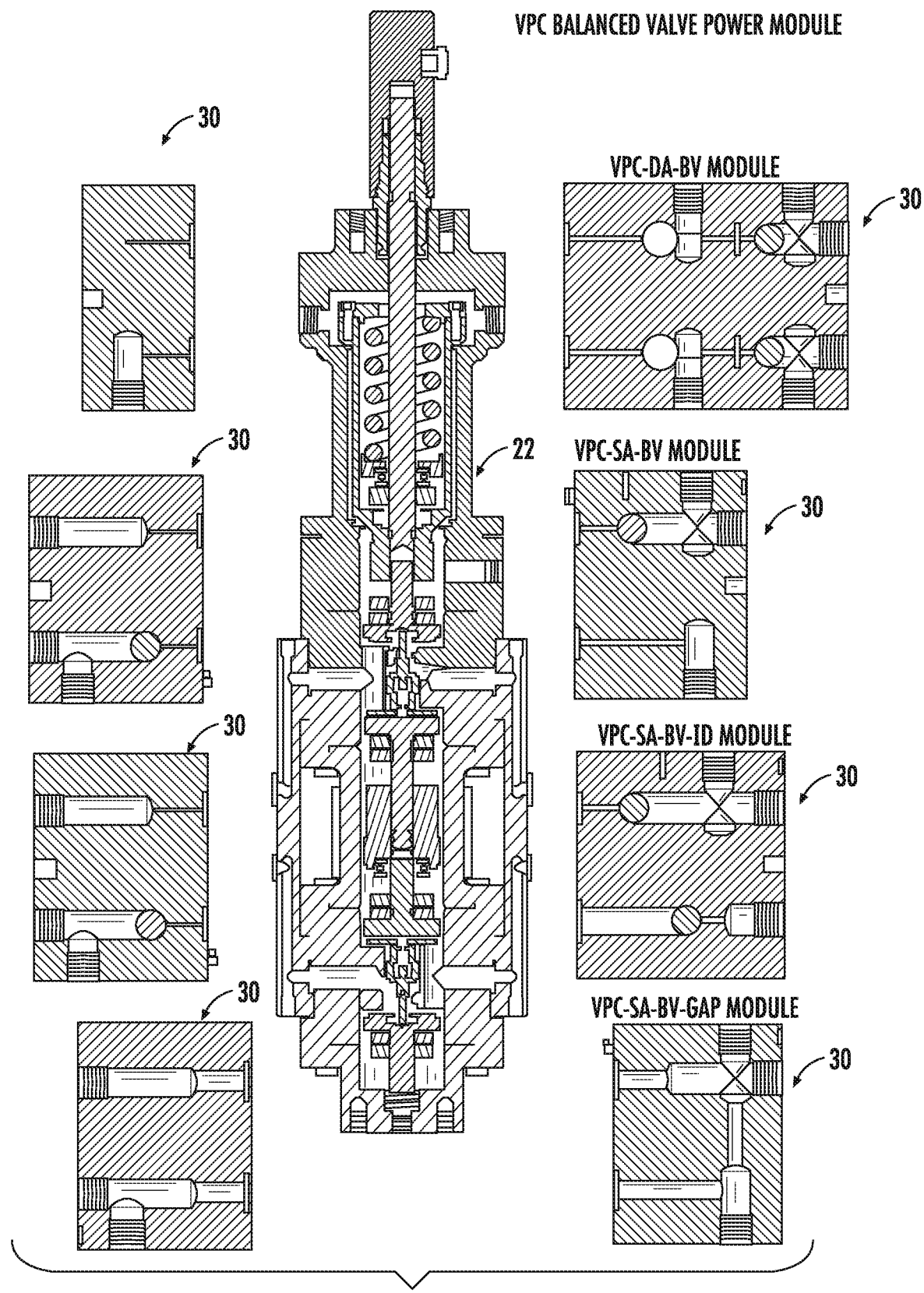
FIGS. 14 and 15 illustrate an embodiment of the VPC power module and the interchangeable manifolds.
Figure 15:
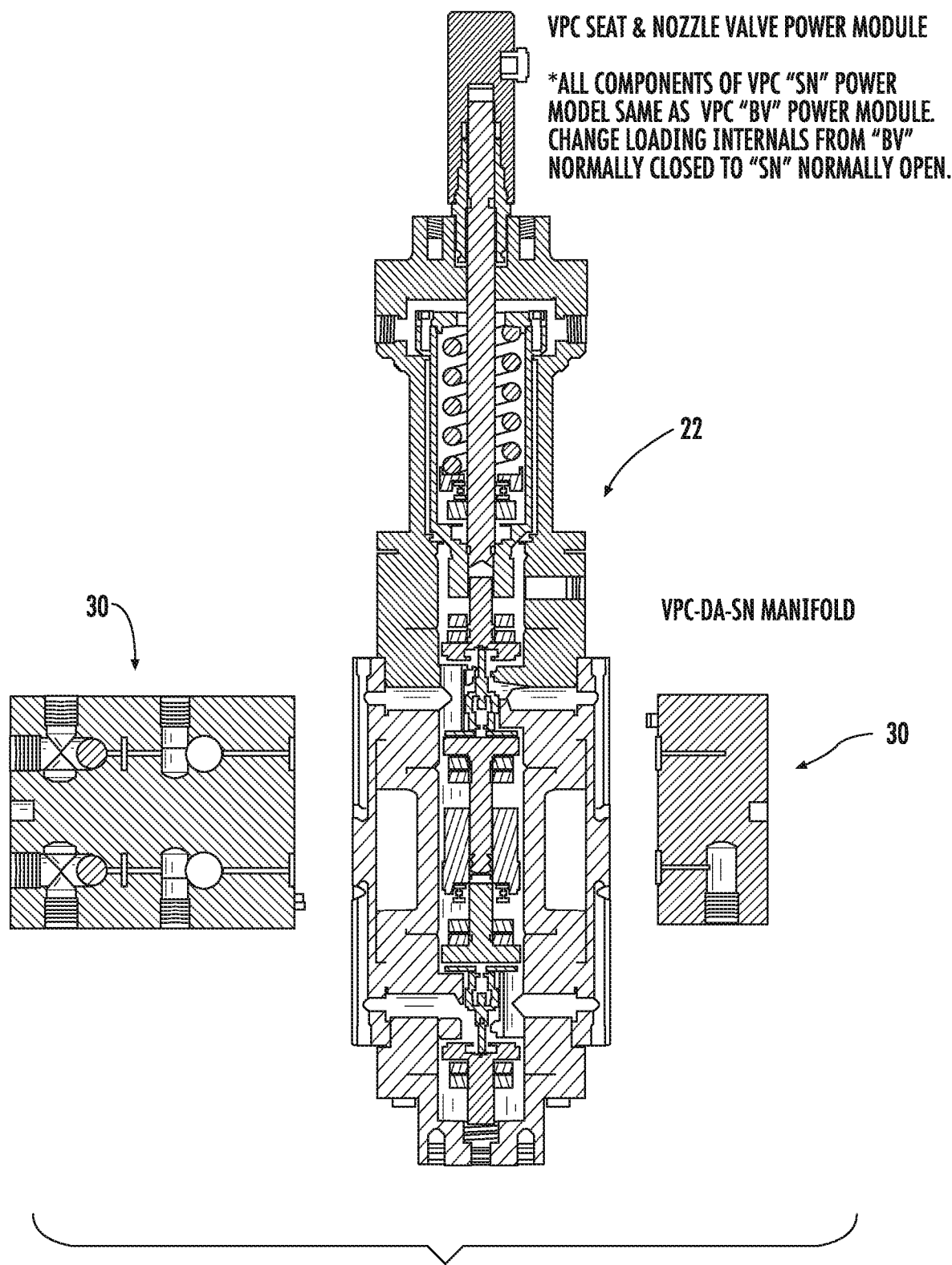
Figure 16A:
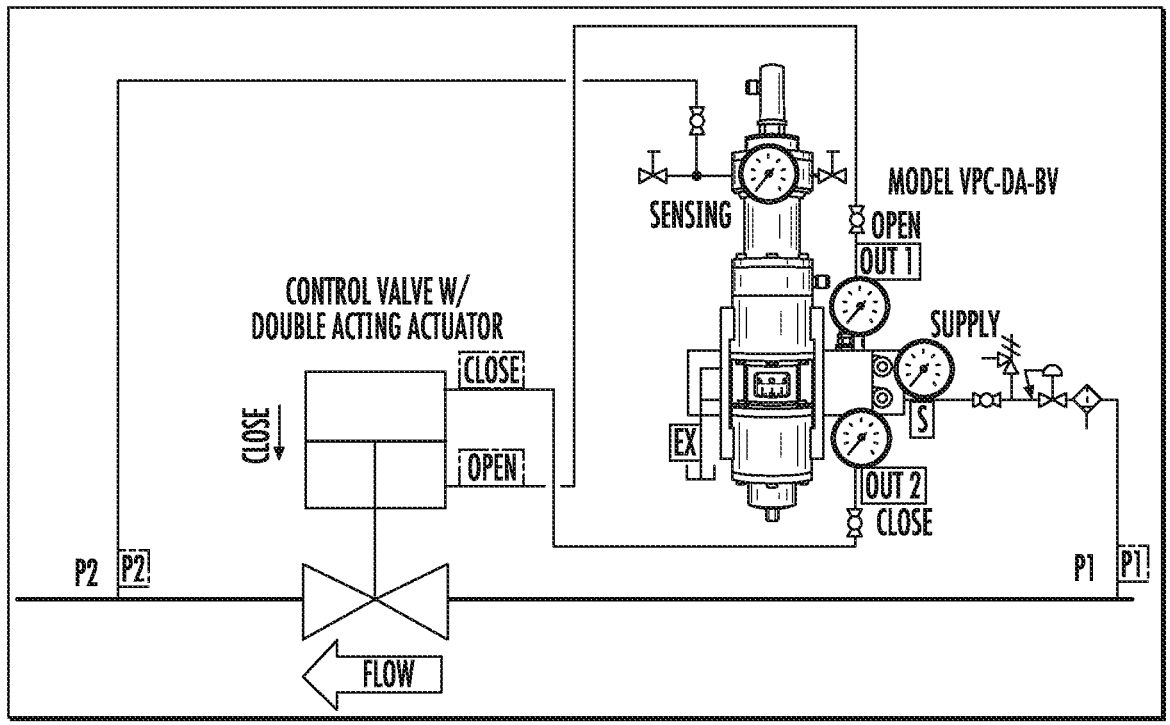
FIGS. 16A/B through 29A/B are schematics of the numerous system variations (FIGS. 16A-29A) and the corresponding VPC model (FIGS. 16B-29B).
Figure 16B:
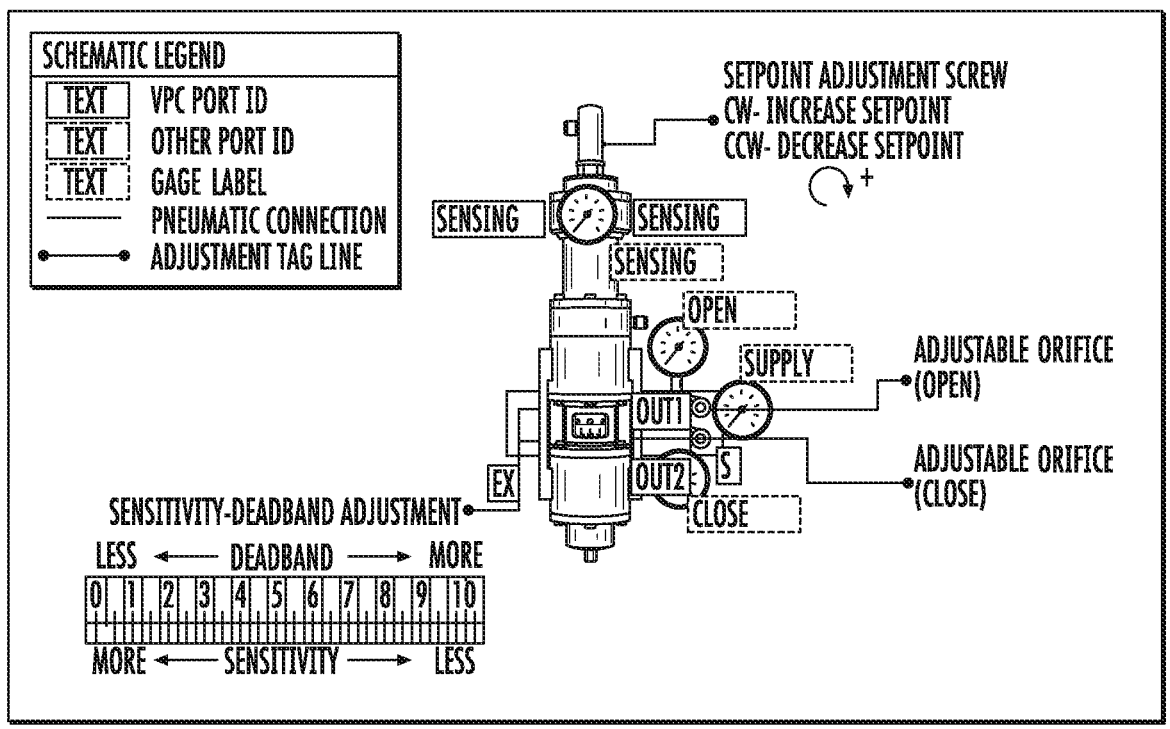
Figure 17A:
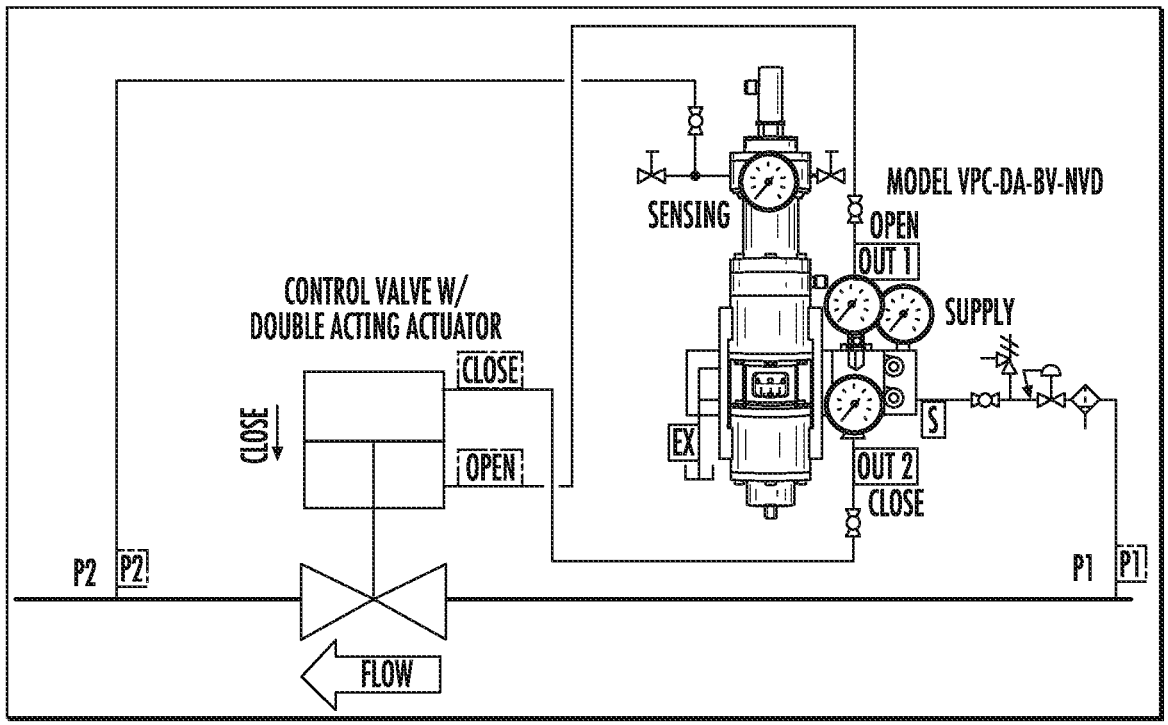
Figure 17B:
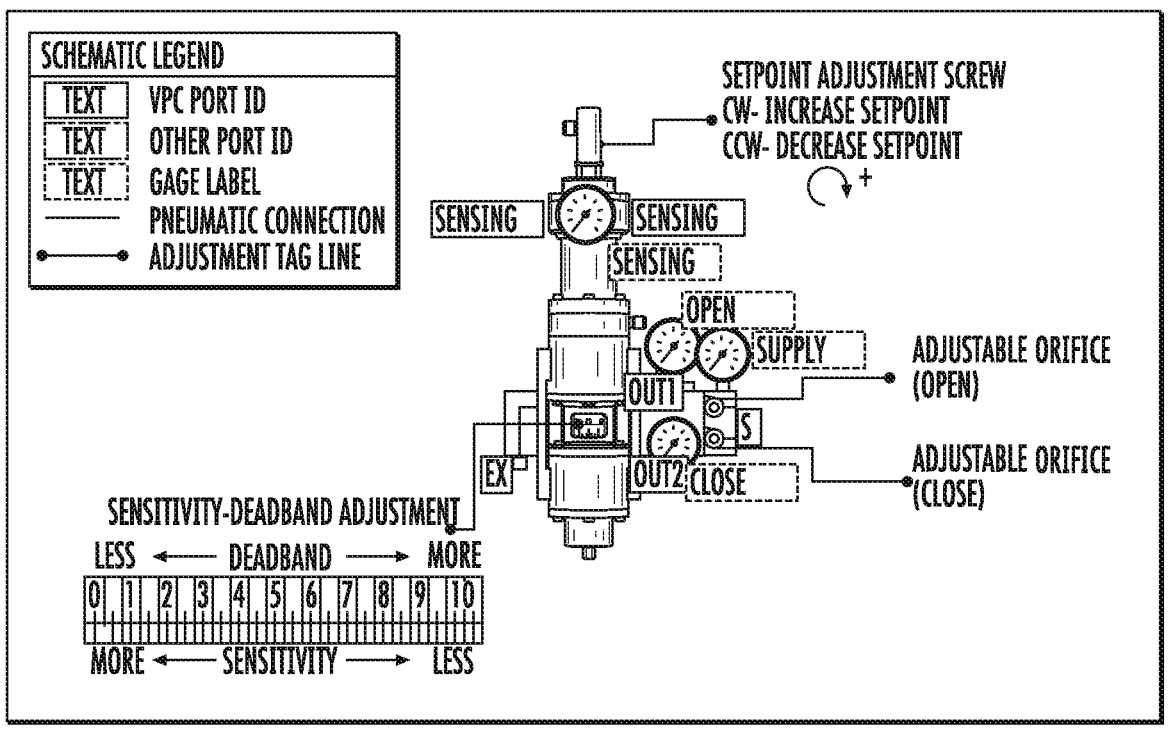
Figure 18A:
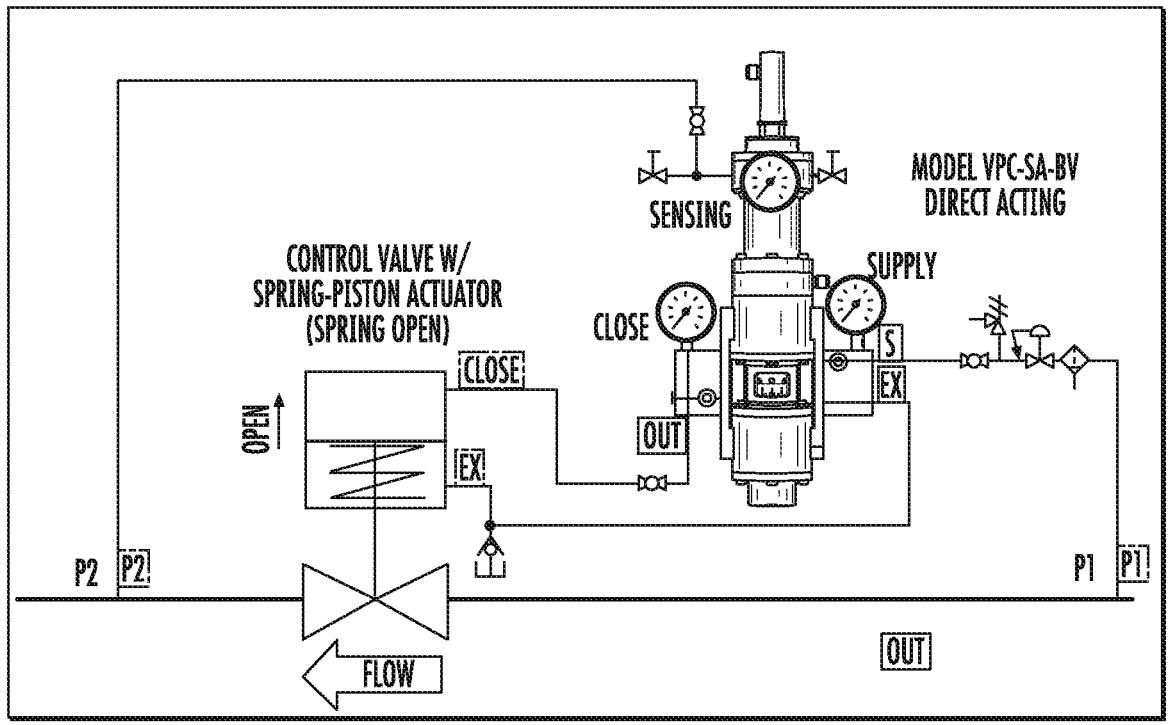
Figure 18B:
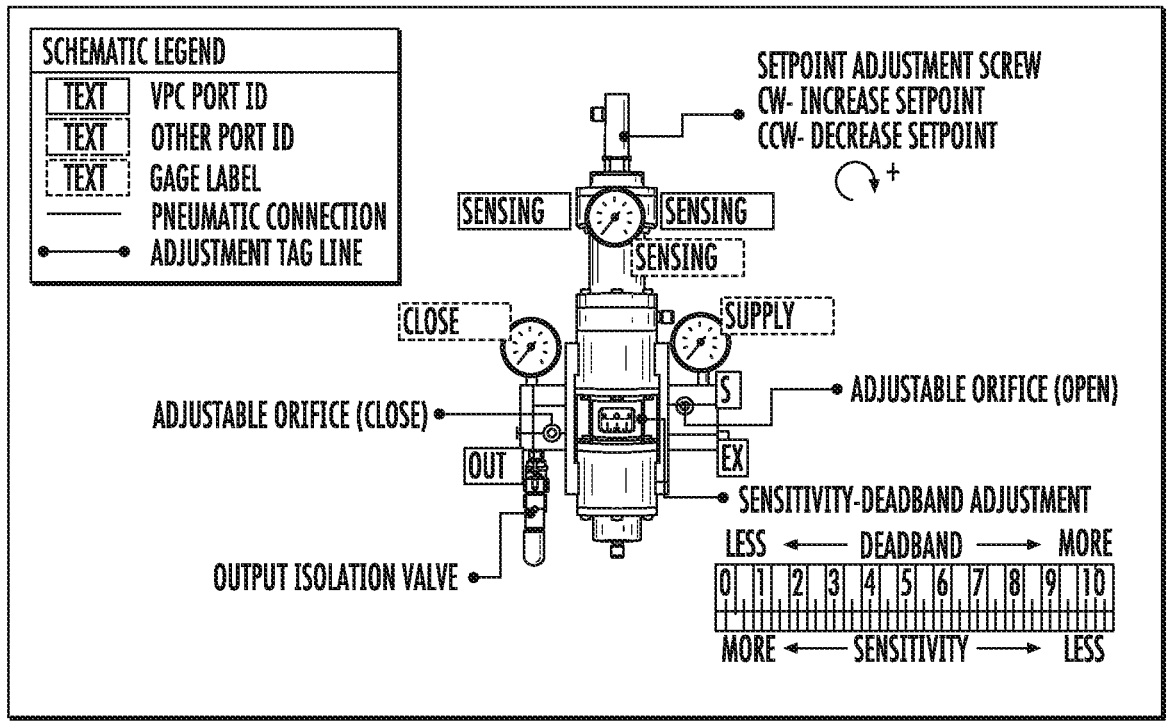
Figure 19A:
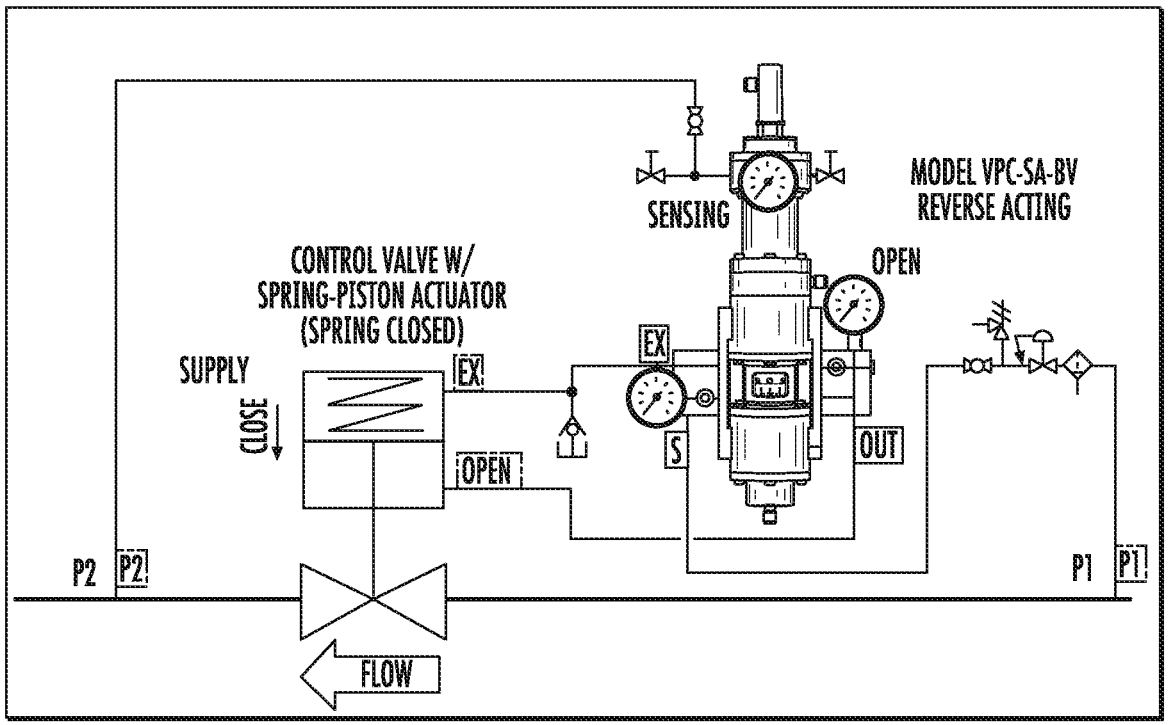
Figure 19B:
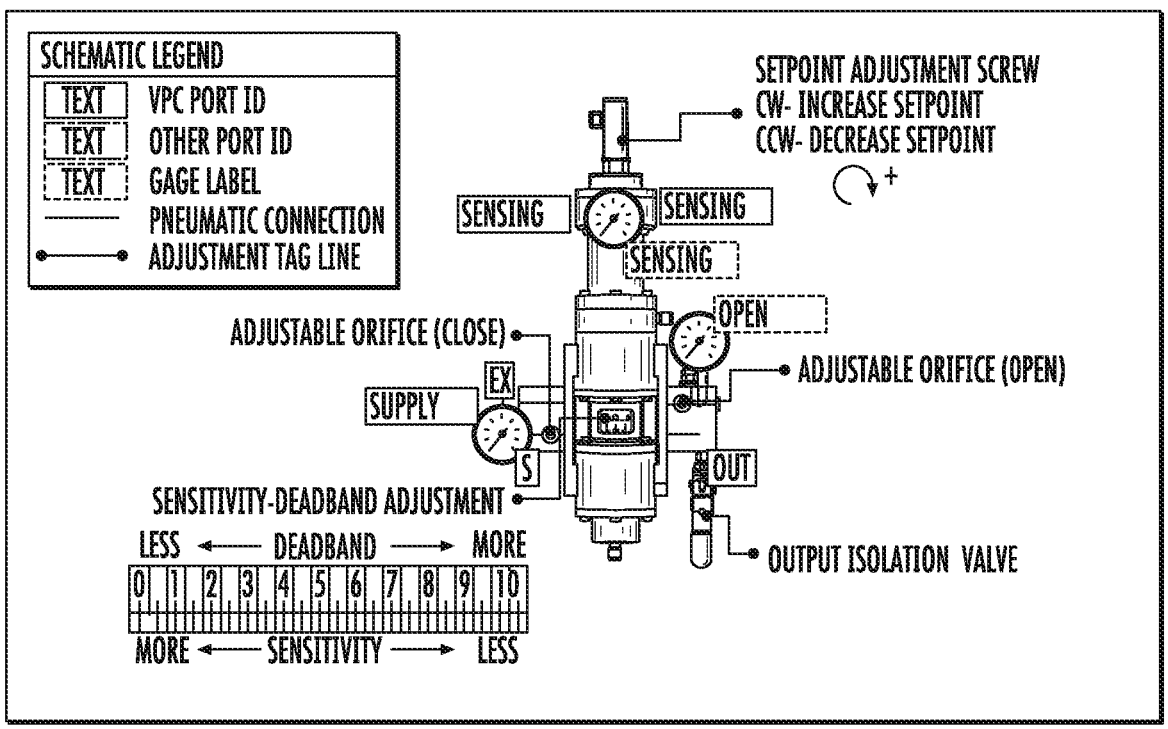
Figure 20A:
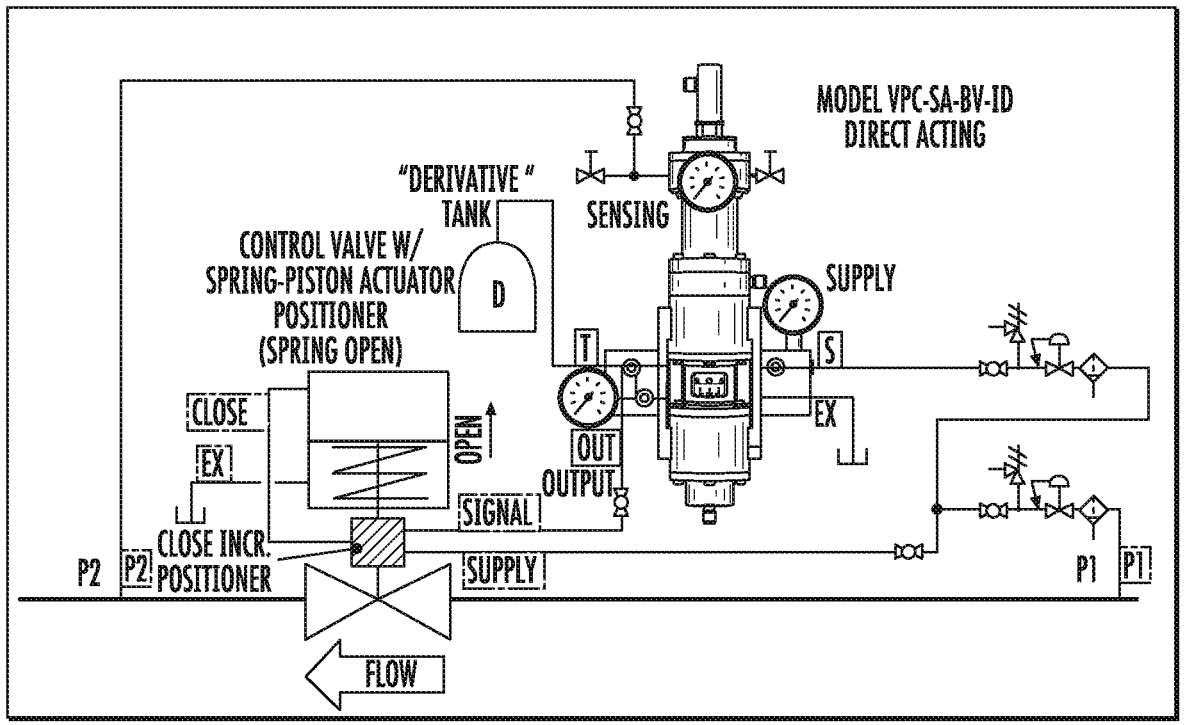
Figure 20B:
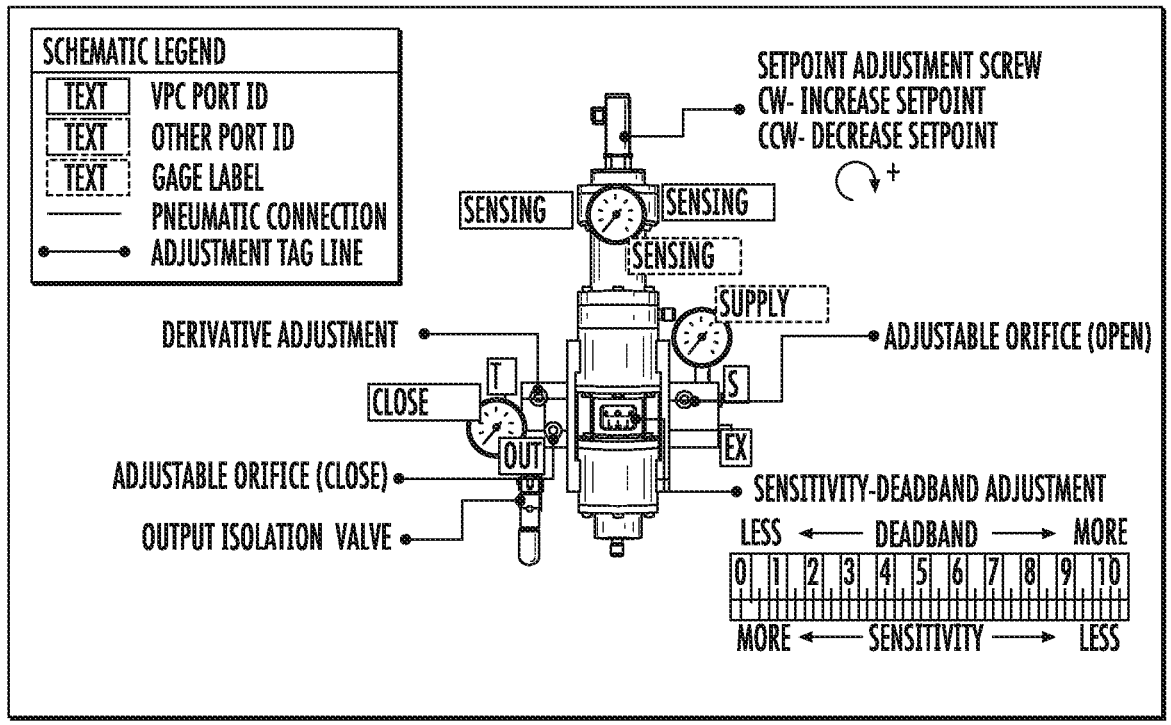
Figure 21A:
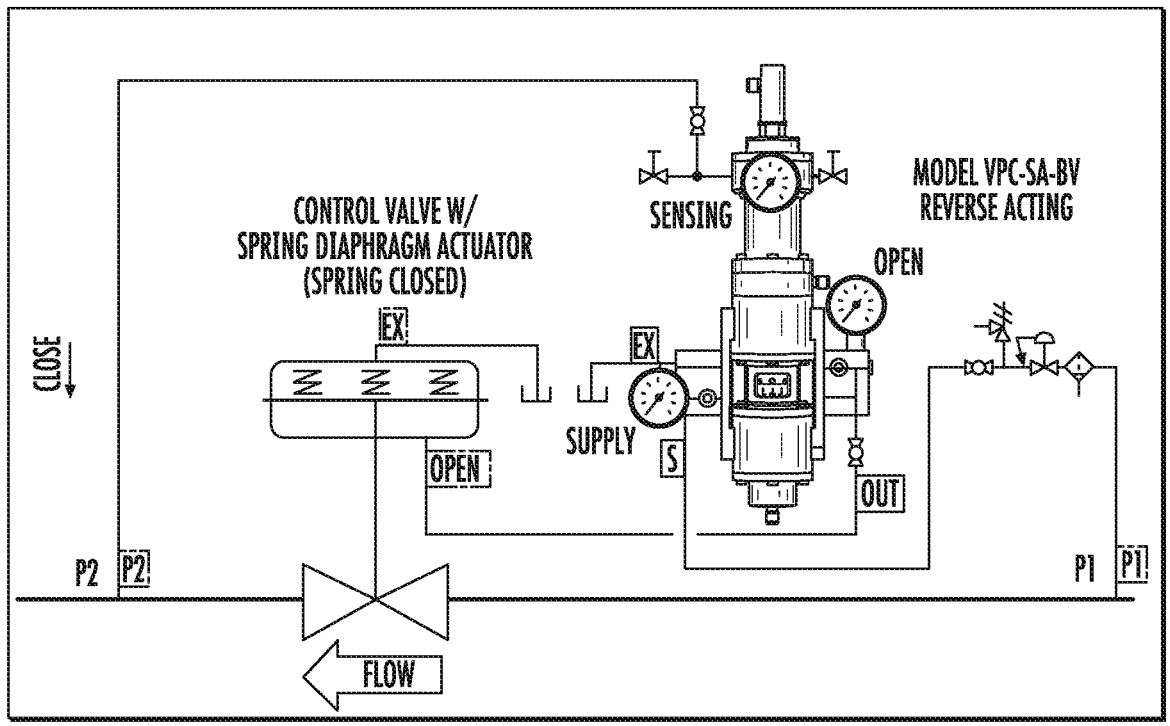
Figure 21B:
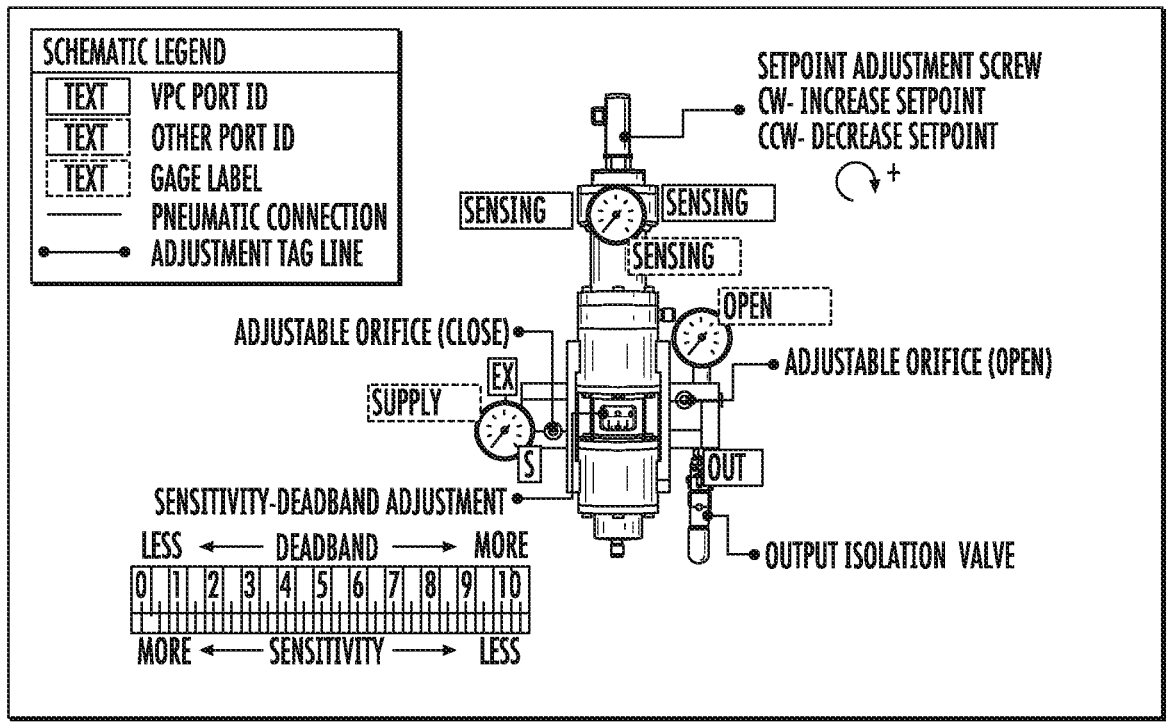
Figure 22A:
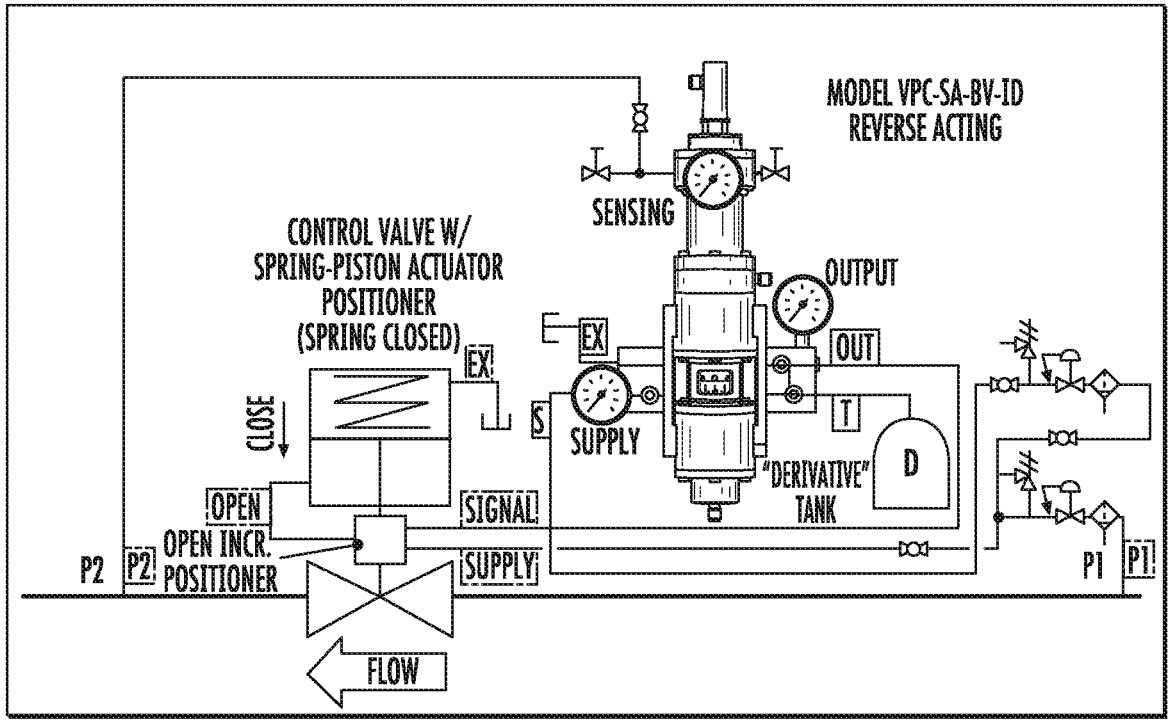
Figure 22B:
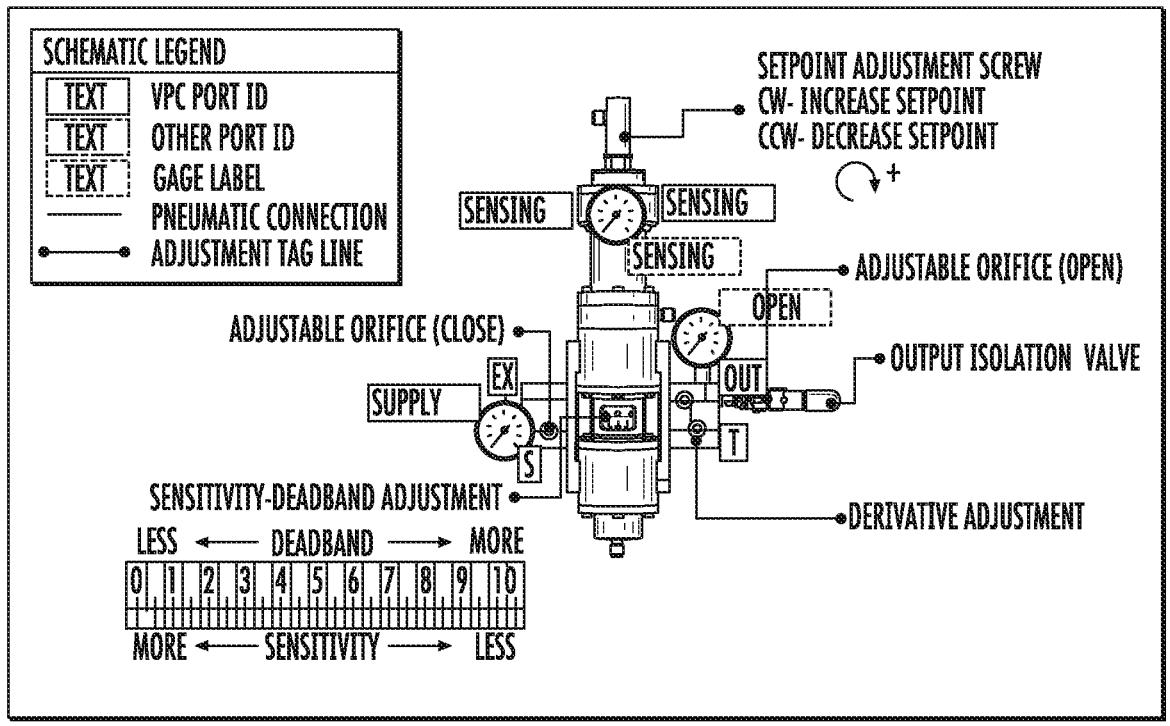
Figure 23A:
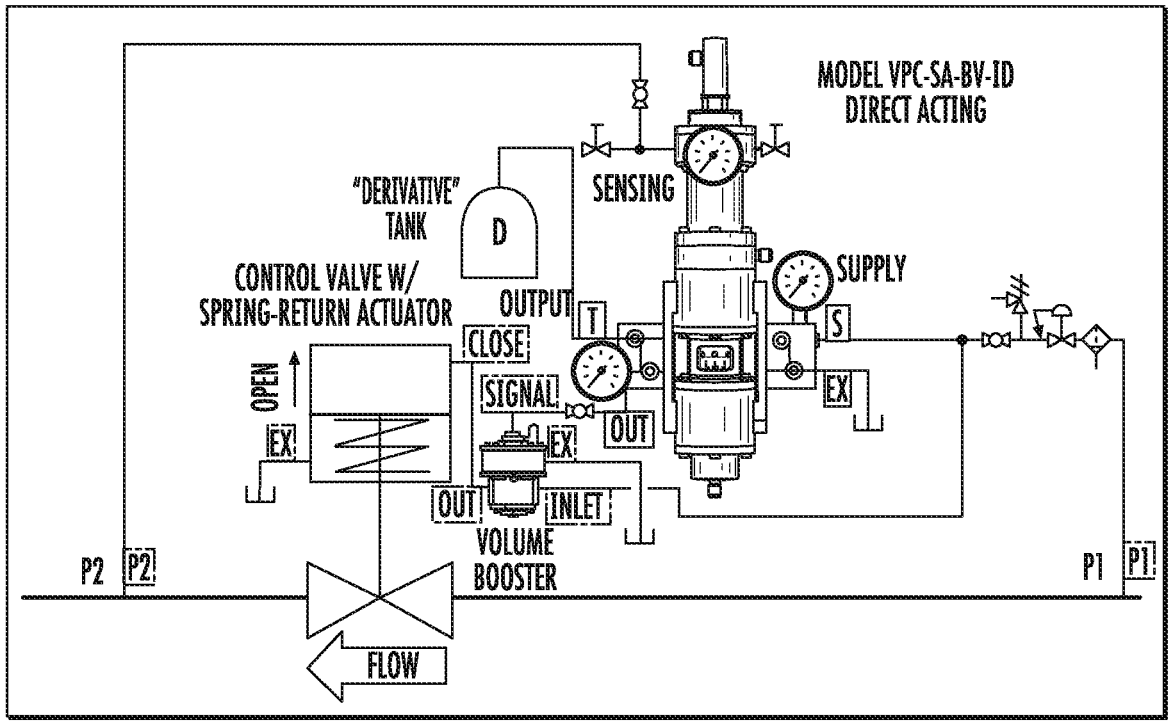
Figure 23B:
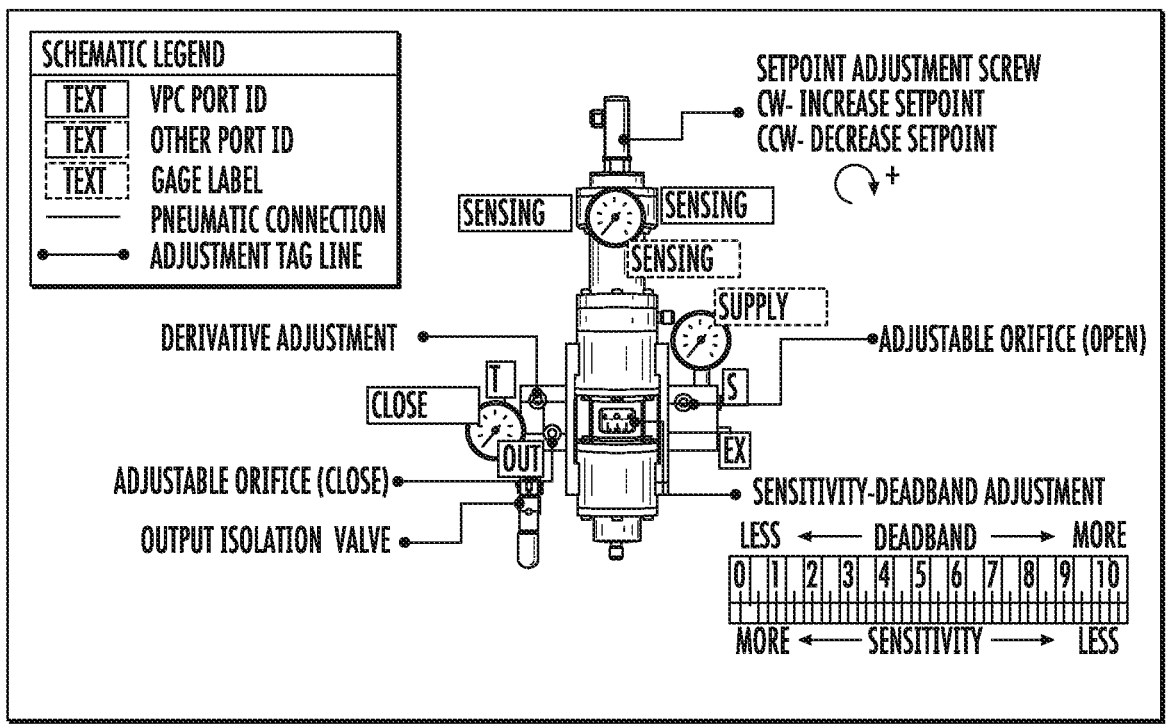
Figure 24A:
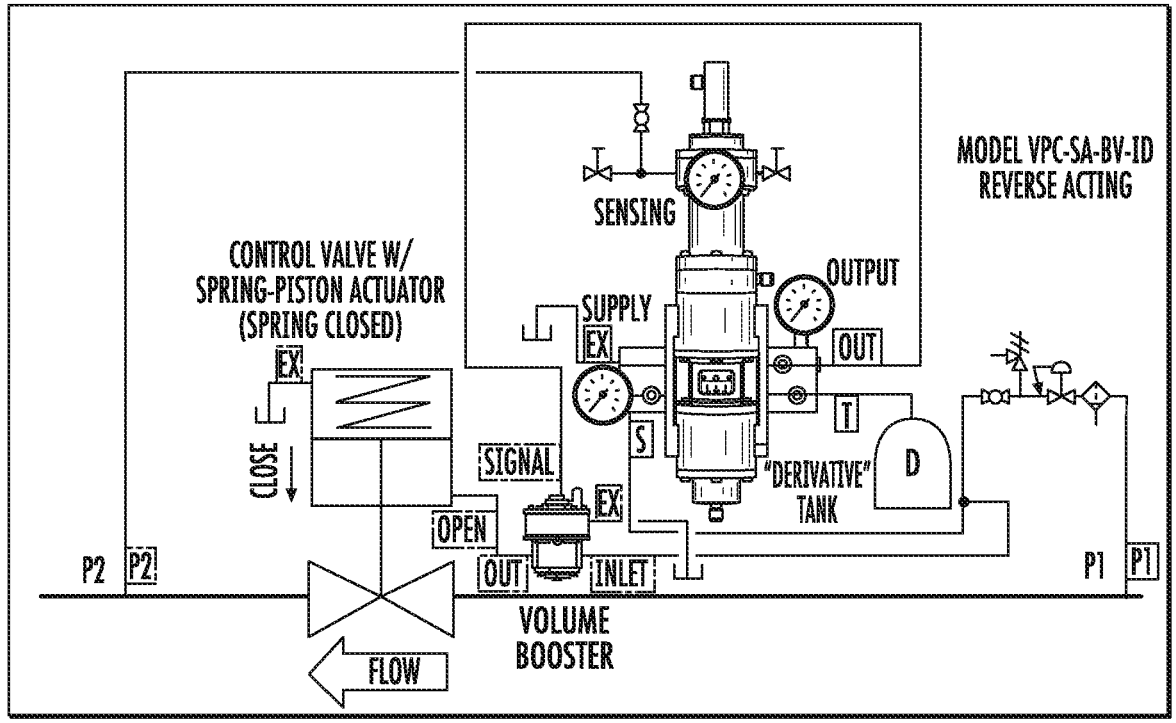
Figure 24B:
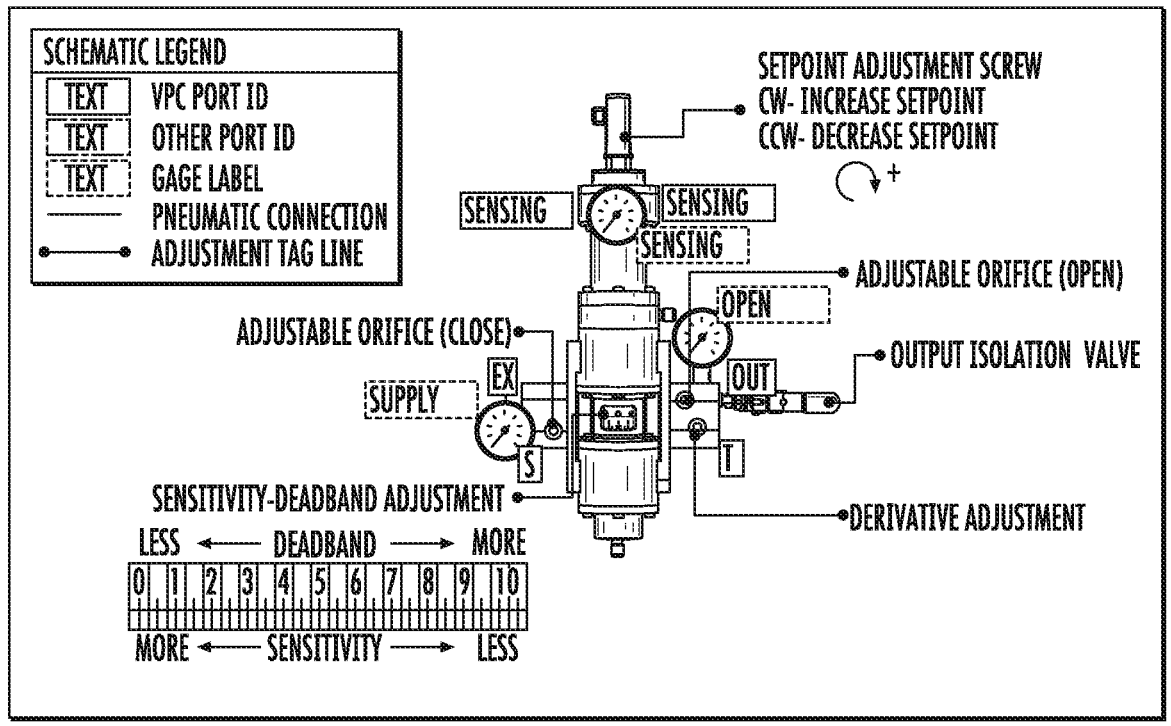
Figure 25A:
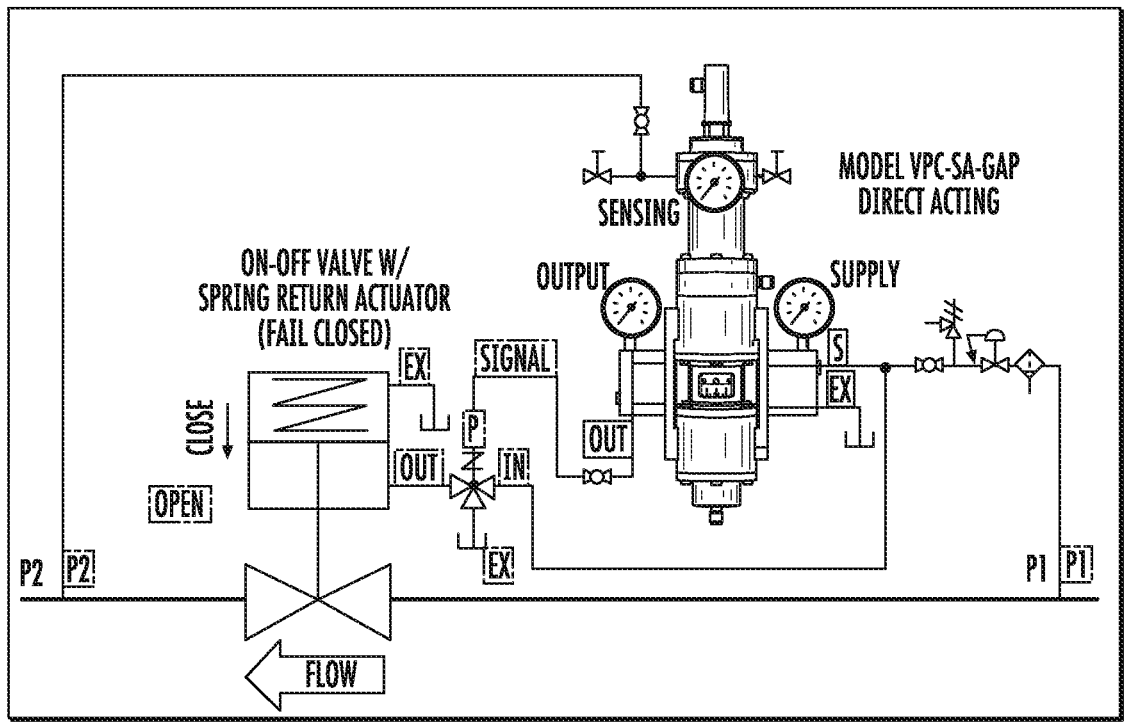
Figure 25B:
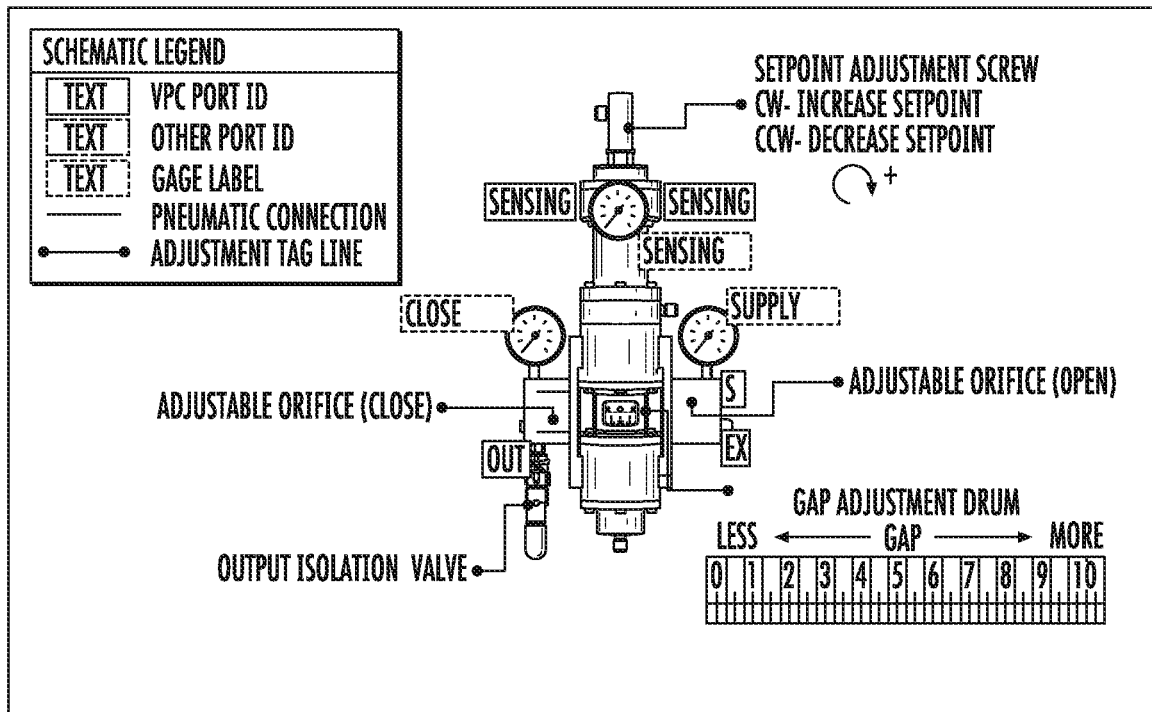
Figure 26A:
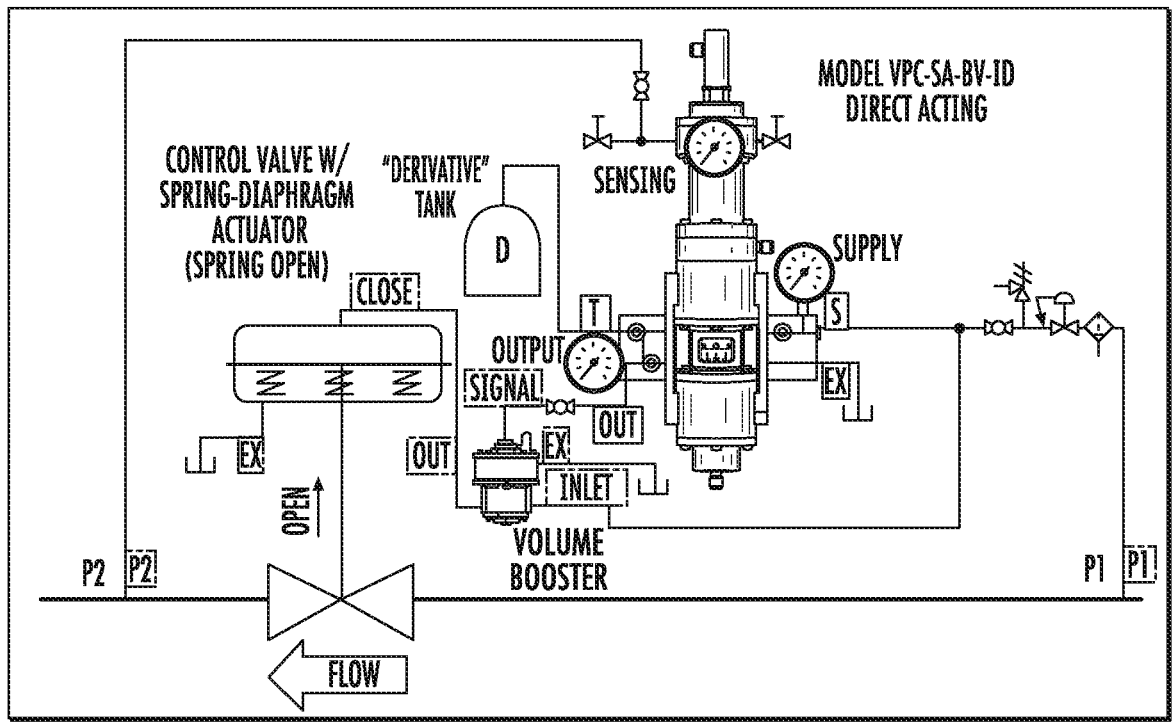
Figure 26B:
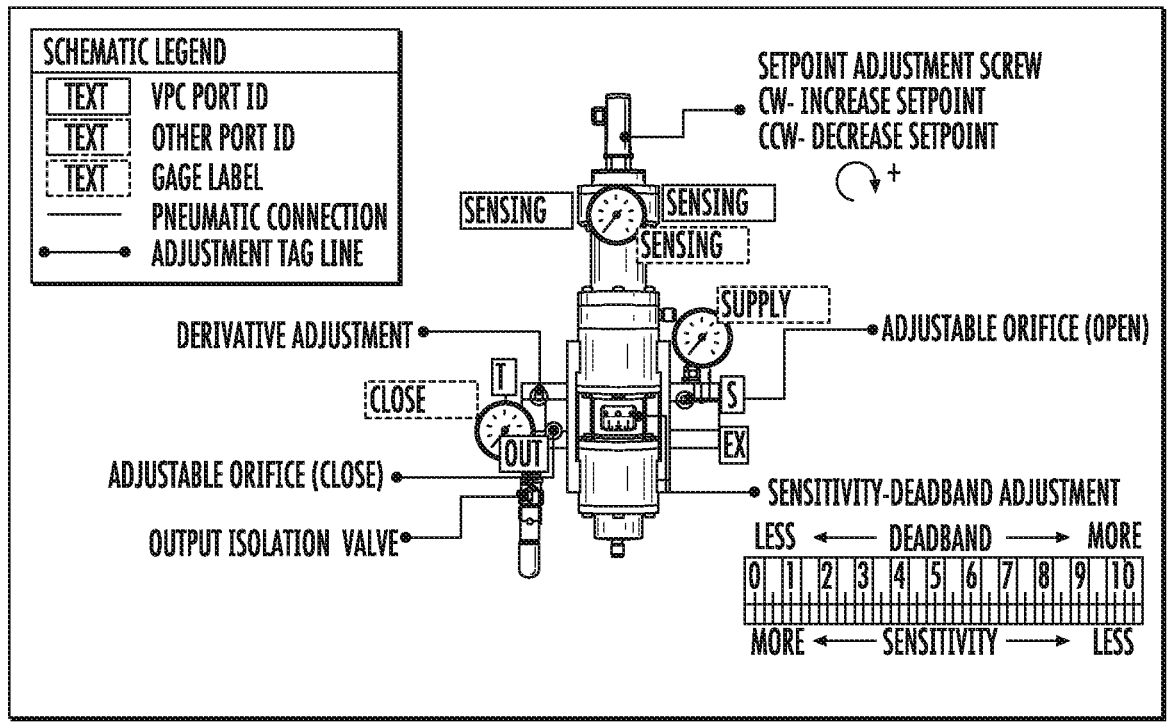
Figure 27A:
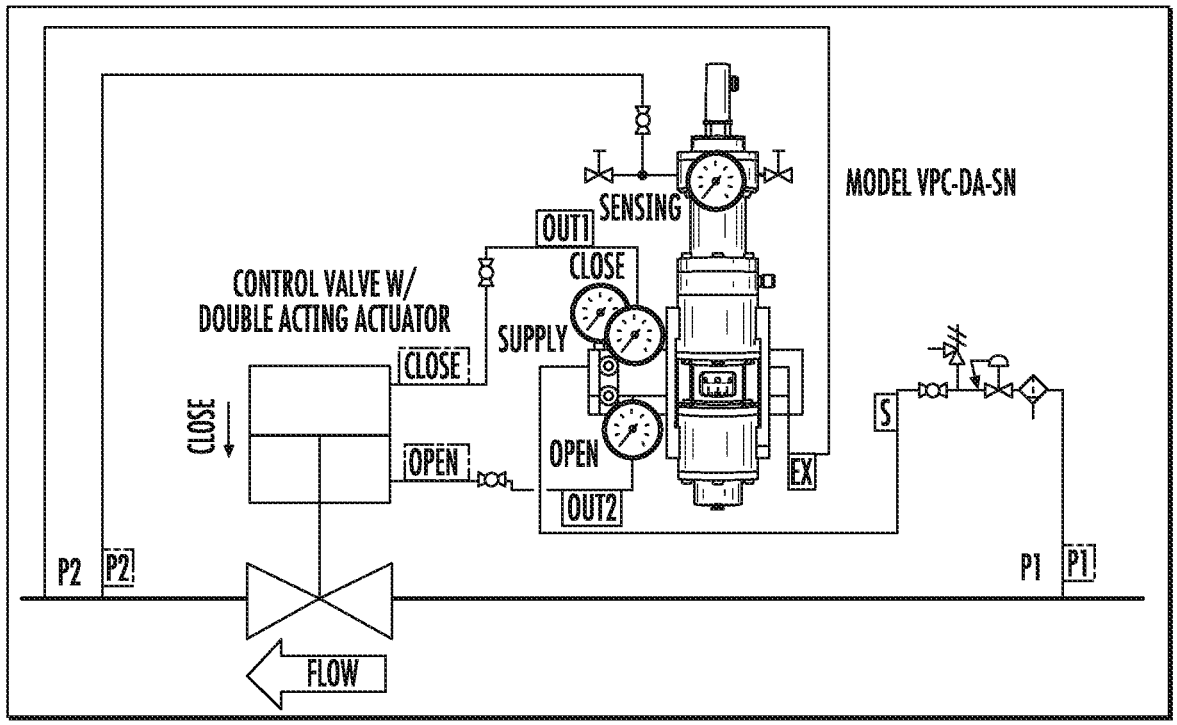
Figure 27B:
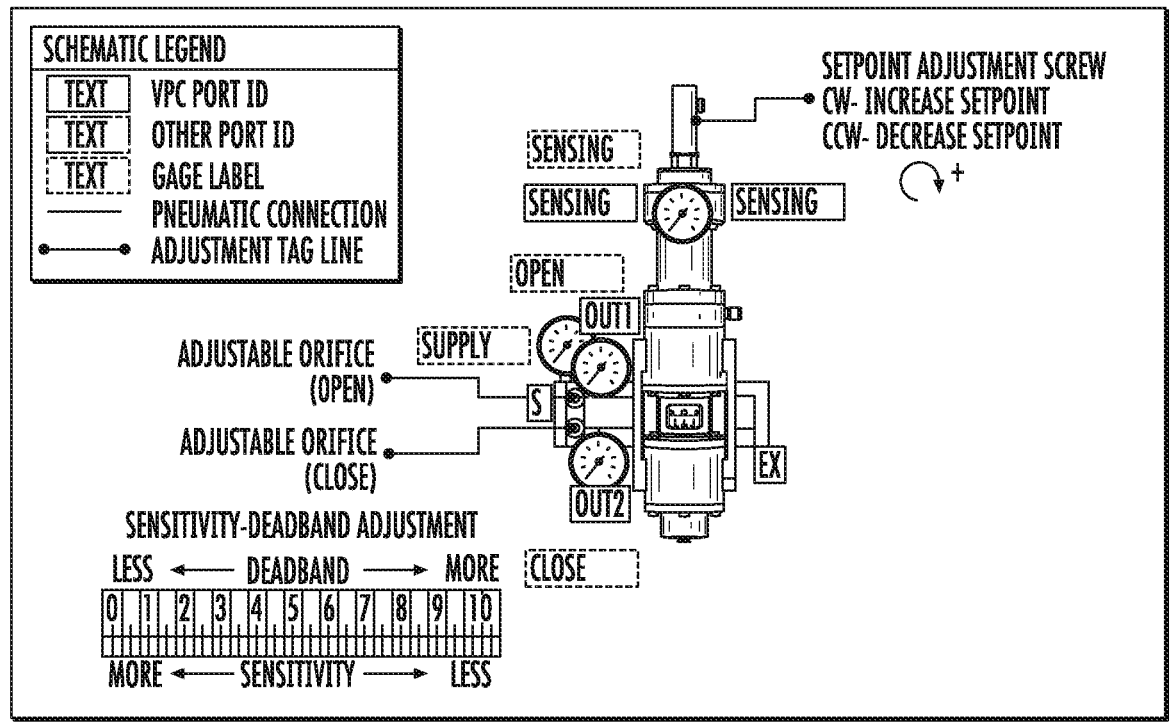
Figure 28A:
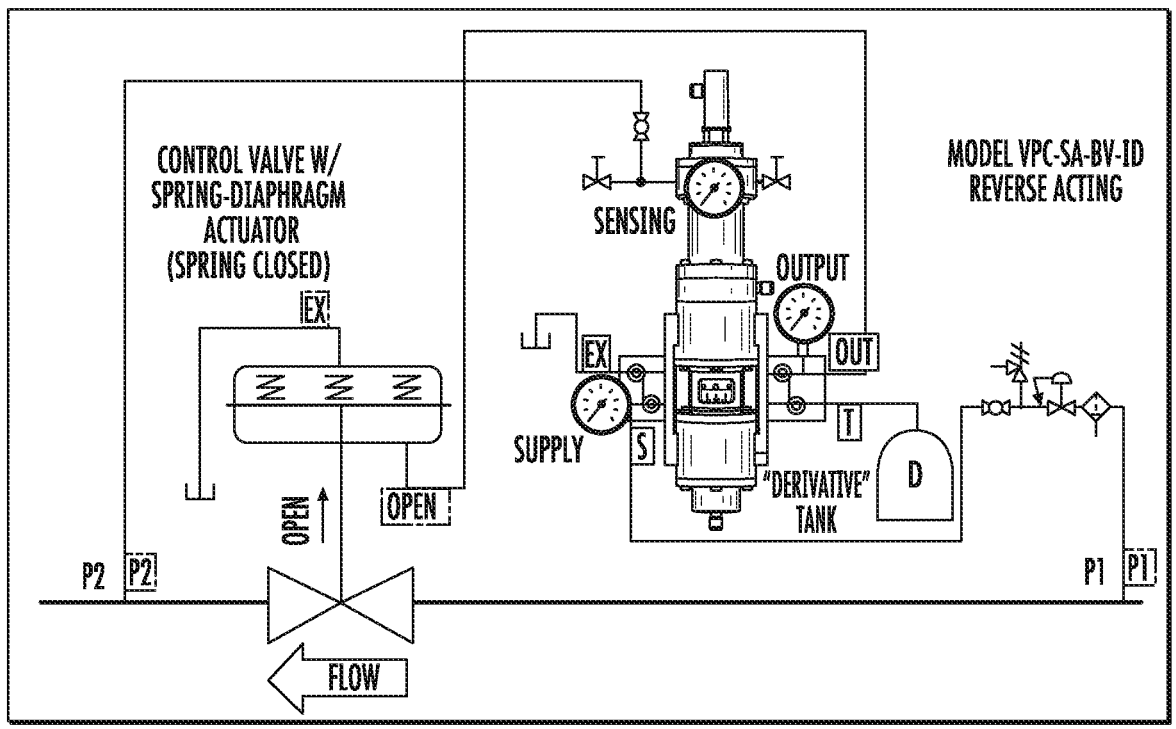
Figure 28B:
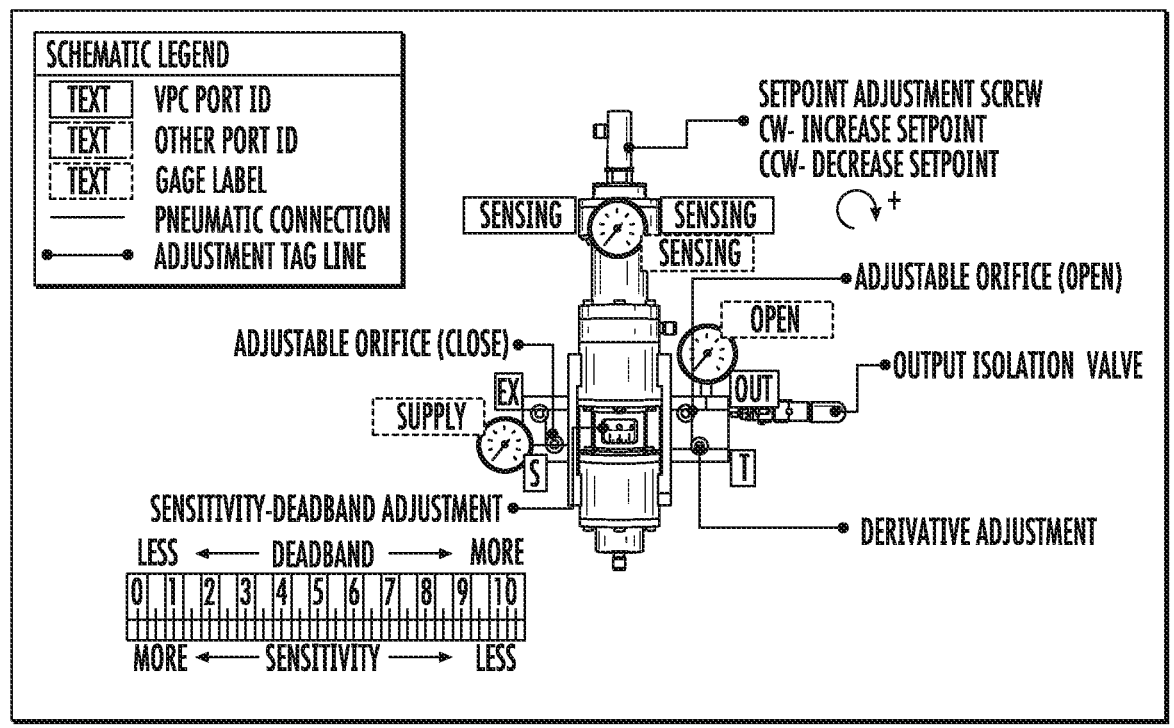
Figure 29A:
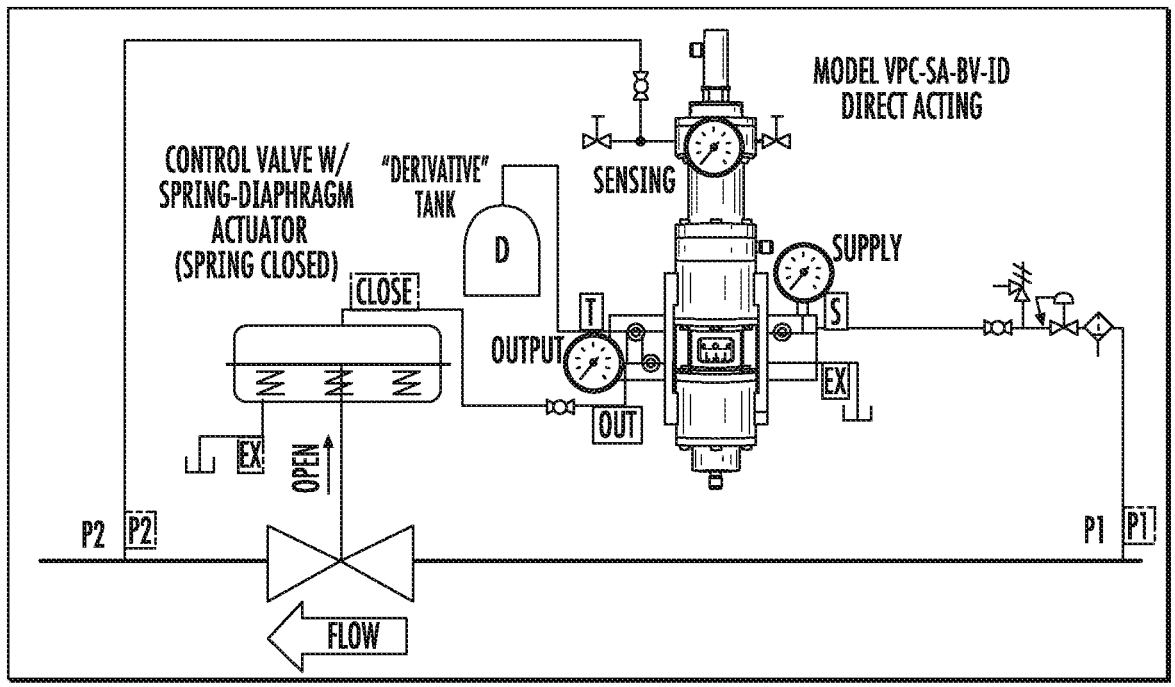
Figure 29B:
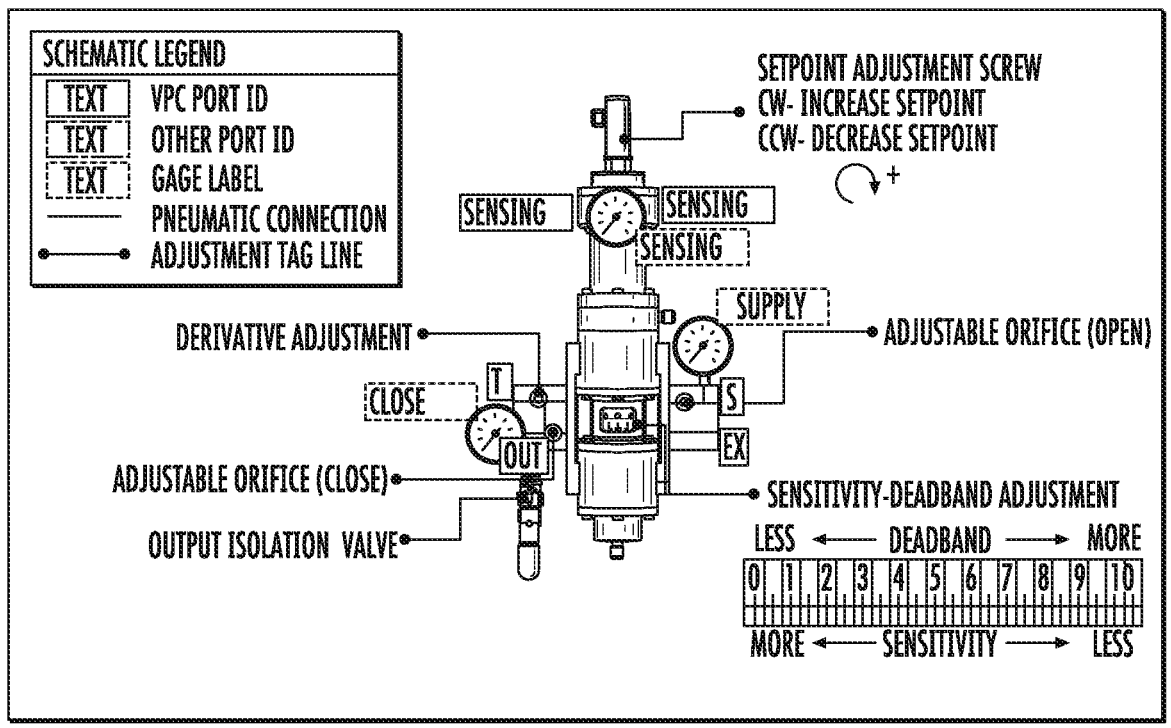

Referring to FIGS. 1, 14 and 15, several different manifolds 30 are illustrated. These manifolds 30 connectable to the VPC power module 22 and create the various VPC models described. As illustrated, the individual manifolds 30 may include various configurations, channels and adjustable orifices to accommodate single-acting and double-acting configurations, as well as normally-closed loading valve and normally-open loading valve configurations. The manifolds 30 connect and bolt (or otherwise lock) onto the power module 22.

System Accessories

Figure 11:
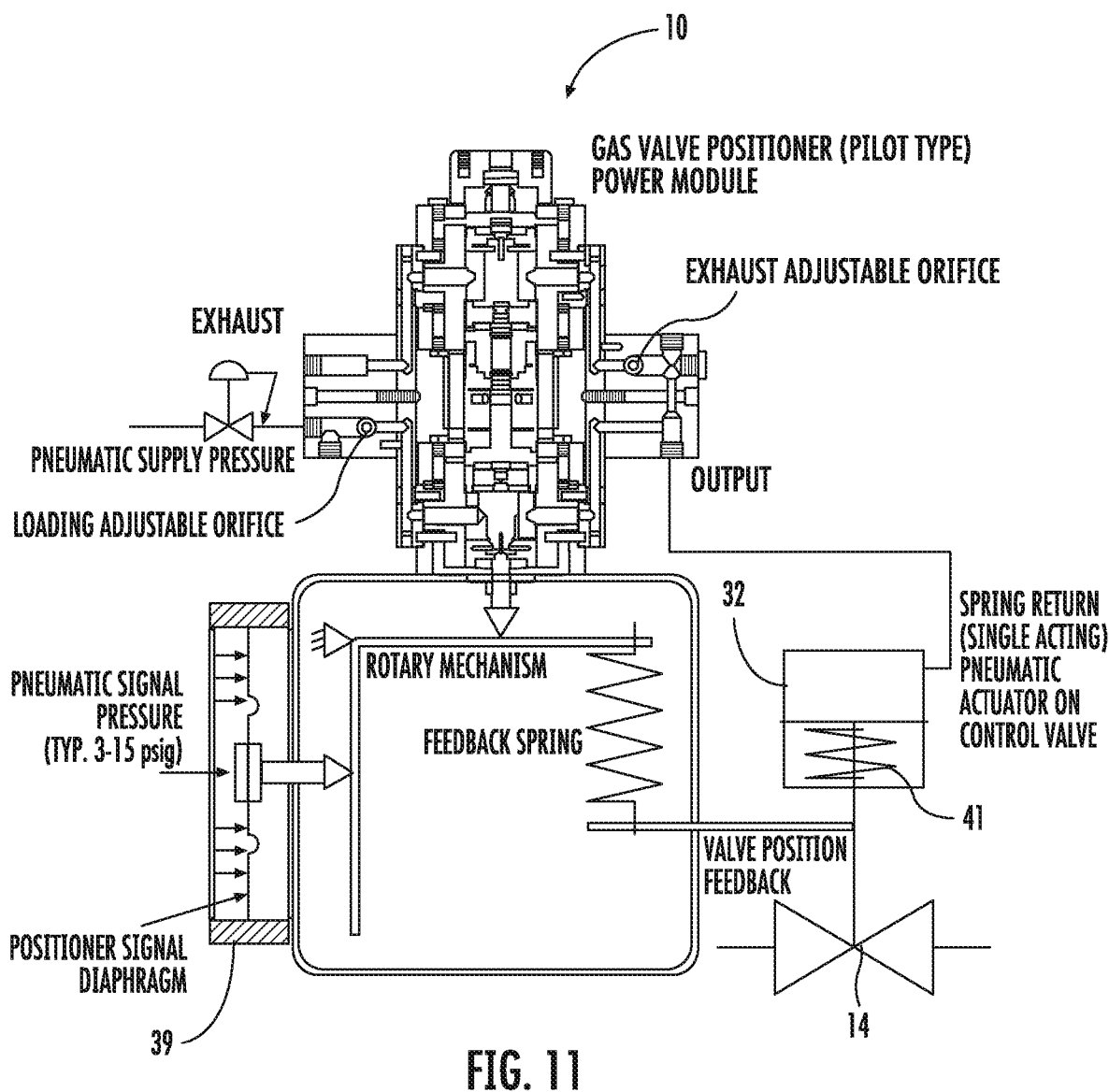
FIG. 11 is a schematic illustrating a single-acting VPC with a normally-closed loading valve configuration and a proportional valve position feedback acting as a pneumatic valve positioner.
Figure 12:
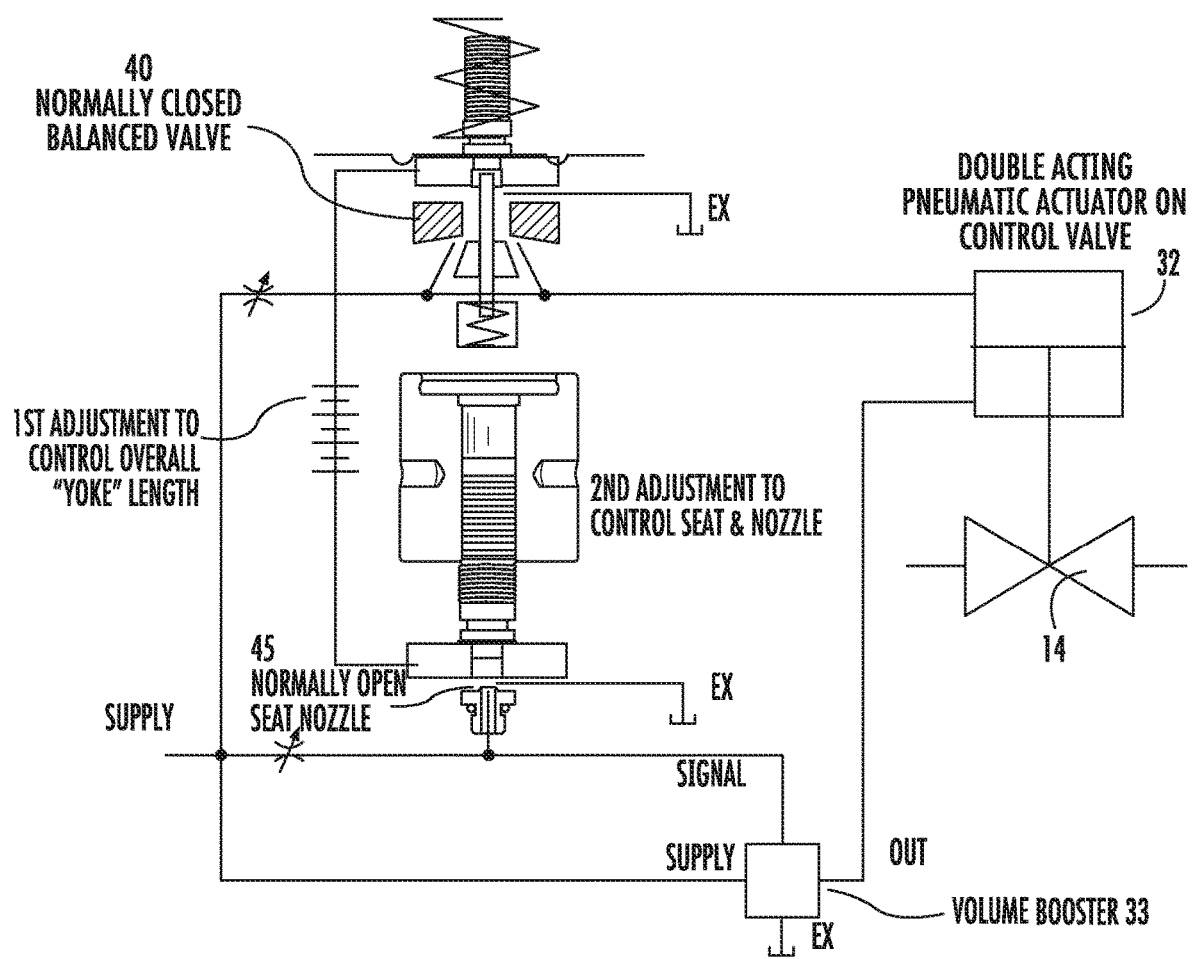
FIG. 12 is a schematic showing a system having a VPC having dissimilar normally-closed loading valve and a normally-open loading valve with independent sensitivity adjustments for each loading valve.
Figure 13:
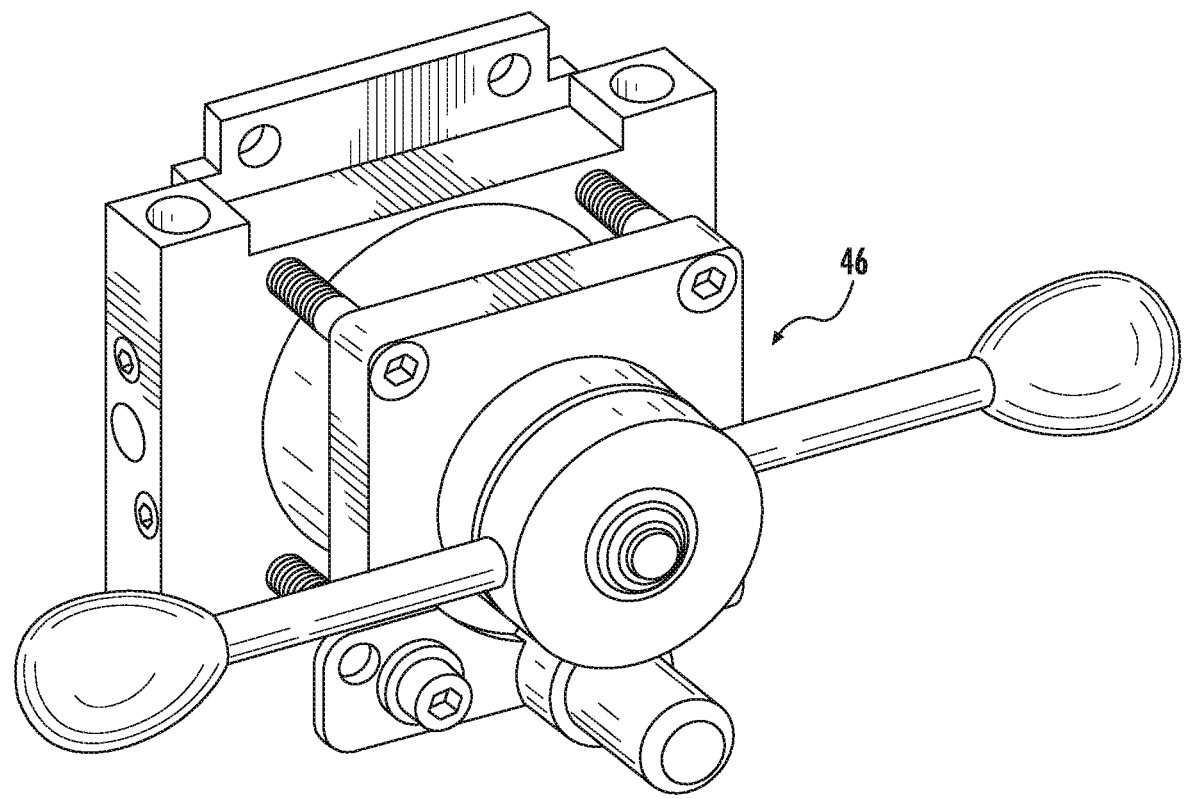

Referring now to FIGS. 11-13, numerous system 10 accessories can be viewed. These accessories also add to the modularity of the VPC 20. As noted above, the VPC 20 may be configured with either normally open loading valves (seat & nozzle valves 45) or normally closed (loading valves 40) internal logic using the same VPC base platform 22. Interchangeable internal valve format "Logic Exchange" (see FIG. 10) allows the system 10 to be configured for multiple control applications.

As shown in FIG. 1, the "connecting" manifolds 23 of the VPC power module 22 provide unique flow conditioning that optimizes flow characteristics of internal logic (loading valves 40 and 42), allowing greater control capabilities of the VPC 20. This is particularly important when coupled with additional control devices such as a volume booster 33 (see FIG. 12) and a pneumatic positioner 35 (see FIG. 11). Existing technology does not integrate any "flow conditioning" via manifolding, which lessens control capabilities.

The VPC derivative adjustment (orifice) is pneumatically coupled with the VPC output pressure via installation in same manifold which provides improved control capabilities. The derivative adjustment is an adjustable orifice (restriction) that is installed in parallel with the output to the control element (actuator 32 or pneumatic positioner 35) with a volume tank 37 installed downstream of the derivative adjustment. The resulting configuration provides for a delayed response of the VPC output signal to the control element (actuator 32 or valve positioner 35). The derivative adjustment affects the rate of response of the output to the control element (actuator 32 or valve positioner 35). Existing systems utilize a derivative adjustment (orifice) that is installed as a separate component (adjustable orifice) from the output function which does not provide the same optimized characteristics as achieved in the VPC 20 of the present system 10.

The base VPC 20 of system 10 offers numerous additional advantages over existing technology. As shown in FIG. 12, the VPC 20 allows incorporation of two (2) dissimilar internal valves (i.e., normally-closed loading valve and normally-open loading valve) to achieve a completely new control configuration for application optimization. Current technology must utilize two (2) identical internal loading valves due to limitations of design. Also shown, the VPC 20 also allows incorporation of two (2) independent sensitivity adjustments for each internal loading valve to achieve a completely new control configuration for application optimization. Current technology is limited to only a single sensitivity adjustment that affects both internal loading valves.

The VPC 20 may also be configured as a proportional device with a mechanical feedback to achieve a "diaphragm type" valve positioner 39, as shown in FIG. 11. Current technology incorporates a mechanical feedback that directly couples the diaphragm module with the power module in a linear arrangement. A diaphragm type valve positioner 39 incorporates a mechanical feedback that separates the diaphragm module and the power module. The design incorporates pivoted beam component to couple the power module 22 and the diaphragm module 39, also shown in FIG. 11.

The base VPC 20 provides Integral function (I) and Derivative function (D) adjustments. More demanding control applications may require addition of a Proportional function (P) adjustment in a "PID" type controller. The present system 10 utilizes a continuous type Proportional function (P) adjustment that incorporates a pivoted beam with an adjustable fulcrum. Existing technology does not have a continuous Proportional function (P) adjustment, but utilizes a selection of interchangeable components to achieve only discrete Proportional function (P) values.

Optionally, with reference to FIG. 13-13d, the system 10 may include a valve manual override (VMO) 46, which is a six-way, five-position valve utilized in conjunction with the VPC 20. The VMO 46 provides an ability to override any of the system configurations and manually operate the process control valve 14 to which the VPC 20 is coupled. In contrast, current technology is installed via threaded plumbing connections and multiple pneumatic tubing lines. The current system 10 allows the VMO 46 to be installed as an integral component with the VPC 20 utilizing the unique manifold 23, thereby minimizing the need for any external plumbing connections and simplifying the design. Additionally, the manifolds 23 of the system 10 allow for installation and removal of the VMO 46 without removal of any threaded plumbing fittings. Rotary type VMO and linear ported type VMO may be used. In the case of the rotary type VMO, the device is used to interrupt and allow manual control of the pneumatic output of the pilot by manually rotating ports. The linear ported type VMO also interrupts and allows manual control of the pneumatic output of the pilot, but does so by shifting of a linear ported valve system.

Other key alternate components and embodiments of the system 10 and VPC 20 are set forth in the paragraphs below.

As previously mentioned, the VPC 20 can use two different internal valves fluidly coupled to the actuator 32. Known existing designs have always used the same internal valves in order to achieve a control function. Comparatively, the loading valves of the present system 10 can be either normally-open type loading valves or normally-closed type loading valves. For example, the VPC 20 can be constructed using one normally-open type loading valve and one normally-closed type loading valve. Additional adjustments would be needed in order to tune each loading valve individually, but those skilled in the art would understand how to make such adjustments. Such a configuration can be used, for example, where a volume booster 33 (FIG. 12) is needed in one direction but not is the opposite direction.

As those skilled in the art will appreciate, existing pneumatic controllers are available in two configurations: Bourdon tube plus relay and direct diaphragm. The Bourdon tube plus relay is available with all variable P I+D functions. The direct diaphragm controller is only available with variable I+D and selectable P functions. However, the VPC 20 can also be built on the diaphragm principal with all P+I+D functions available as variable.

With respect to the use of a pneumatic positioner 35, existing devices are available as one of either a relay type, spool valve type or diaphragm type positioner. The relay positioner and spool valve positioner are both available with rotary or linear feedback. However, the diaphragm positioner is currently only available with a linear feedback. The present system 10 provides a diaphragm positioner with rotary feedback or linear feedback. The rotary feedback will have a feedback beam driven by the sensing diaphragm and counterbalanced by the power diaphragms and range extension spring.

Other possible design alterations include the following:
A. Combining I and D orifice in one manifold;
B. Using a smaller volume tank;
C. Using ID controller as the first stage cut controller over PI and over PID;
D. Use of 0.001" hard coat anodizing to create a barrier between aluminum and SS screws, which eliminates electrolysis effect and aluminum corrosion;
E. 5.225 and 1500 sensing chambers built as independent chambers versus existing technology design; and
F. Six common springs for all design versus several cartridges for existing technology.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method for controlling a fluid supply through a delivery line having a process control valve therein to maintain a supply side pressure and a delivery side pressure, and a pneumatic actuator having a first pressure chamber and a second pressure chamber and used to operate the process control valve, the method comprising the steps of:
setting a delivery side target pressure range for the fluid supply;
sensing the delivery side pressure;
operating the pneumatic actuator in one of the following ways:
maintaining the actuator in a static state when the delivery side pressure is within the target range;
moving the actuator to open the process control valve when the delivery side pressure is below the target range;
moving the actuator to close the process control valve when the delivery side pressure is above the target range; and
applying 0.001" hardcoat anodizing to create a barrier between aluminum and stainless steel screws to eliminate electrolysis and aluminum corrosion;
wherein, the first and second pressure chambers of the actuator are responsive to a first loading valve fluidly coupled to the first pressure chamber and a second loading valve fluidly coupled to the second pressure chamber, and the first loading valve and the second loading valve open and close in response to the delivery side pressure to change a position of the actuator and thereby operate the process control valve.

2. The method for controlling a fluid supply through a delivery line as set forth in claim 1, further comprising moving the first loading valve and the second loading valve synchronously between the closed position and the open position.

3. The method for controlling a fluid supply through a delivery line as set forth in claim 1, further comprising opening the first loading valve to change the position of the actuator and move the process control valve toward a fully closed position.

4. The method for controlling a fluid supply through a delivery line as set forth in claim 2, further comprising opening the first loading valve to change the position of the actuator and move the process control valve toward a fully closed position.

5. The method for controlling a fluid supply through a delivery line as set forth in claim 1, further comprising opening the second loading valve to change the position of the actuator and move the process control valve toward a fully open position.

6. The method for controlling a fluid supply through a delivery line as set forth in claim 2, further comprising opening the second loading valve to change the position of the actuator and move the process control valve toward a fully open position.

* * * * *